US012683515B2

(12) United States Patent
Du et al.

(10) Patent No.: US 12,683,515 B2
(45) Date of Patent: Jul. 14, 2026

(54) POWER CONVERSION DEVICE AND CONTROL METHOD THEREOF

(71) Applicant: HUAWEI DIGITAL POWER TECHNOLOGIES CO., LTD., Shenzhen (CN)

(72) Inventors: Yi Du, Shanghai (CN); Xinyu Yu, Shanghai (CN); Kai Xin, Shanghai (CN); Yunfeng Liu, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 191 days.

(21) Appl. No.: 18/658,932

(22) Filed: May 8, 2024

(65) Prior Publication Data

US 2024/0333172 A1      Oct. 3, 2024

Related U.S. Application Data

(63) Continuation of application No. PCT/CN2023/139422, filed on Dec. 18, 2023.

(30) Foreign Application Priority Data

Mar. 30, 2023     (CN) .......................... 202310361469.7
Nov. 1, 2023      (CN) .......................... 202311440690.8

(51) Int. Cl.
H02M 7/48          (2007.01)
H02J 3/16          (2006.01)
(Continued)

(52) U.S. Cl.
CPC ................. H02M 7/48 (2013.01); H02J 3/16 (2013.01); H02J 3/381 (2013.01); H02J 2101/24 (2026.01)

(58) Field of Classification Search
CPC ...... H02M 7/48; H02M 1/007; H02M 7/5387; H02M 7/53871; H02J 3/16; H02J 3/381; H02J 2300/24; H02J 3/48; H02J 3/50
See application file for complete search history.

(56) References Cited

U.S. PATENT DOCUMENTS 8,970,057 B2      3/2015  Li et al.
10,630,079 B2 *   4/2020  Nelson ...................... H02J 3/38
(Continued)

FOREIGN PATENT DOCUMENTS

EP        4148937 A1       3/2023
JP       2005539476 A      12/2005
(Continued)

OTHER PUBLICATIONS

Extended European Search Report in European Appln. No. 23878373.2, mailed on Feb. 7, 2025, 8 pages.
(Continued)

*Primary Examiner* — Kyle J Moody
(74) *Attorney, Agent, or Firm* — Fish & Richardson P.C.

(57)          ABSTRACT

Examples of power conversion devices and control methods are described. In one example, a power conversion device includes direct current buses, an inverter circuit, and a controller. After the power conversion device switches from a high voltage ride through state to a low voltage ride through state, the controller controls a change rate of an output active current of the inverter circuit to be a first change rate in a first time interval and a second change rate in a second time interval respectively in a low voltage ride through reactive current response process. The second change rate is greater than the first change rate. A sum of first interval duration of the first time interval and second interval
(Continued)

duration of the second time interval is less than or equal to a low voltage ride through reactive current response duration threshold.

20 Claims, 19 Drawing Sheets

(51) Int. Cl.
_H02J 3/38_ (2006.01)
_H02J 101/24_ (2026.01)

(56) References Cited

U.S. PATENT DOCUMENTS

| | | | |
|---|---|---|---|
| 10,774,809 B2 * | 9/2020 | Biris | F03D 7/0284 |
| 2013/0027993 A1 * | 1/2013 | Tan | H02J 3/24 363/40 |
| 2023/0022678 A1 | 1/2023 | Huang et al. | |

FOREIGN PATENT DOCUMENTS

| | | |
|---|---|---|
| JP | 2013039026 A | 2/2013 |
| JP | 2021002947 A | 1/2021 |
| JP | 2021516391 A | 7/2021 |
| WO | 2021114589 A1 | 6/2021 |

OTHER PUBLICATIONS

Shabestary et al., "Overview of Voltage Support Strategies in Grid-Connected VSCs under Unbalanced Grid Faults Considering LVRT and HVRT Requirements," Paper, Presented at Proceedings of the 2018 IEEE International Conference on Smart Energy Grid Engineering (SEGE), Oct. 21, 2018, 5 pages.
Office Action in Japanese Appln. No. 2024-529801, mailed on Jun. 26, 2025, 11 pages (with English translation).

* cited by examiner

Control a power conversion device to be in a high voltage ride through state when a power grid voltage of an alternating current power grid is greater than a high voltage ride through voltage threshold, and control the power conversion device to be in a low voltage ride through state when the power grid voltage of the alternating current power grid is less than a low voltage ride through voltage threshold — S101

After the power conversion device switches from the high voltage ride through state to the low voltage ride through state, control a change rate of an output active current of an inverter circuit to be a first change rate and a second change rate in a first time interval and a second time interval in a low voltage ride through reactive current response process respectively — S102

FIG. 12

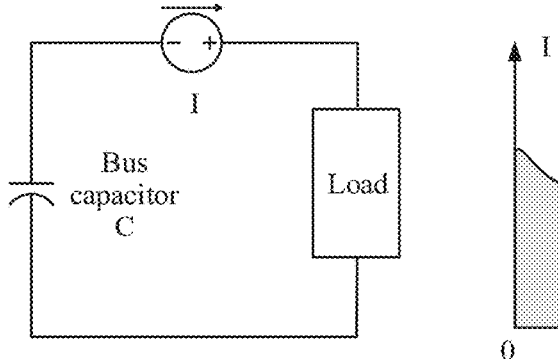

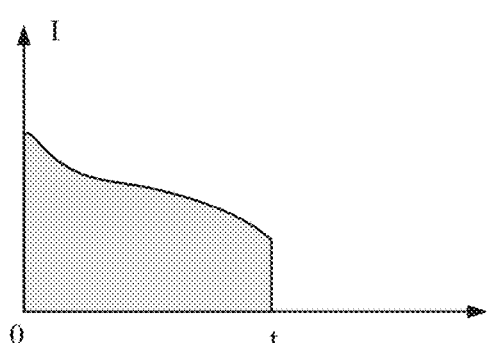

FIG. 13

POWER CONVERSION DEVICE AND CONTROL METHOD THEREOF

CROSS-REFERENCE TO RELATED APPLICATIONS

This application is a continuation of International Application No. PCT/CN2023/139422, filed on Dec. 18, 2023, which claims priority to Chinese Patent Application No. 202310361469.7, filed on Mar. 30, 2023, and Chinese Patent Application 202311440690.8, filed on Nov. 1, 2023. All of the aforementioned patent applications are hereby incorporated by reference in their entireties.

TECHNICAL FIELD

This application relates to the field of power supply technologies, and in particular, to a power conversion device and a control method thereof.

BACKGROUND

With an increasing quantity of external power transmission lines for new energy direct current transmission, the continuous commutation failure of direct current transmission leads to continuous ride through from a high voltage to a low voltage in a power system.

Currently, in a high voltage ride through period in the power system, an inverter mainly outputs in a standard high voltage ride through mode. To be specific, the inverter outputs a reactive current based on a standard requirement and a power grid voltage rise height, and limits output of an active current based on a maximum current capability of the inverter. After the power system switches from high voltage ride through to low voltage ride through, the inverter mainly outputs in a standard low voltage ride through mode. To be specific, the inverter outputs a reactive current based on a standard requirement and a power grid voltage sag depth, and limits output of an active current based on the maximum current capability of the inverter.

Although the control manners of the standard high voltage ride through mode and the standard low voltage ride through mode can theoretically provide active and reactive power support for the power system, in the high voltage ride through period, the standard high voltage ride through mode keeps a voltage of a direct current bus at a high level due to power grid voltage rise. For details, refer to a control sequence diagram shown in FIG. 1. In the high voltage ride through period Δt1, the voltage of the direct current bus remains greater than a low voltage ride through derating threshold Um. Based on this, in a period Δt2 after the power system switches from high voltage ride through to low voltage ride through, an output reactive current of the inverter at the end of a low voltage reactive current response process (that is, at a moment t3) does not meet a standard requirement. As a result, adaptability of the inverter becomes poor. Therefore, it is quite important to improve adaptability of the inverter after the power system switches from high voltage ride through to low voltage ride through.

SUMMARY

This application provides a power conversion device and a control method thereof, to improve adaptability of the power conversion device switching from a high voltage ride through state to a low voltage ride through state.

According to a first aspect, this application provides a power conversion device. Input ends and an output end of the power conversion device are configured to connect to a direct current power supply and an alternating current power grid respectively. The power conversion device includes direct current buses, an inverter circuit, and a controller. Input ends of the inverter circuit are connected to the input ends of the power conversion device through the direct current buses. An output end of the inverter circuit is connected to the output end of the power conversion device. The controller controls the power conversion device to be in a high voltage ride through state when a power grid voltage of the alternating current power grid is greater than a high voltage ride through voltage threshold, and controls the power conversion device to be in a low voltage ride through state when the power grid voltage of the alternating current power grid is less than a low voltage ride through voltage threshold. After the power conversion device switches from the high voltage ride through state to the low voltage ride through state, the controller controls a change rate of an output active current of the inverter circuit to be a first change rate in a first time interval and a second change rate in a second time interval respectively in a low voltage ride through reactive current response process. The second change rate is greater than the first change rate. A sum of first interval duration of the first time interval and second interval duration of the second time interval is less than or equal to a low voltage ride through reactive current response duration threshold. It may be understood that if the first change rate corresponds to a change rate of the output active current of the inverter circuit in a reactive-before-active control mode (including a standard low voltage ride through mode), in the low voltage ride through reactive current response process, the power conversion device controls, in the second time interval, the change rate of the output active current of the inverter circuit to be the second change rate greater than the first change rate, so that a decrease speed of the output active current of the inverter circuit in the second time interval is less than a decrease speed of the output active current of the inverter circuit in the reactive-before-active control mode, and a bus voltage can more quickly decrease and be less than a low voltage ride through derating threshold. Therefore, an output reactive current of the inverter circuit meets a standard low voltage ride through reactive current requirement at the end of the low voltage ride through reactive current response process. On the contrary, if the second change rate corresponds to the change rate of the output current of the inverter circuit in the reactive-before-active control mode, in the first time interval in the low voltage ride through reactive current response process, the power conversion device controls the change rate of the output active current of the inverter circuit to be the first change rate less than the second change rate, so that a decrease speed of the bus voltage can be reduced. Therefore, a manner of controlling the bus voltage by the power conversion device is more flexible. Further, adaptability of the power conversion device can be improved.

With reference to the first aspect, in a first possible implementation, the controller determines a first target active current value in the first time interval based on a first target reactive current value and a preset maximum output current value, and controls the output active current of the inverter circuit based on the first target active current value, to control the change rate of the output active current of the inverter circuit to be the first change rate. It may be understood that the power conversion device controls the output active current of the inverter circuit in the first time interval in the reactive-before-active control mode, and controls, in the second time interval, the change rate of the output active current of the inverter circuit to be the second change rate greater than the first change rate, so that the decrease speed of the output active current of the inverter circuit in the second time interval is less than the decrease speed of the output active current of the inverter circuit in the reactive-before-active control mode, and the bus voltage can more quickly decrease and be less than the low voltage ride through derating threshold. Therefore, the output reactive current of the inverter circuit meets the standard low voltage ride through reactive current requirement at the end of the low voltage ride through reactive current response process. Further, adaptability of the power conversion device is improved.

With reference to the first possible implementation of the first aspect, in a second possible implementation, the first time interval is earlier than the second time interval. The controller controls the output active current of the inverter circuit in the second time interval based on a second target active current value; and in the process of controlling the output active current of the inverter circuit based on the second target active current value, adjusts the second target active current value to decrease from a first active current value to the first target active current value, to control the change rate of the output active current of the inverter circuit to be the second change rate. The first active current value is a sum of the first target active current value and a preset active current increment. The preset active current increment is determined based on a rated output current value of the inverter circuit and a preset bus voltage attenuation coefficient. It may be understood that in the low voltage ride through reactive current response process, compared with the mode of controlling the output active current of the inverter circuit based on the first target active current value (that is, the reactive-before-active control mode), in the second time interval, the output active current of the inverter circuit is controlled to more slowly decrease to the first target active current value, so that the bus voltage can more quickly decrease and be less than the low voltage ride through derating threshold. Therefore, the output reactive current of the inverter circuit meets the standard low voltage ride through reactive current requirement at the end of the low voltage ride through reactive current response process. Further, adaptability of the power conversion device is improved.

With reference to the first possible implementation of the first aspect, in a third possible implementation, the controller controls the output active current of the inverter circuit in the second time interval based on a second target active current value, to control the change rate of the output active current of the inverter circuit to be the second change rate. The second target active current value is equal to an output active current value of the inverter circuit at an interval start moment of the second time interval. It may be understood that in the low voltage ride through reactive current response process, compared with the reactive-before-active control mode, the power conversion device controls, in the second time interval, the output active current of the inverter circuit to be kept at the second target active current value, so that the output active current of the inverter circuit can more slowly decrease, and the bus voltage can more quickly decrease and be less than the low voltage ride through derating threshold in the low voltage ride through reactive current response process. Therefore, the output reactive current of the inverter circuit meets the standard low voltage ride through reactive current requirement at the end of the low voltage ride through reactive current response process. Further, adaptability of the power conversion device is improved.

With reference to the first possible implementation of the first aspect, in a fourth possible implementation, the controller is configured to control the output active current of the inverter circuit in the second time interval based on a second target active current value, to control the change rate of the output active current of the inverter circuit to be the second change rate. The second target active current value is greater than an output active current value of the inverter circuit at an interval start moment of the second time interval. It may be understood that in the low voltage ride through reactive current response process, compared with the reactive-before-active control mode, the power conversion device controls, in the second time interval, the output active current of the inverter circuit to increase, so that the bus voltage can more quickly decrease and be less than the low voltage ride through derating threshold in the low voltage ride through reactive current response process. Therefore, the output reactive current of the inverter circuit meets the standard low voltage ride through reactive current requirement at the end of the low voltage ride through reactive current response process. Further, adaptability of the power conversion device is improved.

With reference to any one of the second possible implementation of the first aspect to the fourth possible implementation of the first aspect, in a fifth possible implementation, the controller is configured to: if the output active current of the inverter circuit is less than or equal to an active current threshold, controlling, in the second time interval, the change rate of the output active current of the inverter circuit to be the second change rate.

With reference to any one of the third possible implementation of the first aspect to the fifth possible implementation of the first aspect, in a sixth possible implementation, the controller further controls, in a third time interval in the low voltage ride through reactive current response process, the change rate of the output active current of the inverter circuit to be a third change rate. The third change rate is less than the second change rate. A sum of third interval duration of the third time interval, the first interval duration, and the second interval duration is less than or equal to the low voltage ride through reactive current response duration threshold. It may be understood that a low voltage ride through reactive current response phase may include the first time interval and the second time interval, or may include the first time interval, the second time interval, and the third time interval. The power conversion device has diversified control manners and high flexibility.

With reference to the sixth possible implementation of the first aspect, in a seventh possible implementation, the third time interval is later than the first time interval and the second time interval. The controller controls, in the third time interval, the output active current of the inverter circuit based on a third target active current value; and in the process of controlling the output active current of the inverter circuit based on the third target active current value, adjusts the third target active current value to decrease from a second active current value to the first target active current value, to control the change rate of the output active current of the inverter circuit to the third change rate. The second active current value is an output active current value of the inverter circuit at an interval start moment of the third time interval. Further, the output active current of the inverter circuit decreases to the first target active current value in the third time interval, so that the bus voltage of the direct current bus decreases at a fast speed, and the bus voltage of the direct current bus is less than the low voltage ride through derating threshold. Therefore, the output reactive current of the inverter circuit meets the standard low voltage ride through reactive current requirement at the end of the low voltage ride through reactive current response process, and adaptability of the power conversion device is improved.

With reference to the sixth possible implementation of the first aspect, in an eighth possible implementation, the controller controls, in the third time interval, the output active current of the inverter circuit based on a third target active current value, to control the change rate of the output active current of the inverter circuit to be the third change rate. The third target active current value is equal to an output active current value of the inverter circuit at an interval start moment of the third time interval. It may be understood that in the low voltage ride through reactive current response process, the power conversion device controls, in the second time interval, that the decrease speed of the output active current of the inverter circuit is less than the decrease speed of the output active current of the inverter circuit in the reactive-before-active control mode, and further keeps the output active current value of the inverter circuit in the third time interval to reduce the decrease speed of the output active current of the inverter circuit and increase the decrease speed of the bus voltage, so that the bus voltage can more quickly decrease to be less than the low voltage ride through derating threshold in the low voltage ride through reactive current response process. Therefore, the output reactive current of the inverter circuit meets the standard low voltage ride through reactive current requirement at the end of the low voltage ride through reactive current response process. Further, adaptability of the power conversion device is improved.

With reference to the sixth possible implementation of the first aspect or the eighth possible implementation of the first aspect, in a ninth possible implementation, the controller further controls, in a fourth time interval in the low voltage ride through reactive current response process, the change rate of the output active current of the inverter circuit to be a fourth change rate. The fourth change rate is less than the third change rate. A sum of fourth interval duration of the fourth time interval, the first interval duration, the second interval duration, and the third interval duration is less than or equal to the low voltage ride through reactive current response duration threshold. It may be understood that the low voltage ride through reactive current response phase may alternatively include the first time interval, the second time interval, the third time interval, and the fourth time interval. The power conversion device has diversified control manners and high flexibility.

With reference to the ninth possible implementation of the first aspect, in a tenth possible implementation, the fourth time interval is later than the first time interval, the second time interval, and the third time interval. The controller controls the output active current of the inverter circuit in the fourth time interval based on a fourth target active current value; and in the process of controlling the output active current of the inverter circuit based on the fourth target active current value, adjusts the fourth target active current value to decrease from a third active current value to the first target active current value, to control the change rate of the output active current of the inverter circuit to the fourth change rate. The third active current value is an output active current value of the inverter circuit at an interval start moment of the fourth time interval. Further, the output active current of the inverter circuit decreases to the first target active current value in the fourth time interval, so that the bus voltage of the direct current bus decreases at a fast speed, and the bus voltage of the direct current bus is less than the low voltage ride through derating threshold. Therefore, the output reactive current of the inverter circuit meets the standard low voltage ride through reactive current requirement at the end of the low voltage ride through reactive current response process, and adaptability of the power conversion device is improved.

With reference to any one of the second possible implementation of the first aspect to the tenth possible implementation of the first aspect, in an eleventh possible implementation, the controller further controls the output reactive current of the inverter circuit in the second time interval based on a second target reactive current value. The second target reactive current value is determined based on the second target active current value and the preset maximum output current value. It may be understood that in the low voltage ride through reactive current response process, compared with the reactive-before-active mode, the power conversion device controls, in the second time interval, the output active current of the inverter circuit to more slowly decrease, so that the bus voltage can more quickly decrease and be less than the low voltage ride through derating threshold. Then, based on the control over the output reactive current of the inverter circuit, the output reactive current of the inverter circuit meets the standard low voltage ride through reactive current requirement at the end of the low voltage ride through reactive current response process. Further, adaptability of the power conversion device is improved.

With reference to any one of the seventh possible implementation of the first aspect to the eleventh possible implementation of the first aspect, in a twelfth possible implementation, the controller further controls the output reactive current of the inverter circuit in the third time interval based on a third target reactive current value. The third target reactive current value is determined based on the third target active current value and the preset maximum output current value. It may be understood that in the low voltage ride through reactive current response process, compared with the reactive-before-active mode, the power conversion device controls, in the third time interval, the output active current of the inverter circuit to more slowly decrease, so that the bus voltage can more quickly decrease and be less than the low voltage ride through derating threshold. Then, based on the control over the output reactive current of the inverter circuit, the output reactive current of the inverter circuit meets the standard low voltage ride through reactive current requirement at the end of the low voltage ride through reactive current response process. Further, adaptability of the power conversion device is improved.

With reference to any one of the tenth possible implementation of the first aspect to the twelfth possible implementation of the first aspect, in a thirteenth possible implementation, the controller further controls the output reactive current of the inverter circuit in the fourth time interval based on a fourth target reactive current value. The fourth target reactive current value is determined based on the fourth target active current value and the preset maximum output current value. It may be understood that in the low voltage ride through reactive current response process, compared with the reactive-before-active mode, the power conversion device controls the output active current of the inverter circuit in the fourth time interval to more slowly decrease, so that the bus voltage can more quickly decrease and be less than the low voltage ride through derating threshold. Then, based on the control over the output reactive current of the inverter circuit, the output reactive current of the inverter circuit meets the standard low voltage ride through reactive current requirement at the end of the low voltage ride through reactive current response process. Further, adaptability of the power conversion device is improved.

With reference to any one of the first possible implementation of the first aspect to the thirteenth possible implementation of the first aspect, in a fourteenth possible implementation, the controller further controls the output reactive current of the inverter circuit in the first time interval based on the first target reactive current value. The first target reactive current value is determined based on a voltage sag value of the alternating current power grid.

With reference to any one of the first aspect to the fourteenth possible implementation of the first aspect, in a fifteenth possible implementation, the power conversion device further includes direct current DC/direct current DC circuits. The input ends of the inverter circuit are connected to the input ends of the power conversion device sequentially through the direct current buses and the DC/DC circuits. It may be understood that the power conversion device may further include the DC/DC circuits and has diversified structures and high flexibility.

According to a second aspect, this application provides a control method of a power conversion device. Input ends and an output end of the power conversion device are configured to connect to a direct current power supply and an alternating current power grid respectively. The power conversion device includes direct current buses and an inverter circuit. Input ends of the inverter circuit are connected to the input ends of the power conversion device through the direct current buses. An output end of the inverter circuit is connected to the output end of the power conversion device. The method includes: controlling the power conversion device to be in a high voltage ride through state when a power grid voltage of the alternating current power grid is greater than a high voltage ride through voltage threshold, and controlling the power conversion device to be in a low voltage ride through state when the power grid voltage of the alternating current power grid is less than a low voltage ride through voltage threshold; and after the power conversion device switches from the high voltage ride through state to the low voltage ride through state, controlling a change rate of an output active current of the inverter circuit to be a first change rate in a first time interval and a second change rate in a second time interval respectively in a low voltage ride through reactive current response process. The second change rate is greater than the first change rate. A sum of first interval duration of the first time interval and second interval duration of the second time interval is less than or equal to a low voltage ride through reactive current response duration threshold.

With reference to the second aspect, in a first possible implementation, the controller determines a first target active current value in the first time interval based on a first target reactive current value and a preset maximum output current value, and controls the output active current of the inverter circuit based on the first target active current value.

With reference to the first possible implementation of the second aspect, in a second possible implementation, the first time interval is earlier than the second time interval. The controller controls the output active current of the inverter circuit in the second time interval based on a second target active current value; and in the process of controlling the output active current of the inverter circuit based on the second target active current value, adjusts the second target active current value to decrease from a first active current value to the first target active current value. The first active current value is a sum of the first target active current value and a preset active current increment. The preset active current increment is determined based on a rated output current value of the inverter circuit and a preset bus voltage attenuation coefficient.

With reference to the first possible implementation of the second aspect, in a third possible implementation, the controller controls the output active current of the inverter circuit in the second time interval based on a second target active current value. The second target active current value is equal to an output active current value of the inverter circuit at an interval start moment of the second time interval.

With reference to the first possible implementation of the second aspect, in a fourth possible implementation, the controller controls the output active current of the inverter circuit in the second time interval based on a second target active current value. The second target active current value is greater than an output active current value of the inverter circuit at an interval start moment of the second time interval.

With reference to any one of the second possible implementation of the second aspect to the fourth possible implementation of the second aspect, in a fifth possible implementation, if the output active current of the inverter circuit is less than or equal to an active current threshold, the controller controls, in the second time interval, the change rate of the output active current of the inverter circuit to be the second change rate.

With reference to the third possible implementation of the second aspect or the fifth possible implementation of the second aspect, in a sixth possible implementation, the controller further controls, in a third time interval in the low voltage ride through reactive current response process, the change rate of the output active current of the inverter circuit to be a third change rate. The third change rate is less than the second change rate. A sum of third interval duration of the third time interval, the first interval duration, and the second interval duration is less than or equal to the low voltage ride through reactive current response duration threshold.

With reference to the sixth possible implementation of the second aspect, in a seventh possible implementation, the third time interval is later than the first time interval and the second time interval. The controller controls, in the third time interval, the output active current of the inverter circuit based on a third target active current value; and in the process of controlling the output active current of the inverter circuit based on the third target active current value, adjusts the third target active current value to decrease from a second active current value to the first target active current value. The second active current value is an output active current value of the inverter circuit at an interval start moment of the third time interval.

With reference to the sixth possible implementation of the second aspect, in an eighth possible implementation, the controller controls, in the third time interval, the output active current of the inverter circuit based on a third target active current value. The third target active current value is equal to an output active current value of the inverter circuit at an interval start moment of the third time interval.

With reference to the sixth possible implementation of the second aspect or the eighth possible implementation of the second aspect, in a ninth possible implementation, the controller further controls, in a fourth time interval in the low voltage ride through reactive current response process, the change rate of the output active current of the inverter circuit to be a fourth change rate. The fourth change rate is less than the third change rate. A sum of fourth interval duration of the fourth time interval, the first interval duration, the second interval duration, and the third interval duration is less than or equal to the low voltage ride through reactive current response duration threshold.

With reference to the ninth possible implementation of the second aspect, in a tenth possible implementation, the fourth time interval is later than the first time interval, the second time interval, and the third time interval. The controller controls the output active current of the inverter circuit in the fourth time interval based on a fourth target active current value; and in the process of controlling the output active current of the inverter circuit based on the fourth target active current value, adjusts the fourth target active current value to decrease from a third active current value to the first target active current value. The third active current value is an output active current value of the inverter circuit at an interval start moment of the fourth time interval.

With reference to any one of the second possible implementation of the second aspect to the tenth possible implementation of the second aspect, in an eleventh possible implementation, the controller further controls the output reactive current of the inverter circuit in the second time interval based on a second target reactive current value. The second target reactive current value is determined based on the second target active current value and the preset maximum output current value.

With reference to any one of the seventh possible implementation of the second aspect to the eleventh possible implementation of the second aspect, in a twelfth possible implementation, the controller further controls the output reactive current of the inverter circuit in the third time interval based on a third target reactive current value. The third target reactive current value is determined based on the third target active current value and the preset maximum output current value.

With reference to any one of the tenth possible implementation of the second aspect to the twelfth possible implementation of the second aspect, in a thirteenth possible implementation, the controller further controls the output reactive current of the inverter circuit in the fourth time interval based on a fourth target reactive current value. The fourth target reactive current value is determined based on the fourth target active current value and the preset maximum output current value.

With reference to any one of the first possible implementation of the second aspect to the thirteenth possible implementation of the second aspect, in a fourteenth possible implementation, the controller further controls the output reactive current of the inverter circuit in the first time interval based on the first target reactive current value. The first target reactive current value is determined based on a voltage sag value of the alternating current power grid.

According to a third aspect, this application provides another power conversion device. Input ends and an output end of the power conversion device are configured to connect to a direct current power supply and an alternating current power grid respectively. The power conversion device includes direct current buses, an inverter circuit, and a controller. The direct current bus includes a bus capacitor. Input ends of the inverter circuit are connected to the direct current buses. The direct current buses are connected to the input ends of the power conversion device. An output end of the inverter circuit is connected to the output end of the power conversion device. The controller is configured to: in response to that a power grid voltage of the alternating current power grid is greater than or equal to a high voltage ride through threshold in a first period T1 and the power grid voltage is less than or equal to a low voltage ride through threshold in a second period T2, control an active current Ip output by the inverter circuit, so that an active power Pout output by the inverter circuit satisfies $$\int_0^T (Pout/Ubus - Pin/Ubus)dt \geq \Delta Q$$

in the second period T2, where Tis duration of the second period T2, Pin is an input power of the power conversion device, Ubus is a voltage of the direct current bus, $\Delta Q=C$ (Uo−Um), C is a capacitance value of the bus capacitor, Uo is a voltage value of the direct current bus at a start moment of the second period T2, and Um is a target voltage value of the direct current bus. The first period T1 is before the second period T2. A time interval between an end moment of the first period T1 and the start moment of the second period T2 is less than a continuous ride through threshold.

With reference to the third aspect, in a first possible implementation, the controller is configured to control, in the second period T2, the active current Ip output by the inverter circuit to change at least in a first subperiod t1 at a first change rate k1, where t1≤T2, and the first change rate k1>0.

With reference to the third aspect, in a second possible implementation, the controller is configured to control, in the second period T2, the active current Ip output by the inverter circuit to change at least in a second subperiod t2 at a second change rate k2, where t2≤T2, and the second change rate k2<0.

With reference to the third aspect, in a third possible implementation, the controller is configured to: in the second period T2, control the active current Ip output by the inverter circuit to change at least in a third subperiod t3 at a third change rate k3, and control the active current Ip output by the inverter circuit to change at least in a fourth subperiod t4 at a fourth change rate k4, where t3+t4ST2, the third change rate k3<0, and the fourth change rate k4>0.

With reference to the third aspect, in a fourth possible implementation, the controller is configured to control, in the second period T2, an instantaneous change rate kins of the active current Ip output by the inverter circuit to continuously change at least in a fifth subperiod.

With reference to the third aspect, in a fifth possible implementation, the controller is configured to control, in the second period T2, the active current Ip output by the inverter circuit to remain equal to an output active current value of the power conversion device at an end point of the second period T2.

According to a fourth aspect, this application provides another control method of a power conversion device, applied to the power conversion device. Input ends and an output end of the power conversion device are connected to a direct current power supply and an alternating current power grid respectively. The power conversion device includes direct current buses, an inverter circuit, and a controller. The direct current bus includes a bus capacitor. Input ends of the inverter circuit are connected to the direct current buses. The direct current buses are connected to the input ends of the power conversion device. An output end of the inverter circuit is connected to the output end of the power conversion device. The control method includes: in response to that a power grid voltage of the alternating current power grid is greater than or equal to a high voltage ride through threshold in a first period T1 and the power grid voltage is less than or equal to a low voltage ride through threshold in a second period T2, controlling an active current Ip output by the inverter circuit, so that an active power Pout output by the inverter circuit satisfies $$\int_0^T (Pout/Ubus - Pin/Ubus)dt \geq \Delta Q$$

in the second period T2, where T is duration of the second period T2, Pin is an input power of the power conversion device, Ubus is a voltage of the direct current bus, $\Delta Q=C$ (Uo−Um), C is a capacitance value of the bus capacitor, Uo is a voltage value of the direct current bus at a start moment of the second period T2, and Um is a target voltage value of the direct current bus. The first period T1 is before the second period T2. A time interval between an end moment of the first period T1 and the start moment of the second period T2 is less than a continuous ride through threshold.

With reference to the fourth aspect, in a first possible implementation, in the second period T2, the active current Ip output by the power conversion device is controlled to change at least in a first subperiod t1 at a first change rate k1, where t1≤T2, and the first change rate k1>0.

With reference to the fourth aspect, in a second possible implementation, in the second period T2, the active current Ip output by the power conversion device is controlled to change at least in a second subperiod t2 at a second change rate k2, where t2≤T2, and the second change rate k2<0.

With reference to the fourth aspect, in a third possible implementation, in the second period T2, the active current Ip output by the power conversion device is controlled to change at least in a third subperiod t3 at a third change rate k3, and the active current Ip output by the power conversion device is controlled to change at least in a fourth subperiod t4 at a fourth change rate k4, where t4≤T2, and the second change rate k4<0.

With reference to the fourth aspect, in a fourth possible implementation, in the second period T2, the active current Ip output by the inverter circuit is controlled to change at least in a third subperiod t3 at a third change rate k3, and the active current Ip output by the inverter circuit is controlled to change at least in a fourth subperiod t4 at a fourth change rate k4, where t3+t4≤T2, the third change rate k3<0, and the fourth change rate k4>0.

With reference to the fourth aspect, in a fifth possible implementation, in the second period T2, an instantaneous change rate kins of the active current Ip output by the power conversion device is controlled to continuously change at least in a fifth period.

12

Figure 4:
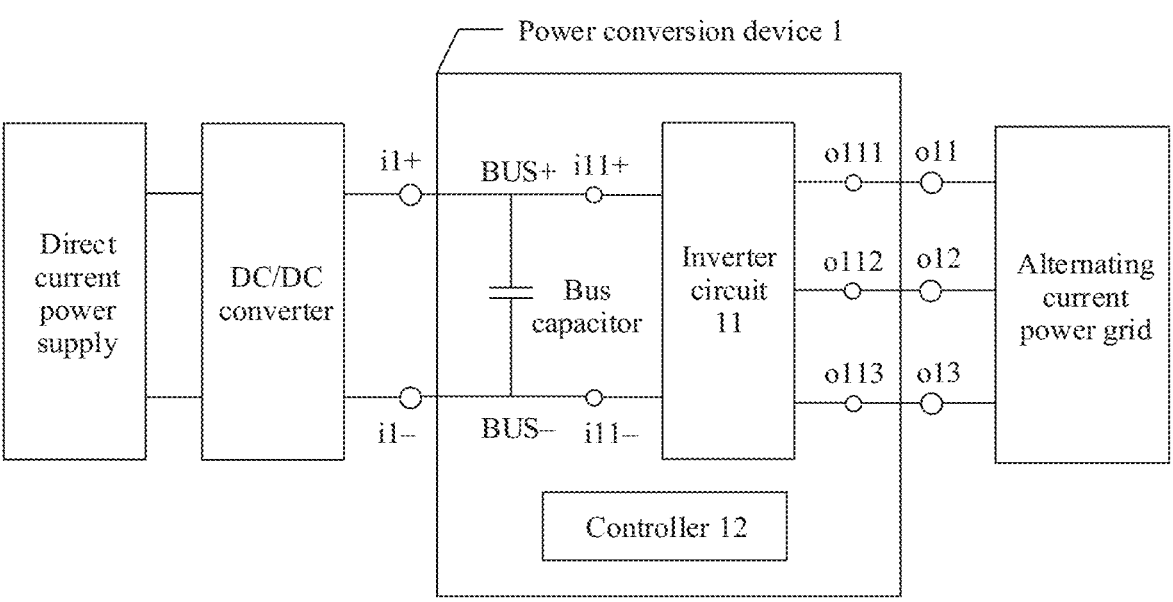
Figure 5:
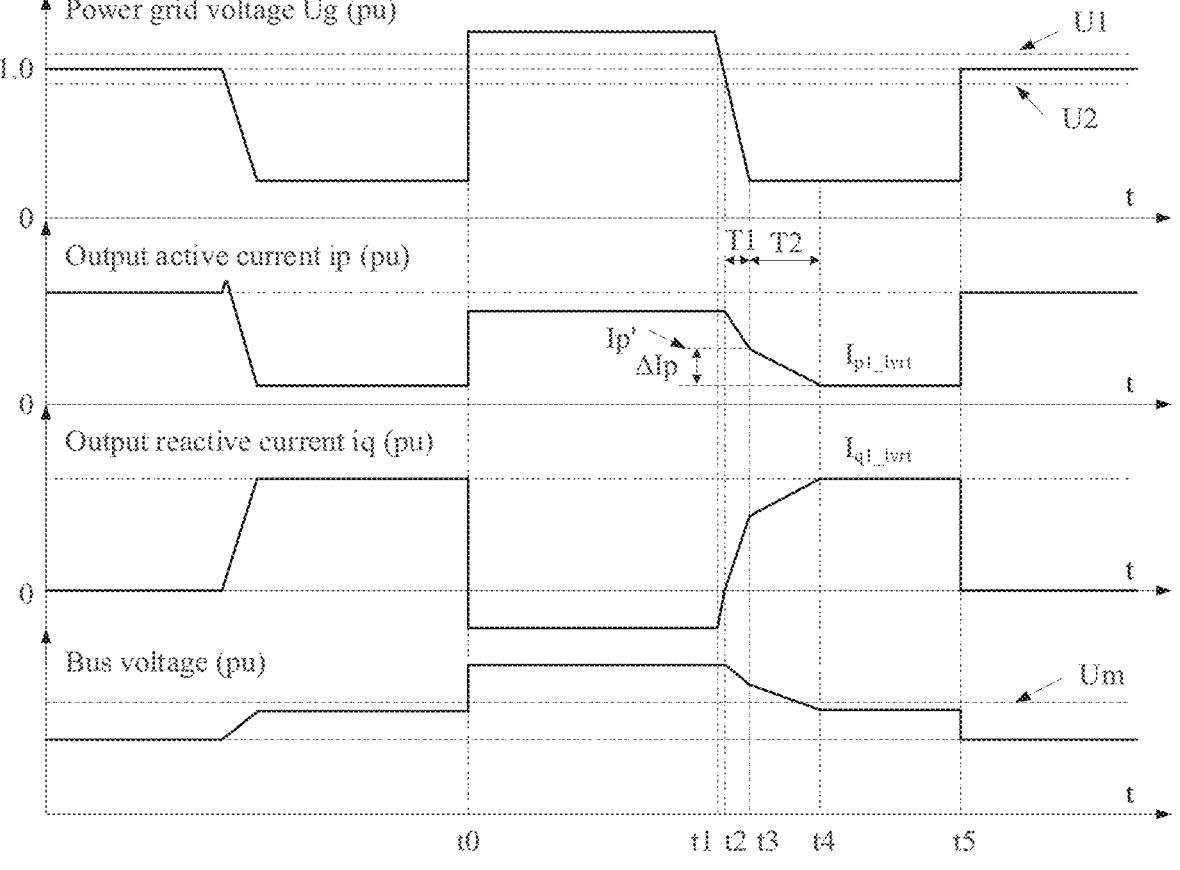
Figure 6:
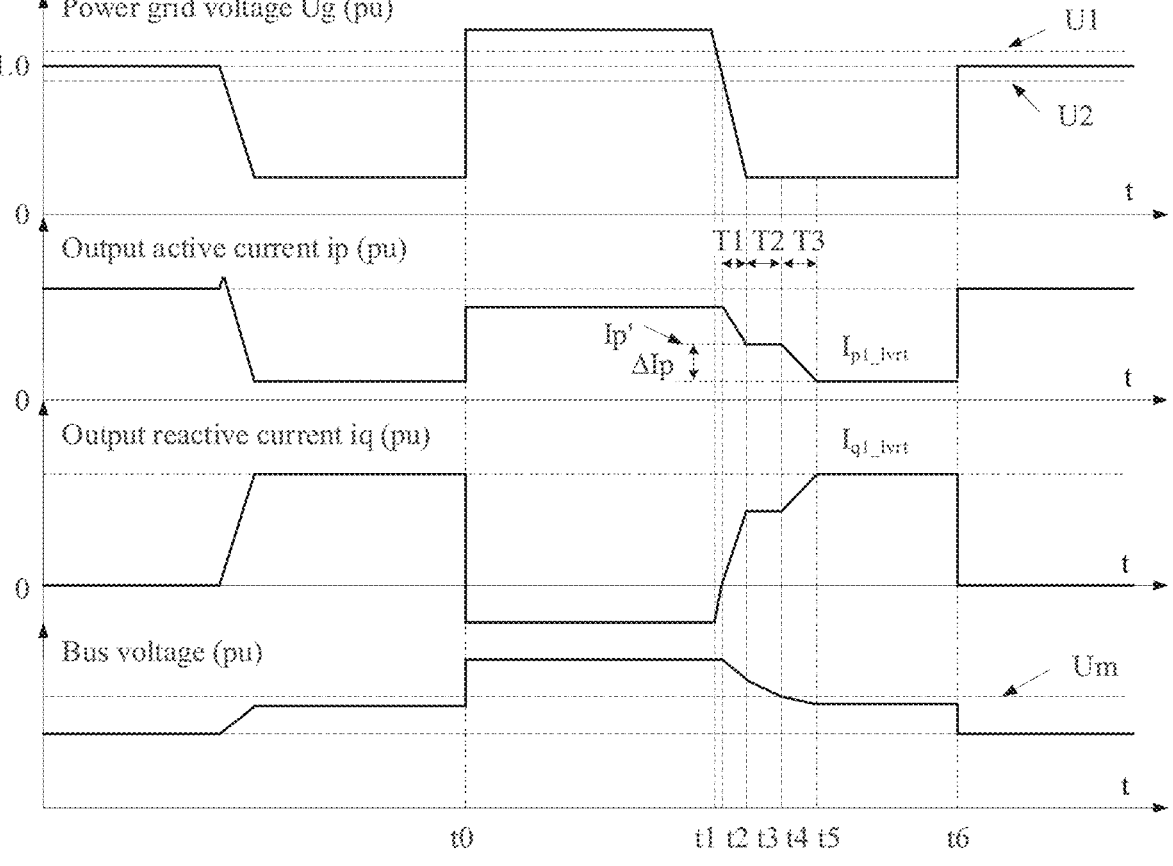
Figure 7:
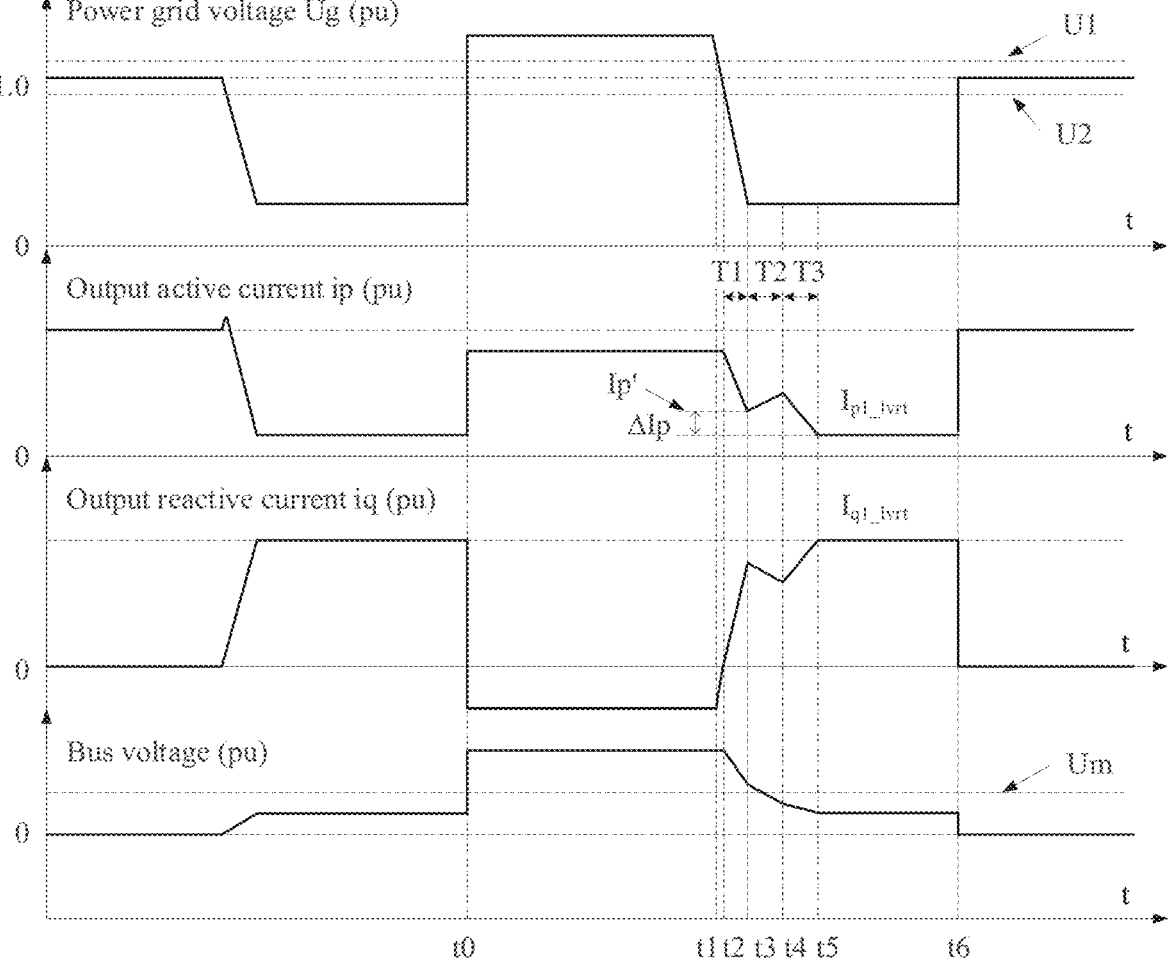
Figure 8:
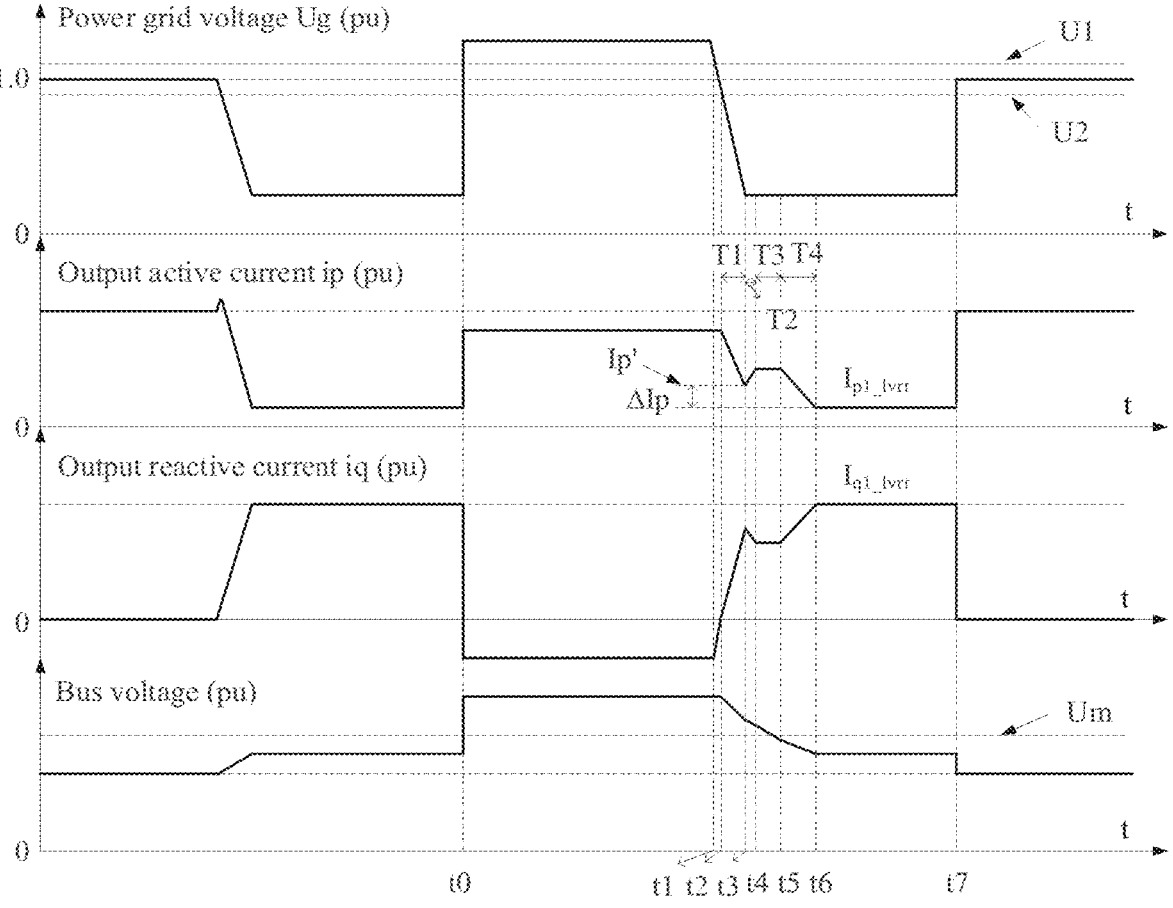
Figure 9:
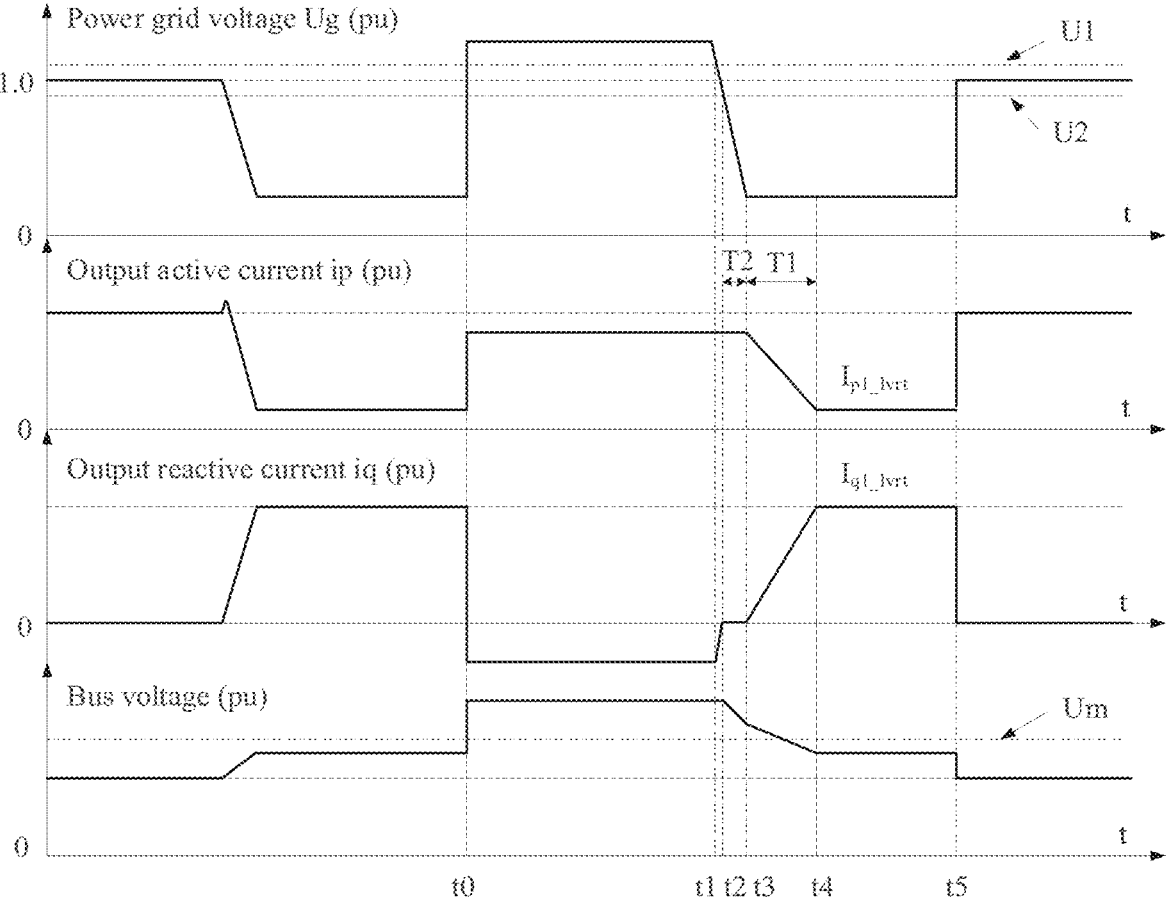
Figure 10:
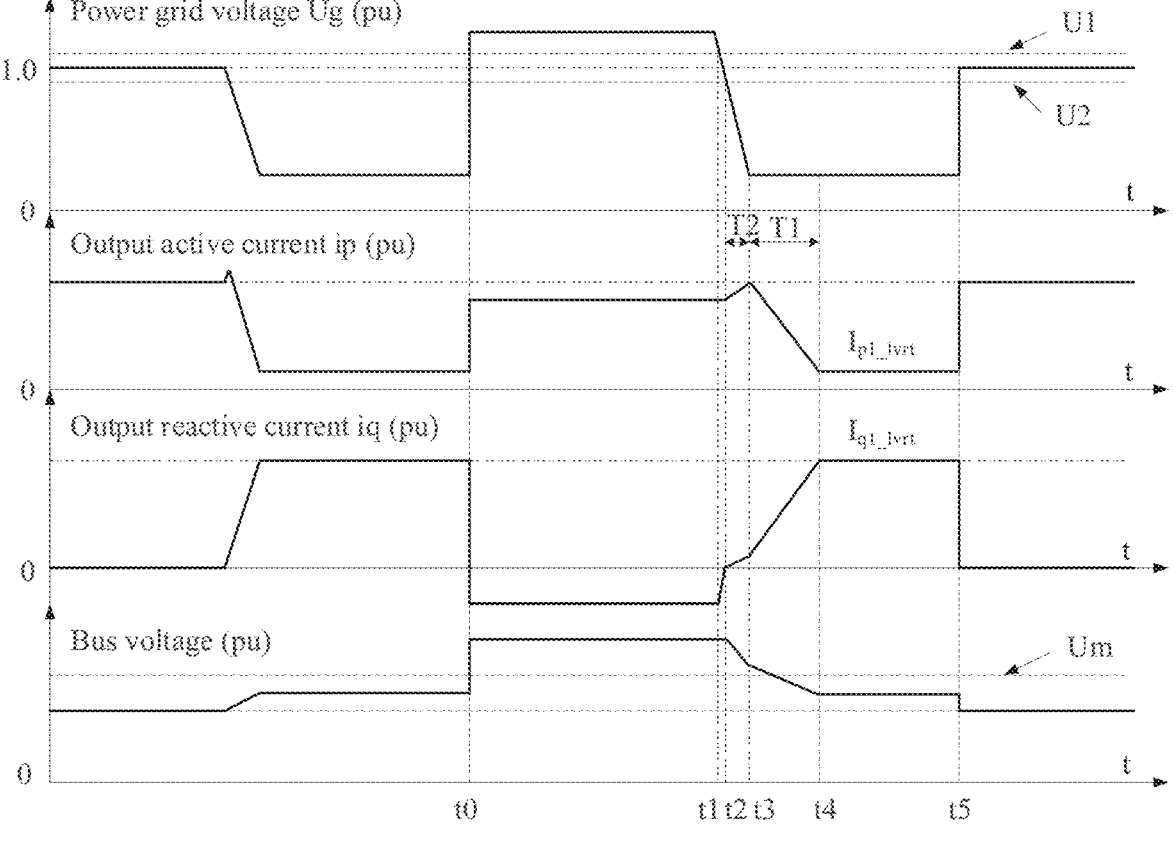
Figure 11:
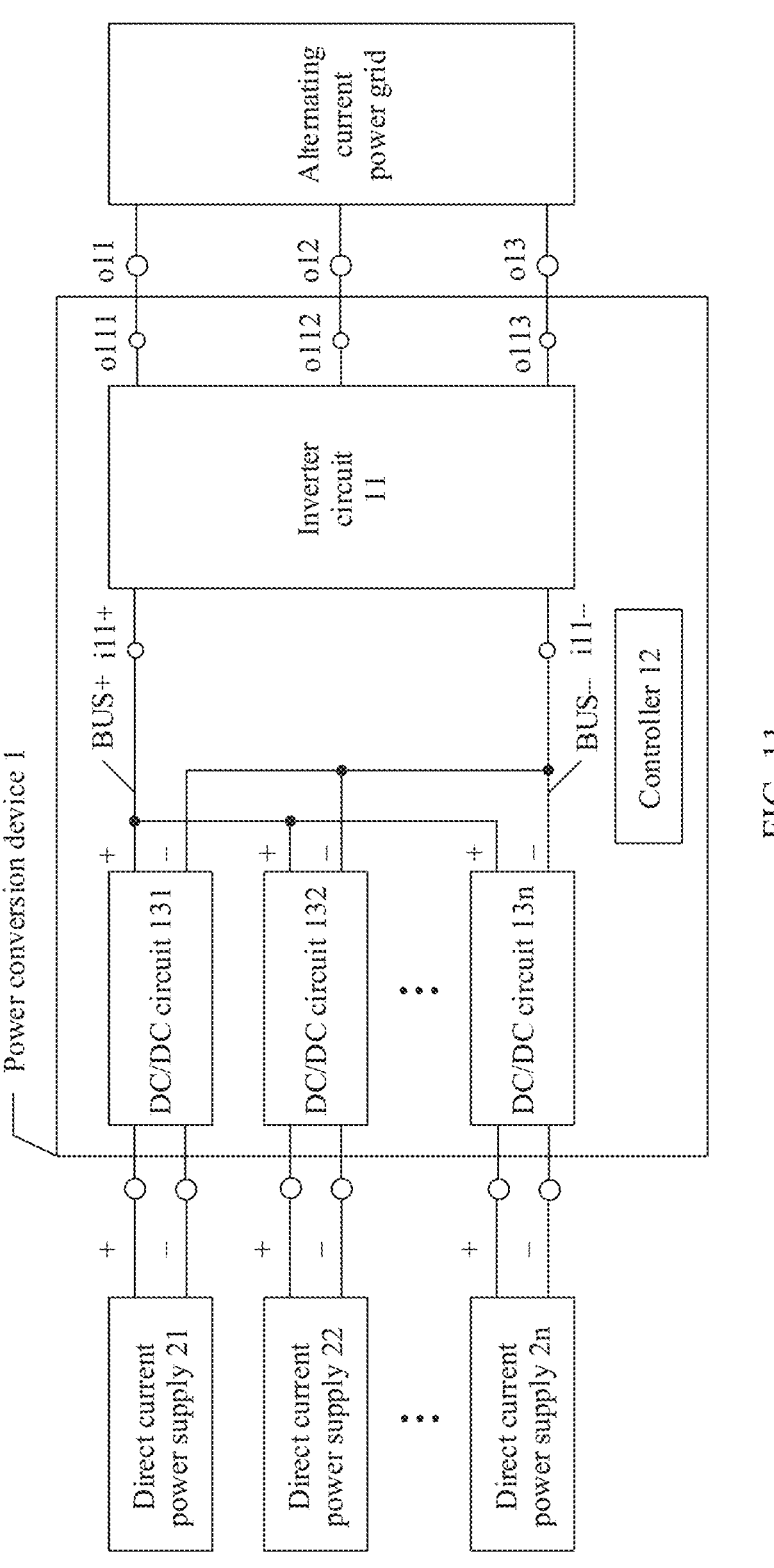
Figure 14:
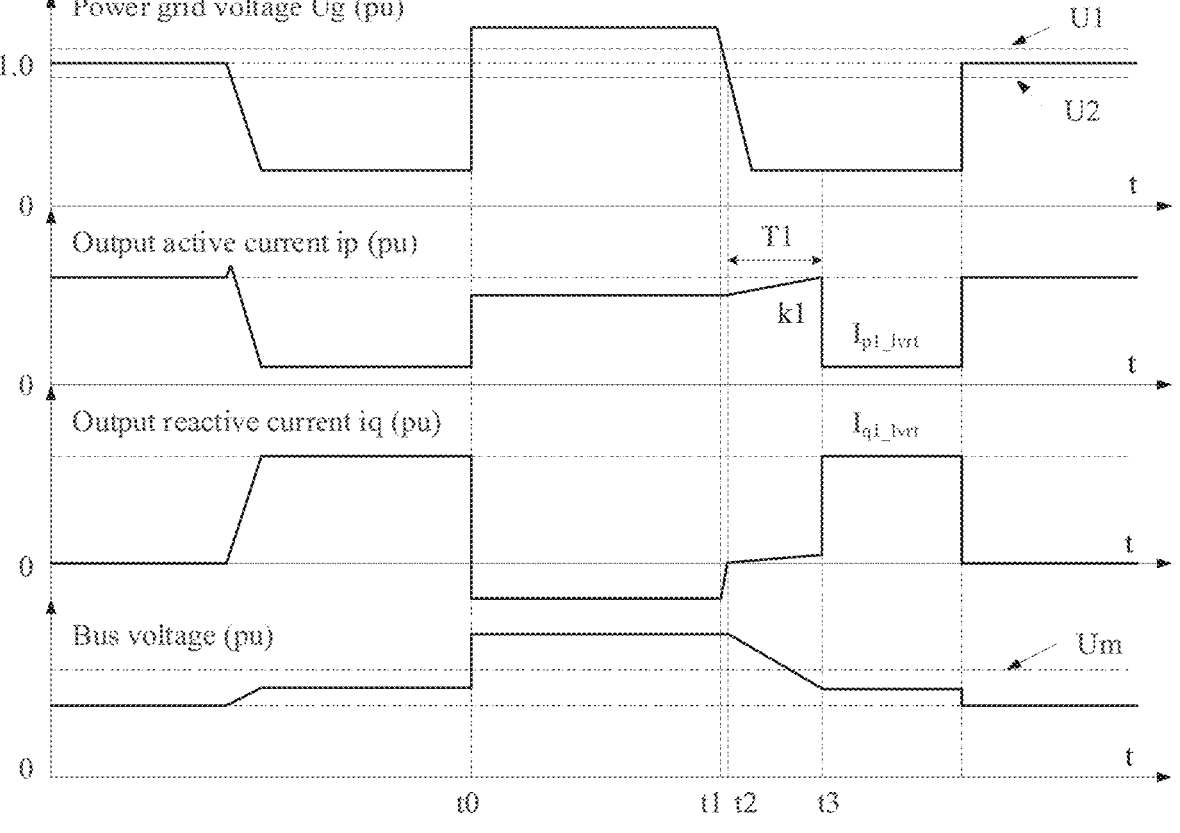
Figure 15:
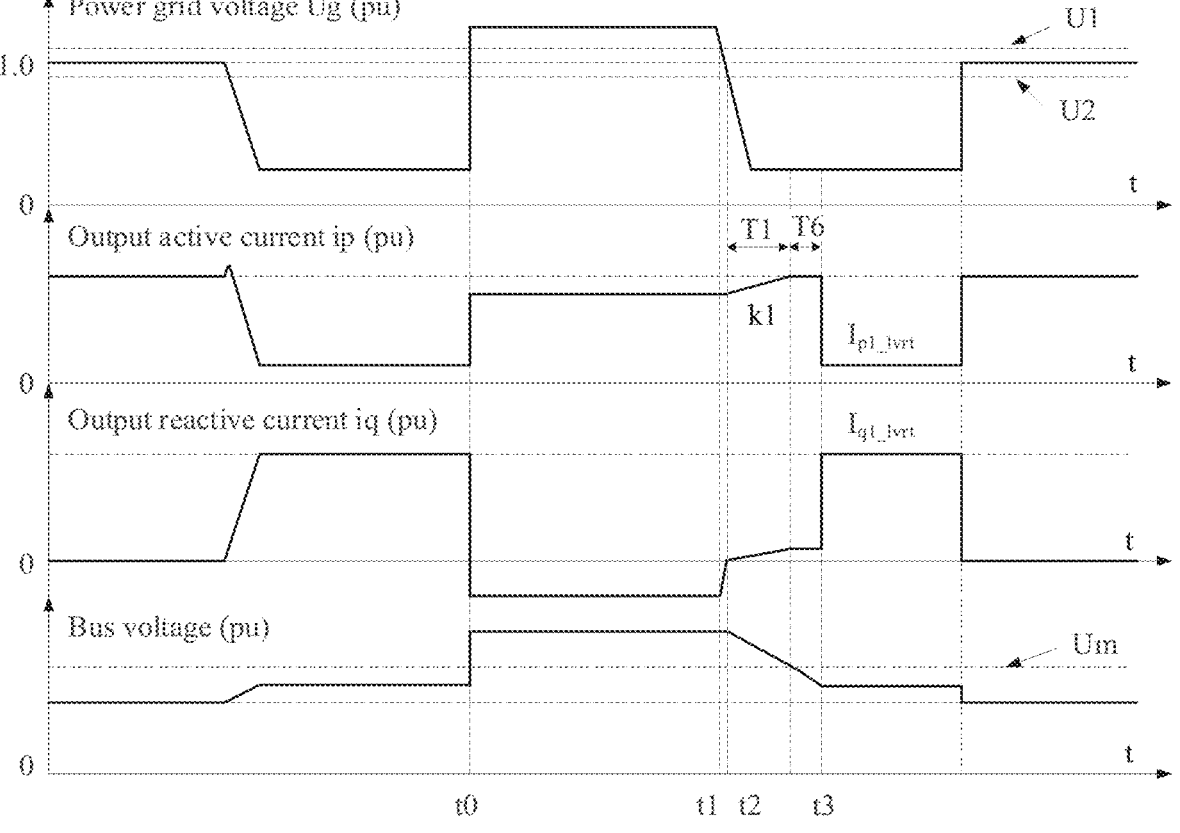
Figure 16:
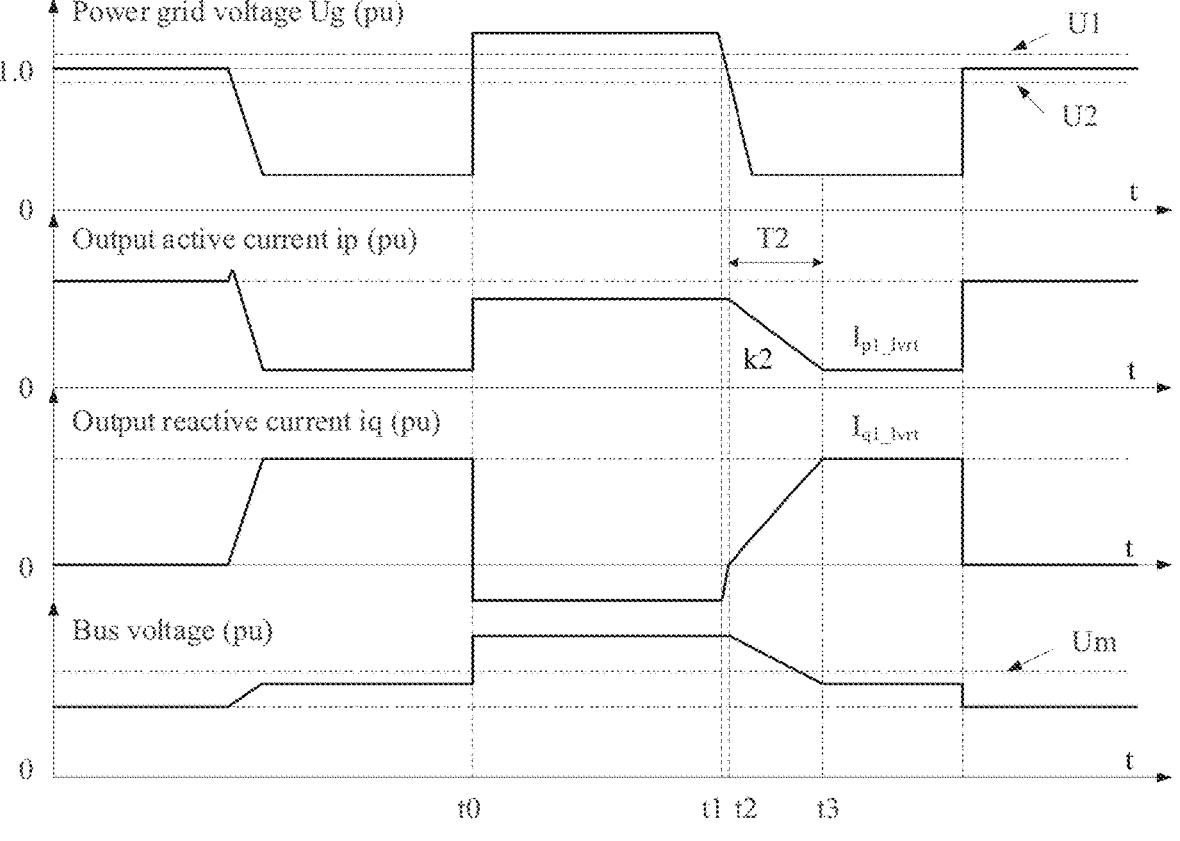
Figure 17:
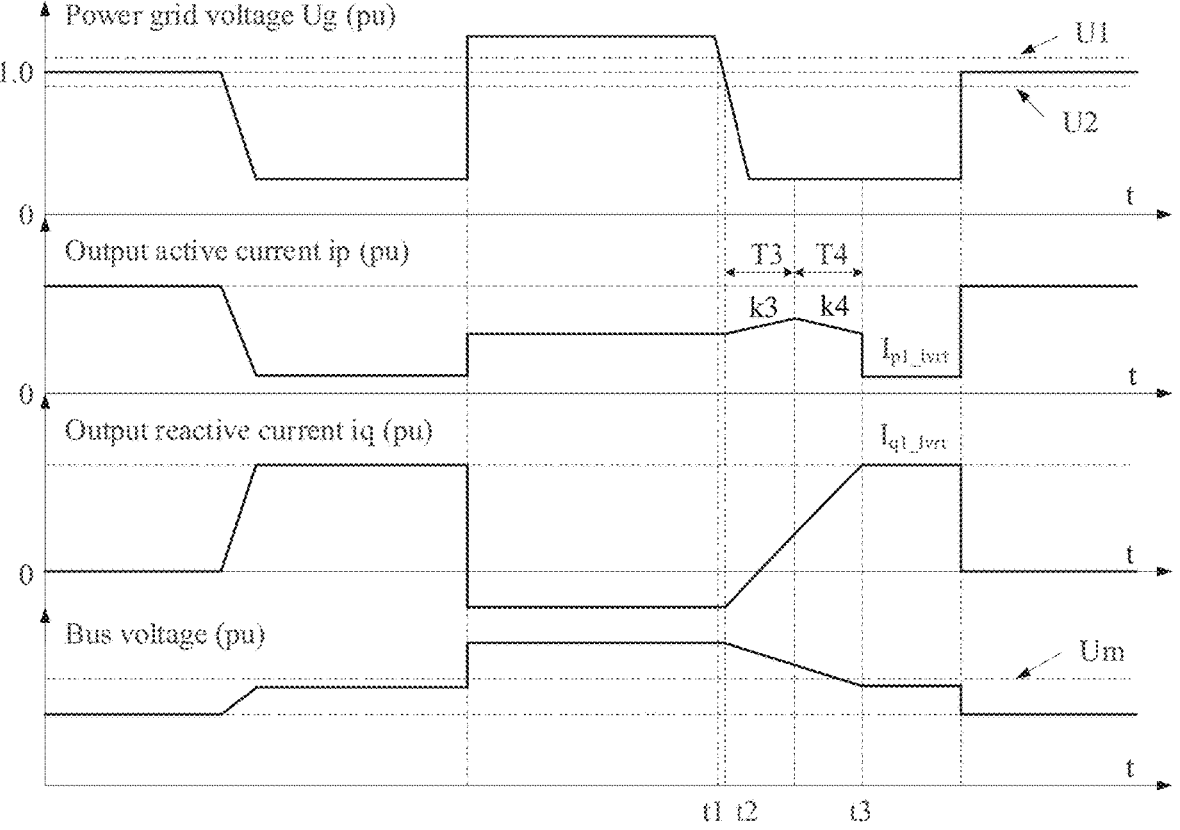
Figure 18:
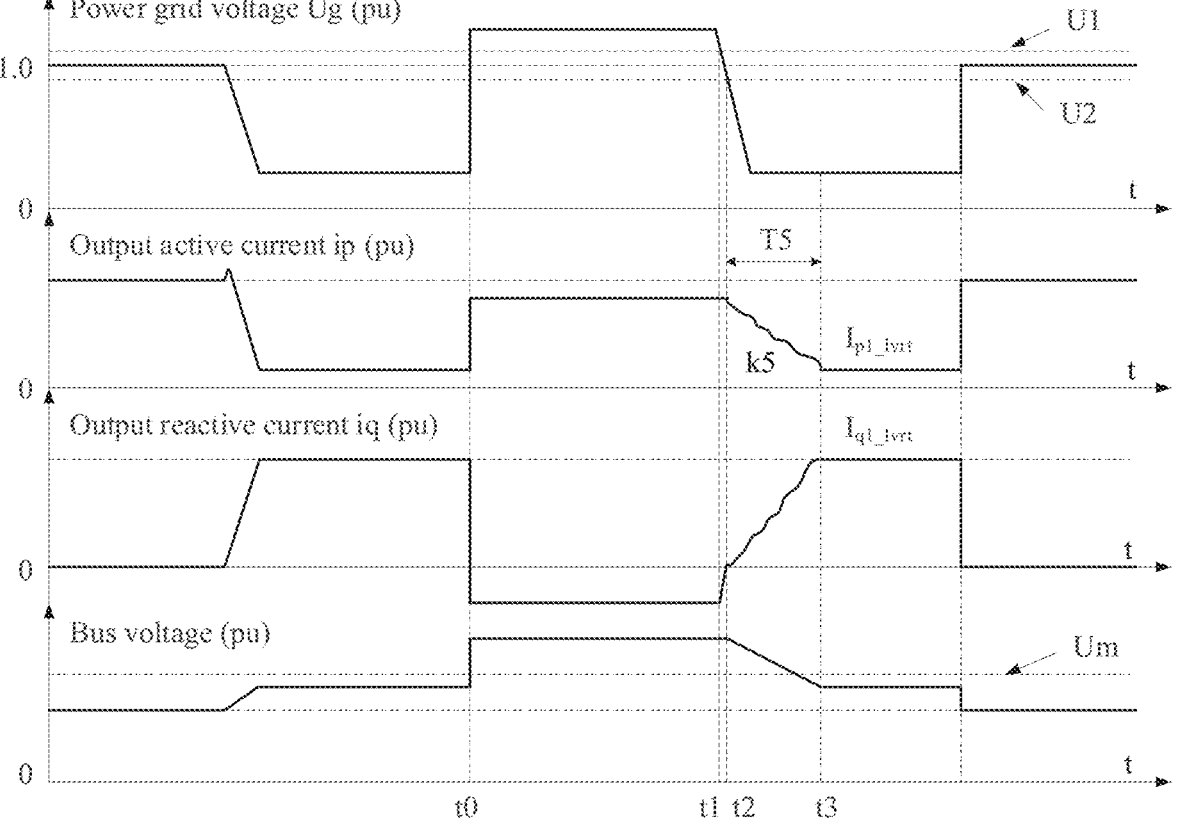

FIG. 4 is a schematic diagram of another structure of a power conversion device according to this application;
FIG. 5 is a control sequence diagram of a power conversion device according to this application;
FIG. 6 is another control sequence diagram of a power conversion device according to this application;
FIG. 7 is another control sequence diagram of a power conversion device according to this application;
FIG. 8 is another control sequence diagram of a power conversion device according to this application;
FIG. 9 is another control sequence diagram of a power conversion device according to this application;
FIG. 10 is still another control sequence diagram of a power conversion device according to this application;
FIG. 11 is a schematic diagram of still another structure of a power conversion device according to this application;
FIG. 12 is a schematic flowchart of a control method of a power conversion device according to this application;
FIG. 13 is a diagram illustrating a principle of calculating a quantity of electric charges of a capacitor according to this application;
FIG. 14 is another control sequence diagram of a power conversion device according to this application;
FIG. 15 is another control sequence diagram of a power conversion device according to this application;
FIG. 16 is another control sequence diagram of a power conversion device according to this application;
FIG. 17 is another control sequence diagram of a power conversion device according to this application;
FIG. 18 is another control sequence diagram of a power conversion device according to this application; and
FIG. 19(a) to FIG. 19(c) each show another control sequence diagram of a power conversion device according to this application.

DESCRIPTION OF EMBODIMENTS

A power conversion device provided in this application is applicable to the field of new energy intelligent microgrids, the field of power transmission and distribution, the field of new energy (for example, the field of photovoltaic grid connection, the field of wind grid connection), the field of photovoltaic power generation, the field of energy storage power generation, the field of wind power generation, and other application fields. The power conversion device provided in this application may be an inverter (including a string inverter and a central inverter), an energy storage converter, an uninterrupted power supply (UPS), or the like. The power conversion device is applicable to different application scenarios, for example, a photovoltaic power supply scenario (including large-scale photovoltaic power station scenarios, small and medium-sized distributed photovoltaic power station scenarios, household photovoltaic system scenarios, and the like), an energy storage power supply scenario (including large-scale energy storage power station scenarios, small and medium-sized distributed energy storage power station scenarios, household photovoltaic energy storage power generation system scenarios, and the like), an uninterrupted power supply (UPS) power supply scenario, and the like. The following uses the photovoltaic power supply scenario as an example for description.

Figure 1:
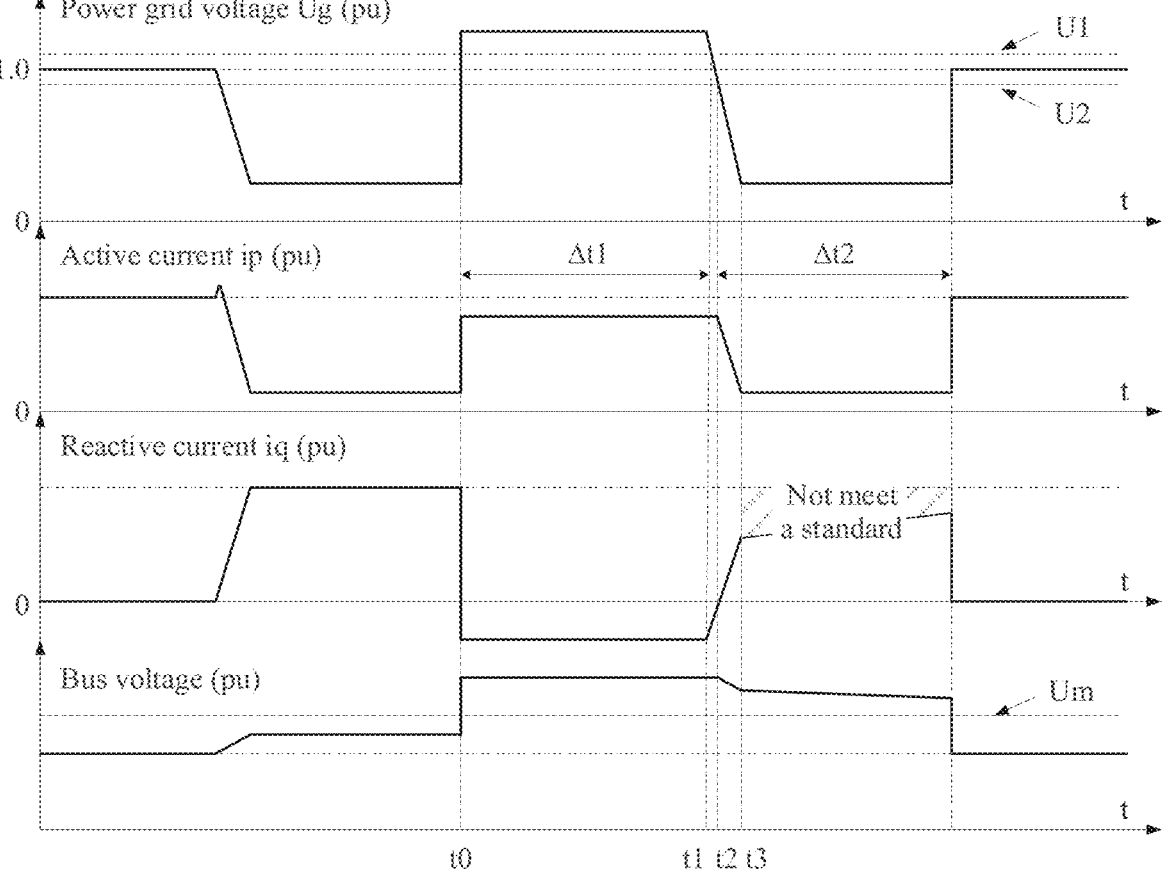
FIG. 1 is a control sequence diagram of an inverter according to a conventional technology.
Figure 2:
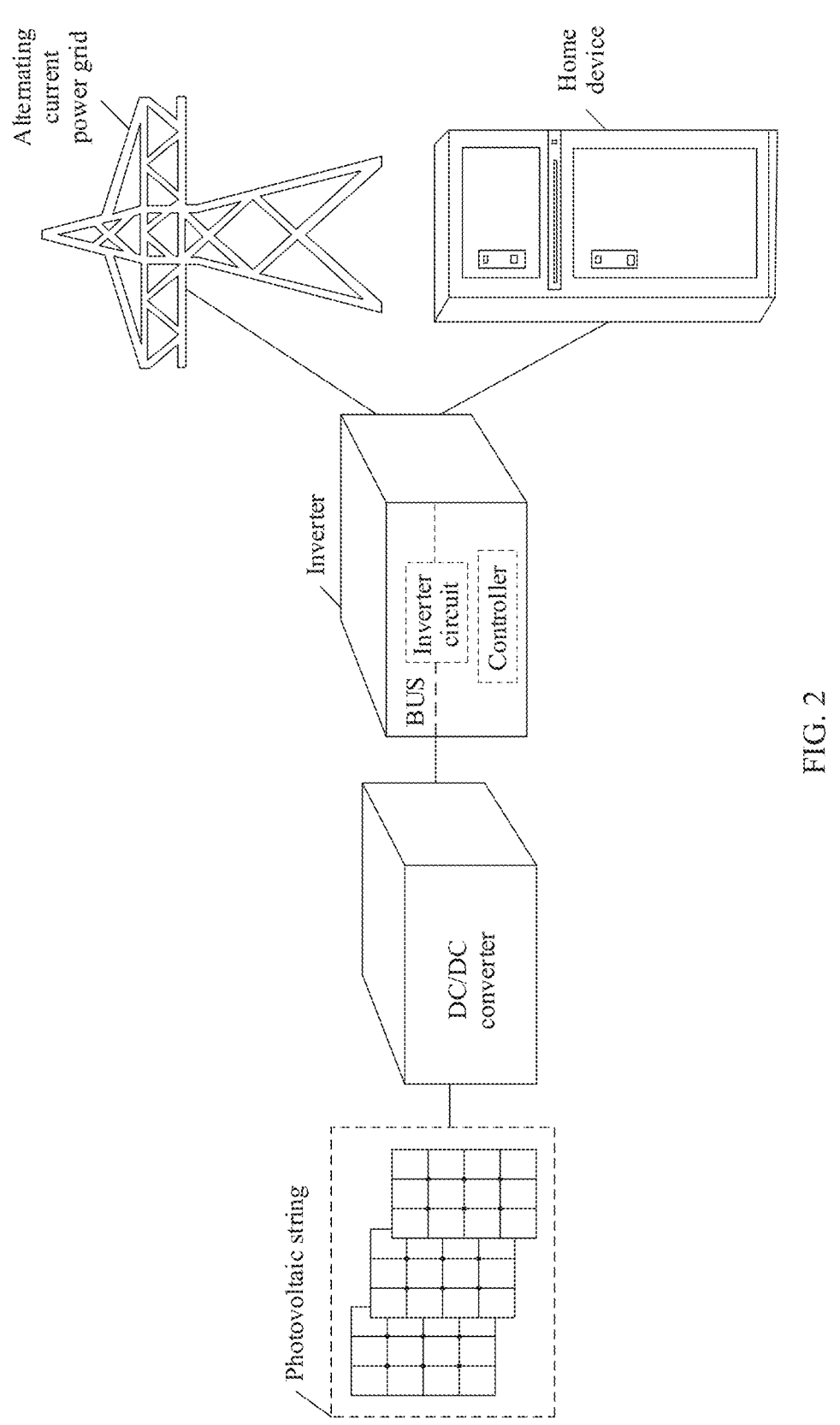
FIG. 2 is a schematic diagram of an application scenario of a power conversion device according to this application.

FIG. 2 is a schematic diagram of an application scenario of the power conversion device according to this application. In the photovoltaic power supply scenario, the power conversion device provided in this application may be an inverter shown in FIG. 1. An input end of the inverter is connected to a photovoltaic string through a direct current DC/direct current DC converter, and an output end is connected to an alternating current power grid, a household device, an industrial electrical device, or the like. The inverter includes a direct current bus BUS, an inverter circuit, and a controller. An input end of the inverter circuit is connected to the input end of the inverter through the direct current bus BUS, and an output end is connected to the output end of the inverter. After a photovoltaic power supply system that includes the DC/DC converter and the inverter starts to run, the DC/DC converter performs direct current conversion on a direct current generated by the photovoltaic string connected to an input end of the DC/DC converter, and outputs a direct current to the inverter. The controller in the inverter controls the inverter circuit, so that the inverter inverts, into an alternating current, the direct current that is input at the input end of the inverter and that is obtained through direct current conversion, to supply power to multiple types of electrical devices such as the alternating current power grid or an alternating current load (for example, the household device). In addition, the controller controls the inverter to be in a high voltage ride through state when a power grid voltage of the alternating current power grid is greater than a high voltage ride through voltage threshold, and controls the inverter to be in a low voltage ride through state when the power grid voltage of the alternating current power grid is less than a low voltage ride through voltage threshold. After the inverter switches from the high voltage ride through state to the low voltage ride through state, the controller controls a change rate of an output active current of the inverter circuit to be a first change rate in a first time interval and a second change rate in a second time interval respectively in a low voltage ride through reactive current response process. The second change rate is greater than the first change rate. A sum of first interval duration of the first time interval and second interval duration of the second time interval is less than or equal to a low voltage ride through reactive current response duration threshold. It may be understood that if the first change rate corresponds to a change rate of the output active current of the inverter circuit in a reactive-before-active control mode, in the low voltage ride through reactive current response process after the inverter switches from the high voltage ride through state to the low voltage ride through state, because the output active current of the inverter circuit decreases with time in the first time interval, the first change rate is less than 0. Based on this, in the second time interval, the change rate of the output active current of the inverter circuit is controlled to be the second change rate greater than the first change rate, so that a decrease speed of the output active current of the inverter circuit in the second time interval is less than a decrease speed of the output active current of the inverter circuit in the reactive-before-active control mode, and a voltage of the direct current bus quickly decreases in the low voltage ride through reactive current response process and is less than a low voltage ride through derating threshold. Therefore, the output reactive current of the inverter circuit meets a standard low voltage ride through reactive current requirement at the end of the low voltage ride through reactive current response process. On the contrary, if the second change rate corresponds to the change rate of the output current of the inverter circuit in the reactive-before-active control mode, in the low voltage ride through reactive current response process, the inverter controls, in the first time interval, the change rate of the output active current of the inverter circuit to be the first change rate less than the second change rate, so that a decrease speed of the bus voltage can be reduced. Therefore, a manner of controlling the voltage of the direct current bus by the inverter is more flexible. Further, adaptability of the inverter switching from the high voltage ride through state to the low voltage ride through state can be improved. The reactive-before-active control mode is a short name of a control mode in which an output reactive current of the inverter circuit is controlled first and then an output active current is controlled. The foregoing description is merely an example of an application scenario of the power conversion device provided in this application, and is not exhaustive. The application scenario is not limited in this application.

With reference to FIG. 3 to FIG. 11, the following describes an example of a working principle of the power conversion device provided in this application.

Figure 3:
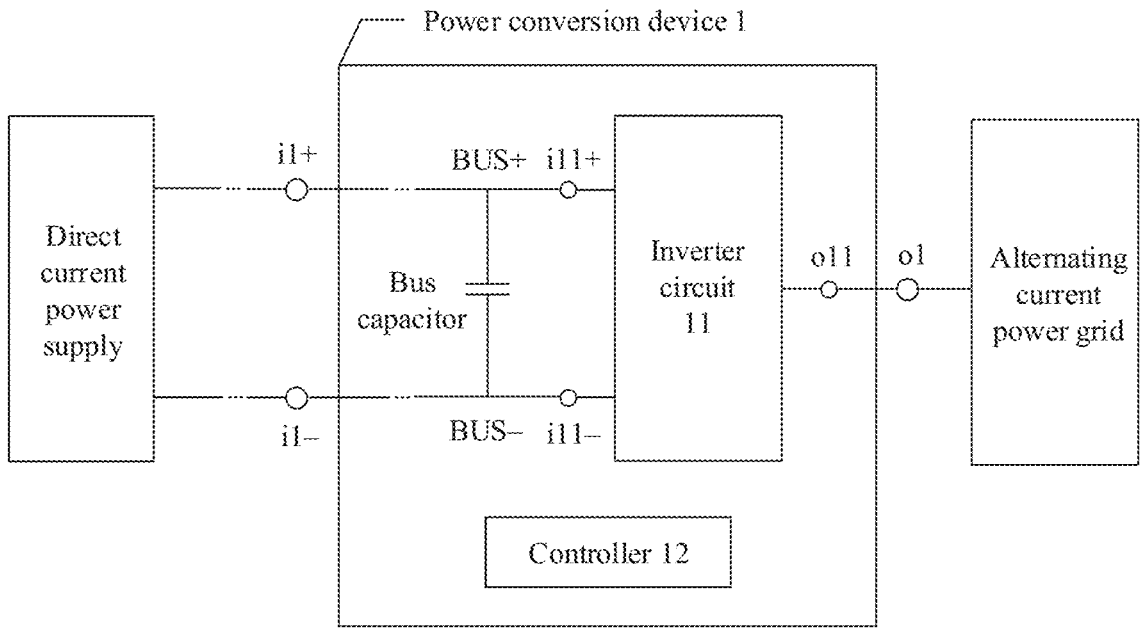
FIG. 3 is a schematic diagram of a structure of a power conversion device according to this application.

FIG. 3 is a schematic diagram of a structure of a power conversion device according to this application. As shown in FIG. 3, an input end i1+ and an input end i1− of the power conversion device 1 are configured to connect to a direct current power supply, and an output end o1 is configured to connect to an alternating current power grid. The power conversion device 1 includes direct current buses BUS (namely, a positive direct current bus BUS+ and a negative direct current bus BUS−), an inverter circuit 11, and a controller 12. An input end i11+ of the inverter circuit 11 is connected to the input end i1+ of the power conversion device 1 through the positive direct current bus BUS+. An input end i11− of the inverter circuit 11 is connected to the input end i1− of the power conversion device 1 through the negative direct current bus BUS−. An output end o11 of the inverter circuit 11 is connected to the output end o1 of the power conversion device 1.

In an optional implementation, after the power conversion device 1 starts to work, the controller 12 controls the power conversion device 1 to be in a high voltage ride through state when a power grid voltage of the alternating current power grid is greater than a high voltage ride through voltage threshold, and controls the power conversion device 1 to be in a low voltage ride through state when the power grid voltage of the alternating current power grid is less than a low voltage ride through voltage threshold. After the power conversion device 1 switches from the high voltage ride through state to the low voltage ride through state, the controller 12 controls a change rate of an output active current of the inverter circuit 11 to be a first change rate in a first time interval and a second change rate in a second time interval respectively in a low voltage ride through reactive current response process. The second change rate is greater than the first change rate. A sum of first interval duration of the first time interval and second interval duration of the second time interval is less than or equal to a low voltage ride through reactive current response duration threshold.

In this embodiment of this application, if the first change rate corresponds to a change rate of the output active current of the inverter circuit 11 in a reactive-before-active control mode, in the low voltage ride through reactive current response process, the power conversion device 1 controls the second change rate of the output active current of the inverter circuit 11 in the second time interval to be greater than the first change rate, so that a decrease speed of the output active current of the inverter circuit 11 in the second time interval is less than a decrease speed of the output active current of the inverter circuit 11 in the reactive-before-active control mode, and a bus voltage of the direct current bus BUS quickly decreases in the low voltage ride through reactive current response process and is less than a low voltage ride through derating threshold. Therefore, the output reactive current of the inverter circuit 11 meets a standard low voltage ride through reactive current requirement at the end of the low voltage ride through reactive current response process. On the contrary, if the second change rate corresponds to the change rate of the output current of the inverter circuit 11 in the reactive-before-active control mode, in the low voltage ride through reactive current response process, the power conversion device 1 controls, in the first time interval, the change rate of the output active current of the inverter circuit 11 to be the first change rate less than the second change rate, so that a decrease speed of the bus voltage can be reduced. Therefore, a manner of controlling the bus voltage by the power conversion device 1 is more flexible. Further, adaptability of the power conversion device 1 can be improved.

It should be noted that a connection between A and B in this application may be a direct connection between A and B, or may be an indirect connection between A and B through C. This is not limited in this application.

FIG. 4 is a schematic diagram of another structure of a power conversion device according to this application. As shown in FIG. 4, an input end i1+ and an input end i1− of the power conversion device 1 are connected to a direct current power supply through a DC/DC converter, and output ends o11, o12, and o13 are connected to an alternating current power grid. The power conversion device 1 includes a positive direct current bus BUS+, a negative direct current bus BUS−, an inverter circuit 11, and a controller 12. An input end i11+ of the inverter circuit 11 is connected to the input end i1+ of the power conversion device 1 through the positive direct current bus BUS+. An input end i11− of the inverter circuit 11 is connected to the input end i1− of the power conversion device 1 through the negative direct current bus BUS−. Output ends o111, o112, and o113 of the inverter circuit 11 are connected to the output ends o11, o12, and o13 of the power conversion device 1 respectively.

After the power conversion device 1 starts to work, the controller 12 controls the power conversion device to be in a high voltage ride through state when a power grid voltage of the alternating current power grid is greater than a high voltage ride through voltage threshold, and controls the power conversion device to be in a low voltage ride through state when the power grid voltage of the alternating current power grid is less than a low voltage ride through voltage threshold. For example, the high voltage ride through state is a standard high voltage ride through mode. After the power grid voltage of the alternating current power grid changes from being greater than the high voltage ride through voltage threshold to being less than the low voltage ride through voltage threshold, that is, after the power conversion device 1 switches from the high voltage ride through state to the low voltage ride through state, the controller 12 controls a change rate of an output active current of the inverter circuit 11 to be a first change rate in a first time interval and a second change rate in a second time interval respectively in a low voltage ride through reactive current response process. The second change rate is greater than the first change rate. A sum of first interval duration of the first time interval and second interval duration of the second time interval is less than or equal to a low voltage ride through reactive current response duration threshold.

For ease of description, the following describes an example in which the first change rate is a change rate of the output active current of the inverter circuit 11 in a reactive-before-active control mode. Specifically, the controller 12 determines a first target active current value in the first time interval based on a first target reactive current value and a preset maximum output current value, and controls the output active current of the inverter circuit 11 based on the first target active current value, to enable the change rate of the output active current of the inverter circuit 11 to be the first change rate. In addition, the controller 12 further controls an output reactive current of the inverter circuit 11 in the first time interval based on the first target reactive current value, and controls the output reactive current of the inverter circuit 11 in the second time interval based on a second target reactive current value. The first target reactive current value is determined based on a voltage sag value of the alternating current power grid. The second target reactive current value is determined based on the second target active current value and the preset maximum output current value. It should be noted that the first time interval may be earlier than the second time interval, or may be later than the second time interval.

In an optional implementation, the first time interval is earlier than the second time interval. In the first time interval in the low voltage ride through reactive current response process, the controller 12 determines the first target active current value based on the first target reactive current value and the preset maximum output current value, and controls the output active current of the inverter circuit 11 based on the first target active current value, to enable the change rate of the output active current of the inverter circuit 11 to be the first change rate. The controller 12 further determines the first target reactive current value in the first time interval based on the voltage sag value of the alternating current power grid, and controls the output reactive current of the inverter circuit 11 based on the first target reactive current value. Then, the controller 12 controls the output active current of the inverter circuit 11 in the second time interval in the low voltage ride through reactive current response process based on the second target active current value; and in the process of controlling the output active current of the inverter circuit 11 based on the second target active current value, adjusts the second target active current value to decrease from a first active current value to the first target active current value, to enable the change rate of the output active current of the inverter circuit 11 to be the second change rate. The first active current value is a sum of the first target active current value and a preset active current increment. The preset active current increment is determined based on a rated output current value of the inverter circuit 11 and a preset bus voltage attenuation coefficient. The controller 12 further determines the second target reactive current value in the second time interval based on the second target active current value and the preset maximum output current value, and controls the output reactive current of the inverter circuit 11 based on the second target reactive current value.

In an embodiment, after the power grid voltage of the alternating current power grid decreases from being greater than the high voltage ride through voltage threshold to being less than the low voltage ride through voltage threshold, that is, after the power conversion device 1 switches from the high voltage ride through state to the low voltage ride through state, in the first time interval in the low voltage ride through reactive current response process, the controller 12 obtains a target reactive current increment based on the voltage sag value, and obtains the first target reactive current value based on an initial target reactive current value and the target reactive current increment, to obtain the first target active current value based on the first target reactive current value and the preset maximum output current value. Further, the controller 12 obtains a first target output voltage value based on the first target active current value and the first target reactive current value, and controls an output voltage of the inverter circuit 11 based on the first target output voltage value, so that the controller 12 controls the output active current and the output reactive current of the inverter circuit 11 based on the first target active current value and the first target reactive current value respectively. Then, in the second time interval in the low voltage ride through reactive current response process, the controller 12 obtains the preset active current increment based on the rated output current value of the inverter circuit 11 and the preset bus voltage attenuation coefficient, and determines a sum of the preset active current increment and the first target active current value as the first active current value. The controller 12 further obtains the second target reactive current value based on the second target active current value and the preset maximum output current value. Then, the controller 12 obtains a second target output voltage value based on the second target active current value and the second target reactive current value, and controls the output voltage of the inverter circuit 11 based on the second target output voltage value, so that the controller 12 controls the output active current and the output reactive current of the inverter circuit 11 based on the second target active current value and the second target reactive current value respectively. In the process of controlling the output active current of the inverter circuit 11 based on the second target active current value, the controller 12 performs at least two current value adjustments on the second target active current value, so that the second target active current value decreases from the first active current value to the first target active current value. Further, the controller 12 controls the output active current of the inverter circuit 11 in the second time interval, so that an output active current value of the inverter circuit 11 decreases to the first target active current value in the second time interval. Optionally, a manner in which the controller 12 adjusts the second target active current value to decrease from the first active current value to the first target active current value may alternatively be performed through one current value adjustment on the second target active current value. In this manner, an output active current curve of the inverter circuit 11 is a curve with a vertical decrease from the first active current value to the first target active current value.

Specifically, after the power conversion device 1 switches from the high voltage ride through state to the low voltage ride through state, in the first time interval in the low voltage ride through reactive current response process, the controller 12 obtains the target reactive current increment $\Delta I_q = K*(U_1 - U_T)*I_N$ through calculation based on the voltage sag value $U_T$, the low voltage ride through voltage threshold $U_1$, and the rated output current value $I_N$ of the inverter circuit 11, where $U_T$ is specifically a ratio of an actual positive sequence voltage value of the inverter circuit 11 to a rated output voltage value, and K is a ratio value of an output dynamic reactive current of the inverter circuit 11 to a voltage change. For example, a value of K ranges from 0 to 10. During actual application, 20% voltage ride through requires the target reactive current increment of $1.05I_N$ in most scenarios. Then, the controller 12 obtains the first target reactive current value $I_{q1\_lvrt} = I_{q0} + \Delta I_g$ based on the initial target reactive current value $I_{q0}$ and the target reactive current increment $\Delta I_q$, where the initial target reactive current value $I_{q0}$ is a target reactive current value at a switching moment when the power conversion device 1 switches from the high voltage ride through state to the low voltage ride through state. Therefore, the controller 12 substitutes $I_q = I_{q1\_lvrt}$ into a formula $I_q^2 + I_p^2 = I_M^2$ to obtain the first target active current value $I_{p1\_lvrt}$ through calculation, where $I_M$ is the preset maximum output current value, $I_M = k1*I_N$, and $1 \le k1 \le 1.2$.

Then, the controller 12 inputs the first target reactive current value $I_{q1\_lvrt}$, the first target active current value $I_{p1\_lvrt}$, an actual active current value, and an actual reactive current value of the inverter circuit 11 into a current control loop to obtain a first q-axis voltage increment and a first d-axis voltage increment. The controller 12 further obtains a power grid voltage value of the alternating current power grid, and obtains a q-axis power grid voltage component and a d-axis power grid voltage component based on the power grid voltage value, to calculate a sum of the first q-axis voltage increment and the q-axis power grid voltage component to obtain a first target q-axis voltage value, and to calculate a sum of the first d-axis voltage increment and the d-axis power grid voltage component to obtain a first target d-axis voltage value. Therefore, the controller 12 performs dq/abc coordinate transformation on the first target q-axis voltage value and the first target d-axis voltage value to obtain the first target output voltage value, and controls the output voltage of the inverter circuit 11 based on the first target output voltage value, so that the controller 12 controls the output active current and the output reactive current of the inverter circuit 11 based on the first target active current value $I_{p1\_lvrt}$ and the first target reactive current value $I_{q1\_lvrt}$ respectively.

Then, in the second time interval in the low voltage ride through reactive current response process, the controller 12 obtains the preset active current increment $\Delta I_p = \alpha*I_N$ based on the rated output current value $I_N$ of the inverter circuit 11 and the preset bus voltage attenuation coefficient $\alpha$, to obtain the first active current value $I_{p1} = I_{p1\_lvrt} + \Delta I_p$. The controller 12 further obtains the second target reactive current value $I_{q2\_lvrt} = \sqrt{I_M^2 - I_{p2\_lvrt}^2}$ through calculation based on the second target active current value $I_{p2\_lvrt}$ and the preset maximum output current value $I_M$. Then, the controller 12 inputs the second target reactive current value $I_{q2\_lvrt}$, the second target active current value $I_{p2\_lvrt}$, the actual active current value, and the actual reactive current value of the inverter circuit 11 into the current control loop to obtain a second q-axis voltage increment and a second d-axis voltage increment. The controller 12 further obtains the power grid voltage value of the alternating current power grid, and obtains the q-axis power grid voltage component and the d-axis power grid voltage component based on the power grid voltage value, to calculate a sum of the second q-axis voltage increment and the q-axis power grid voltage component to obtain a second target q-axis voltage value, and to calculate a sum of the second d-axis voltage increment and the d-axis power grid voltage component to obtain a second target d-axis voltage value. Then, the controller 12 performs dq/abc coordinate transformation on the second target q-axis voltage value and the second target d-axis voltage value to obtain the second target output voltage value, and controls the output voltage of the inverter circuit 11 based on the second target output voltage value, so that the controller 12 controls the output active current and the output reactive current of the inverter circuit 11 based on the second target active current value $I_{p2\_lvrt}$ and the second target reactive current value $I_{q2\_lvrt}$ respectively.

$0 < \alpha \le 1$. In addition, a larger preset bus voltage attenuation coefficient $\alpha$ indicates a slower decrease speed of the output active current of the inverter circuit 11 in the second time interval and a faster decrease speed of a bus voltage of a direct current bus BUS. The current control loop may be any one of the following: a PI controller, a PD controller, and a PID controller.

It should be noted that a manner in which the controller 12 adjusts the second target active current value to decrease from the first active current value to the first target active current value may be a linear decrease manner. Herein, the controller 12 adjusts the second target active current value in the linear decrease manner rather than a non-linear decrease manner, so that the output active current value of the inverter circuit 11 can more evenly decrease. This avoids a sudden change of the output active current of the inverter circuit 11 during continuous ride through from a high voltage to a low voltage, and simultaneously reduces the bus voltage of the direct current bus BUS at a fast speed and makes the bus voltage of the direct current bus BUS less than a low voltage ride through derating threshold, so that applicability is higher. In addition, the first time interval and the second time interval constitute a low voltage ride through reactive current response phase. The first interval duration of the first time interval and the second interval duration of the second time interval may be adaptively adjusted based on an actual application scenario. For example, in a scenario in which the bus voltage needs to more quickly decrease, the first interval duration of the first time interval may be appropriately shortened, and the second interval duration of the second time interval may be appropriately prolonged.

In addition, in this implementation, a specific manner of obtaining the first target reactive current value is described in a manner of determining the first target reactive current value based on the voltage sag value of the alternating current power grid. In this application, the controller 12 may alternatively determine the first target reactive current value based on a target reactive current increment of a preset time length. Specifically, the first target reactive current value in the first time interval varies with time, and the first target reactive current value is obtained in a manner of increasing the initial target reactive current value by one target reactive current increment after each preset time length. The initial target reactive current value is the target reactive current value at the switching moment when the power conversion device 1 switches from the high voltage ride through state to the low voltage ride through state.

In this embodiment of this application, after switching from the high voltage ride through state to the low voltage ride through state, in the second time interval in the low voltage ride through reactive current response process, the power conversion device 1 adjusts the second target active current value to decrease from the first active current value to the first target active current value to control the output active current of the inverter circuit 11 rather than controlling the output active current of the inverter circuit 11 in the reactive-before-active control mode, so that the output active current of the inverter circuit 11 may more slowly decrease, and the bus voltage of the direct current bus BUS may more quickly decrease and be less than the low voltage ride through derating threshold in the low voltage ride through reactive current response process. Therefore, the output reactive current of the inverter circuit 11 meets a standard low voltage ride through reactive current requirement at the end of the low voltage ride through reactive current response process, and a stress risk of the power conversion device 1 is reduced. Further, adaptability of the power conversion device 1 switching from the high voltage ride through state to the low voltage ride through state is improved.

In another optional implementation, the first time interval is earlier than the second time interval. In the first time interval in the low voltage ride through reactive current response process, the controller 12 controls the output active current and the output reactive current of the inverter circuit 11 based on the first target active current value and the first target reactive current value respectively. The first target active current value is determined based on the first target reactive current value and the preset maximum output current value. The first target reactive current value is determined based on the voltage sag value of the alternating current power grid. Then, if the output active current value of the inverter circuit 11 is less than or equal to an active current threshold, the controller 12 controls the output active current of the inverter circuit 11 in the second time interval in the low voltage ride through reactive current response process based on the second target active current value; and in the process of controlling the output active current of the inverter circuit 11 based on the second target active current value, the controller 12 adjusts the second target active current value to decrease from the first active current value to the first target active current value. The first active current value is the sum of the first target active current value and the preset active current increment. The preset active current increment is determined based on the rated output current value of the inverter circuit and the preset bus voltage attenuation coefficient. The active current threshold is $k2*I_N$. For example, $0<k2\le1$. The controller 12 further controls the output reactive current of the inverter circuit 11 in the second time interval based on the second target reactive current value. The second target reactive current value is determined based on the second target active current value and the preset maximum output current value.

For specific control manners of the controller 12 in the first time interval and the second time interval, refer to the descriptions of the corresponding parts in the foregoing implementation. Details are not described herein again.

For ease of description, the following describes a working principle of the power conversion device 1 with reference to a control sequence diagram of the power conversion device 1 shown in FIG. 5.

FIG. 5 is a control sequence diagram of a power conversion device according to this application. As shown in FIG. 5, at a moment t0, the power grid voltage Ug of the alternating current power grid is greater than the high voltage ride through voltage threshold $U_1$, the power conversion device 1 enters the high voltage ride through state, and the controller 12 controls the output active current and the output reactive current of the inverter circuit 11 in the standard high voltage ride through mode. Therefore, active and reactive power support is provided for the alternating current power grid, to facilitate recovery of the power grid voltage Ug of the alternating current power grid.

In a period from t0 to t1, the power grid voltage Ug of the alternating current power grid is greater than the high voltage ride through voltage threshold U1, the power conversion device 1 is still in the high voltage ride through state, and a control manner of the controller 12 is consistent with a control manner of the controller 12 at the moment to.

At the moment t1, the power grid voltage Ug of the alternating current power grid decreases to the high voltage ride through voltage threshold U1, and the power conversion device 1 is no longer in the high voltage ride through state.

In a period from t1 to t2, the power grid voltage Ug of the alternating current power grid continuously decreases.

At the moment t2, the power grid voltage Ug of the alternating current power grid decreases to the low voltage ride through voltage threshold U2.

In a period from t2 to t3, that is, in the first time interval T1, the power grid voltage Ug of the alternating current power grid is less than the low voltage ride through voltage threshold U2, the power conversion device 1 starts to enter and is in the low voltage ride through state, and the controller 12 controls the output active current and the output reactive current of the inverter circuit 11 in a standard low voltage ride through mode. Specifically, the controller 12 obtains the first target reactive current value $I_{q1\_lvrt}$ and the first target active current value $I_{p1\_lvrt}$, and controls the output active current $i_p$ and the output reactive current $i_q$ of the inverter circuit 11 based on the first target reactive current value $I_{q1\_lvrt}$ and the first target active current value $I_{p1\_lvrt}$ respectively. In this period, the output active current $i_p$ of the inverter circuit 11 continuously decreases, and the output reactive current $i_q$ continuously increases. In addition, the change rate of the output active current $i_p$ of the inverter circuit 11 is the first change rate, that is, $(I_{p\_t3}-I_{p\_t2})/(t3-t2)$, and is a slope of a line segment in which the output active current $i_p$ of the first time interval T1 is located. $I_{p\_t3}$ and $I_{p\_t2}$ are output active current values of the inverter circuit 11 at the moment t3 and the moment t2 respectively. In addition, in the first time interval T1, the bus voltage of the direct current bus BUS starts to gradually decrease.

At the moment t3, the power grid voltage Ug of the alternating current power grid is less than the low voltage ride through voltage threshold U2, and the power conversion device 1 is still in the low voltage ride through state. If the output active current $i_p$ of the inverter circuit 11 decreases to the active current threshold $I_p'$, the power conversion device 1 starts to enter the second time interval in the low voltage ride through reactive current response process. In this case, the moment t3 may be understood as an interval start moment of the second time interval T2.

In a period from t3 to t4, that is, in the second time interval T2, the power grid voltage Ug of the alternating current power grid is less than the low voltage ride through voltage threshold U2, and the power conversion device 1 is still in the low voltage ride through state. The output active current $i_p$ of the inverter circuit 11 is less than the active current threshold $I_p'$. In the second time interval T2, the controller 12 controls the output active current $i_p$ and the output reactive current $i_q$ of the inverter circuit 11 based on the second target active current value and the second target reactive current value respectively. In the process of controlling the output active current $i_p$ of the inverter circuit 11 based on the second target active current value, the controller 12 performs at least two equal-difference adjustments on the second target active current value, so that the second target active current value linearly decreases from the first active current value $I_{p1}$ (namely, the active current threshold $I_p'$) to the first target active current value $I_{p1\_lvrt}$. Therefore, the output active current $i_p$ of the inverter circuit 11 linearly decreases from the first active current value $I_{p1}$ to the first target active current value $I_{p1\_lvrt}$, and the output reactive current $i_q$ of the inverter circuit 11 increases to the first target reactive current value $I_{q1\_lvrt}$. In addition, the bus voltage of the direct current bus BUS gradually decreases to be less than the low voltage ride through derating threshold UM as the output active current $i_p$ of the inverter circuit 11 decreases. In addition, a decrease speed of the bus voltage of the direct current bus BUS in the second time interval T2 is less than a decrease speed of the bus voltage of the direct current bus BUS in the first time interval T1. In addition, the change rate of the output active current of the inverter circuit 11 in the second time interval T2 is the second change rate, that is, $(I_{p\_t4}-I_{p\_t3})/(t4-t3)$, and is a slope of a line segment in which the output active current $i_p$ of the second time interval T2 is located. In addition, it may be learned from FIG. 5 that the second change rate is greater than the first change rate.

At the moment t4, the power grid voltage Ug of the alternating current power grid is less than the low voltage ride through voltage threshold U2, and the power conversion device 1 is still in the low voltage ride through state. The bus voltage of the direct current bus BUS is less than the low voltage ride through derating threshold UM. The output active current and the output reactive current of the inverter circuit 11 are the first target active current value $I_{p1\_lvrt}$ and the first target reactive current value $I_{q1\_lvrt}$ respectively. The low voltage ride through reactive current response process ends.

In a period from t4 to t5, the power grid voltage Ug of the alternating current power grid is less than the low voltage ride through voltage threshold U2, and the power conversion device 1 is still in the low voltage ride through state. The controller 12 controls the output active current $i_p$ and the output reactive current $i_q$ of the inverter circuit 11 based on the first target active current value $I_{p1\_lvrt}$ and the first target reactive current value $I_{q1\_lvrt}$ respectively, so that the output active current $i_p$ and the output reactive current $i_q$ of the inverter circuit 11 are kept at the first target active current value $I_{p1\_lvrt}$ and the first target reactive current value $I_{q1\_lvrt}$ respectively.

At the moment t5, the power grid voltage Ug of the alternating current power grid is greater than the low voltage ride through voltage threshold U2, indicating that the power grid voltage Ug is recovered, and the power conversion device 1 is no longer in the low voltage ride through state.

A sum of T1 and T2 is less than or equal to the low voltage ride through reactive current response duration threshold, and T1 and T2 constitute the low voltage ride through reactive current response phase. A time interval between the moment t2 and the moment t5 is less than or equal to preset total low voltage ride through duration.

In this embodiment of this application, after switching from the high voltage ride through state to the low voltage ride through state, the power conversion device 1 controls the output active current of the inverter circuit 11 in the standard low voltage ride through mode in the first time interval T1 in the low voltage ride through reactive current response process, and controls, in the second time interval T2, the output active current of the inverter circuit 11 to more slowly decrease to the first target active current value $I_{p1\_lvrt}$. The output active current of the inverter circuit 11 in the second time interval T2 can decrease more slowly than the output active current of the inverter circuit 11 in the reactive-before-active control mode, so that the bus voltage can more quickly decrease and be less than the low voltage ride through derating threshold in the low voltage ride through reactive current response process. Therefore, the output reactive current of the inverter circuit 11 meets the standard low voltage ride through reactive current requirement at the end of the low voltage ride through reactive current response process, and the stress risk of the power conversion device 1 is reduced. Further, adaptability of the power conversion device 1 switching from the high voltage ride through state to the low voltage ride through state is improved.

In another optional implementation, the first time interval is earlier than the second time interval, and the second time interval is earlier than a third time interval. In the first time interval in the low voltage ride through reactive current response process, the controller 12 controls the output active current of the inverter circuit 11 based on the first target active current value, to enable the change rate of the output active current of the inverter circuit 11 to be the first change rate. The controller 12 further controls the output reactive current of the inverter circuit 11 based on the first target reactive current value. The first target active current value is determined based on the first target reactive current value and the preset maximum output current value. The first target reactive current value is determined based on the voltage sag value of the alternating current power grid. Then, in the second time interval in the low voltage ride through reactive current response process, the controller 12 controls the output active current of the inverter circuit 11 based on the second target active current value, to enable the change rate of the output active current of the inverter circuit 11 to be the second change rate. The second target active current value is equal to the output active current value of the inverter circuit 11 at the interval start moment of the second time interval. The controller 12 further controls the output reactive current of the inverter circuit 11 in the second time interval based on the second target reactive current value. The second target reactive current value is determined based on the second target active current value and the preset maximum output current value. Then, the controller 12 controls the output active current of the inverter circuit 11 in the third time interval in the low voltage ride through reactive current response process based on a third target active current value; and in the process of controlling the output active current of the inverter circuit 11 based on the third target active current value, adjusts the third target active current value to decrease from a second active current value to the first target active current value, to enable the change rate of the output active current of the inverter circuit 11 to be a third change rate. The second active current value is equal to the output active current value of the inverter circuit 11 at an interval start moment of the third time interval. The third change rate is less than the second change rate, and a sum of third interval duration of the third time interval, the first interval duration, and the second interval duration is less than or equal to the low voltage ride through reactive current response duration threshold. The controller 12 further controls the output reactive current of the inverter circuit 11 in the third time interval based on a third target reactive current value. The third target reactive current value is determined based on the third target active current value and the preset maximum output current value.

In an embodiment, after the power conversion device 1 switches from the high voltage ride through state to the low voltage ride through state, in the first time interval in the low voltage ride through reactive current response process, the controller 12 controls the output active current and the output reactive current of the inverter circuit 11 based on the first target active current value and the first target reactive current value respectively. Herein, for a specific control manner of the controller 12 in the first time interval, refer to the description of the corresponding part in the foregoing implementation. Details are not described herein again. Then, in the second time interval in the low voltage ride through reactive current response process, the controller 12 determines the output active current value of the inverter circuit 11 at the interval start moment of the second time interval (namely, an interval end moment of the first time interval) as the second target active current value. The controller 12 further obtains the second target reactive current value based on the second target active current value and the preset maximum output current value. Then, the controller 12 obtains the second target output voltage value based on the second target active current value and the second target reactive current value, and controls the output voltage of the inverter circuit 11 based on the second target output voltage value, so that the controller 12 controls the output active current and the output reactive current of the inverter circuit 11 based on the second target active current value and the second target reactive current value respectively. Then, in the third time interval in the low voltage ride through reactive current response process, the controller 12 obtains the third target reactive current value based on the third target active current value and the preset maximum output current value. Then, the controller 12 obtains a third target output voltage value based on the third target active current value and the third target reactive current value, and controls the output voltage of the inverter circuit 11 based on the third target output voltage value, so that the controller 12 controls the output active current and the output reactive current of the inverter circuit 11 based on the third target active current value and the third target reactive current value respectively. In the process of controlling the output active current of the inverter circuit 11 based on the third target active current value, the controller 12 performs at least two current value adjustments on the third target active current value, so that the third target active current value decreases from the second active current value to the first target active current value.

Specifically, after the power conversion device 1 switches from the high voltage ride through state to the low voltage ride through state, in the first time interval in the low voltage ride through reactive current response process, the controller 12 controls the output active current and the output reactive current of the inverter circuit 11 based on the first target active current value $I_{p1\_lvrt}$ and the first target reactive current value $I_{q1\_lvrt}$ respectively. Herein, for a specific control manner of the controller 12 in the first time interval, refer to the description of the corresponding part in the foregoing implementation. Details are not described herein again.

Then, in the second time interval in the low voltage ride through reactive current response process, the controller 12 determines the output active current value of the inverter circuit 11 at the interval start moment of the second time interval as the second target active current value $I_{p2\_lvrt}$, and obtains the second target reactive current value $I_{q2\_lvrt} = \sqrt{I_M{}^2 - I_{p2\_lvrt}{}^2}$ through calculation based on the second target active current value $I_{p2\_lvrt}$ and the preset maximum output current value $I_M$. Then, the controller 12 inputs the second target reactive current value $I_{q2\_lvrt}$, the second target active current value $I_{p2\_lvrt}$, the actual active current value, and the actual reactive current value of the inverter circuit 11 into the current control loop to obtain a second q-axis voltage increment and a second d-axis voltage increment. The controller 12 further obtains the power grid voltage value of the alternating current power grid, and obtains the q-axis power grid voltage component and the d-axis power grid voltage component based on the power grid voltage value, to calculate the sum of the second q-axis voltage increment and the q-axis power grid voltage component to obtain the second target q-axis voltage value, and to calculate the sum of the second d-axis voltage increment and the d-axis power grid voltage component to obtain the second target d-axis voltage value. Then, the controller 12 performs dq/abc coordinate transformation on the second target q-axis voltage value and the second target d-axis voltage value to obtain the second target output voltage value, and controls the output voltage of the inverter circuit 11 based on the second target output voltage value, so that the controller 12 controls the output active current and the output reactive current of the inverter circuit 11 based on the second target active current value $I_{p2\_lvrt}$ and the second target reactive current value $I_{q2\_lvrt}$ respectively.

Then, in the third time interval in the low voltage ride through reactive current response process, the controller 12 determines the output active current value of the inverter circuit 11 at the interval start moment of the third time interval (namely, an interval end moment of the second time interval) as the second active current value. The controller 12 further obtains the third target reactive current value $I_{q3\_lvrt} = \sqrt{I_M{}^2 - I_{p3\_lvrt}{}^2}$ through calculation based on the third target active current value $I_{p3\_lvrt}$ and the preset maximum output current value $I_M$. Then, the controller 12 inputs the third target reactive current value $I_{q3\_lvrt}$, the third target active current value $I_{p3\_lvrt}$, the actual active current value, and the actual reactive current value of the inverter circuit 11 into the current control loop to obtain a third q-axis voltage increment and a third d-axis voltage increment. The controller 12 further obtains the power grid voltage value of the alternating current power grid, and obtains the q-axis power grid voltage component and the d-axis power grid voltage component based on the power grid voltage value, to calculate a sum of the third q-axis voltage increment and the q-axis power grid voltage component to obtain a third target q-axis voltage value, and to calculate a sum of the third d-axis voltage increment and the d-axis power grid voltage component to obtain a third target d-axis voltage value. Then, the controller 12 performs dq/abc coordinate transformation on the third target q-axis voltage value and the third target d-axis voltage value to obtain the third target output voltage value, and controls the output voltage of the inverter circuit 11 based on the third target output voltage value, so that the controller 12 controls the output active current and the output reactive current of the inverter circuit 11 based on the third target active current value $I_{p3\_lvrt}$ and the third target reactive current value $I_{q3\_lvrt}$ respectively.

It should be noted that a manner in which the controller 12 adjusts the third target active current value to decrease from the second active current value to the first target active current value may be a linear decrease manner. Herein, the controller 12 adjusts the third target active current value in the linear decrease manner rather than a non-linear decrease manner, so that the output active current value of the inverter circuit 11 can more evenly decrease. This avoids a sudden change of the output active current of the inverter circuit 11 during continuous ride through from a high voltage to a low voltage, and simultaneously reduces the bus voltage of the direct current bus BUS at a fast speed and makes the bus voltage of the direct current bus BUS less than the low voltage ride through derating threshold, so that applicability is higher. In addition, the first time interval, the second time interval, and the third time interval constitute a low voltage ride through reactive current response phase. The first interval duration of the first time interval, the second interval duration of the second time interval, and the third interval duration of the third time interval may be adaptively adjusted based on an actual application scenario. Specifically, in a scenario in which the bus voltage needs to more quickly decrease, the first interval duration of the first time interval may be appropriately shortened, and the second interval duration of the second time interval or the third interval duration of the third time interval or both may be appropriately prolonged.

In this embodiment of this application, after switching from the high voltage ride through state to the low voltage ride through state, the power conversion device 1 keeps, in the second time interval in the low voltage ride through reactive current response process, the output active current of the inverter circuit 11 at the second target active current value, and adjusts, in the third time interval in the low voltage ride through reactive current response process, the third target active current value to decrease from the second active current value to the first target active current value to control the output active current of the inverter circuit 11 rather than controlling the output active current of the inverter circuit 11 in the reactive-before-active control mode, so that the output active current of the inverter circuit 11 may more slowly decrease, and the bus voltage of the direct current bus BUS may more quickly decrease and be less than the low voltage ride through derating threshold in the low voltage ride through reactive current response process. Therefore, the output reactive current of the inverter circuit 11 meets the standard low voltage ride through reactive current requirement at the end of the low voltage ride through reactive current response process, and the stress risk of the power conversion device 1 is reduced. Further, adaptability of the power conversion device 1 switching from the high voltage ride through state to the low voltage ride through state is improved.

In another optional implementation, the first time interval is earlier than the second time interval, and the second time interval is earlier than the third time interval. In the first time interval in the low voltage ride through reactive current response process, the controller 12 controls the output active current of the inverter circuit 11 based on the first target active current value, to enable the change rate of the output active current of the inverter circuit 11 to be the first change rate. The controller 12 further controls the output reactive current of the inverter circuit 11 based on the first target reactive current value. The first target active current value is determined based on the first target reactive current value and the preset maximum output current value. The first target reactive current value is determined based on the voltage sag value of the alternating current power grid. Then, if the output active current value of the inverter circuit 11 is less than or equal to the active current threshold, in the second time interval in the low voltage ride through reactive current response process, the controller 12 controls the output active current of the inverter circuit 11 based on the second target active current value, to enable the change rate of the output active current of the inverter circuit 11 to be the second change rate. The second target active current value is equal to the output active current value of the inverter circuit 11 at the interval start moment of the second time interval. The controller 12 further controls the output reactive current of the inverter circuit 11 in the second time interval based on the second target reactive current value. The second target reactive current value is determined based on the second target active current value and the preset maximum output current value. Then, the controller 12 controls the output active current of the inverter circuit 11 in the third time interval in the low voltage ride through reactive current response process based on the third target active current value; and in the process of controlling the output active current of the inverter circuit 11 based on the third target active current value, adjusts the third target active current value to decrease from the second active current value to the first target active current value, to enable the change rate of the output active current of the inverter circuit 11 to be the third change rate. The second active current value is the output active current value of the inverter circuit 11 at the interval start moment of the third time interval. The third change rate is less than the second change rate, and the sum of the third interval duration of the third time interval, the first interval duration, and the second interval duration is less than or equal to the low voltage ride through reactive current response duration threshold. The controller 12 further controls the output reactive current of the inverter circuit 11 in the third time interval based on the third target reactive current value. The third target reactive current value is determined based on the third target active current value and the preset maximum output current value.

For specific control manners of the controller 12 in the first time interval, the second time interval, and the third time interval, refer to the descriptions of the corresponding parts in the foregoing implementation. Details are not described herein again.

For ease of description, the following describes a working principle of the power conversion device 1 with reference to a control sequence diagram of the power conversion device 1 shown in FIG. 6.

FIG. 6 is another control sequence diagram of a power conversion device according to this application. As shown in FIG. 6, at a moment to, the power grid voltage Ug of the alternating current power grid is greater than the high voltage ride through voltage threshold $U_1$, the power conversion device 1 enters the high voltage ride through state, and the controller 12 controls the output active current and the output reactive current of the inverter circuit 11 in the standard high voltage ride through mode. Therefore, active and reactive power support is provided for the alternating current power grid, to facilitate recovery of the power grid voltage Ug of the alternating current power grid.

In a period from t0 to t1, the power grid voltage Ug of the alternating current power grid is greater than the high voltage ride through voltage threshold U1, the power conversion device 1 is still in the high voltage ride through state, and a control manner of the controller 12 is consistent with a control manner of the controller 12 at the moment to.

At the moment t1, the power grid voltage Ug of the alternating current power grid decreases to the high voltage ride through voltage threshold U1, and the power conversion device 1 is no longer in the high voltage ride through state.

In a period from t1 to t2, the power grid voltage Ug of the alternating current power grid continuously decreases.

At the moment t2, the power grid voltage Ug of the alternating current power grid decreases to the low voltage ride through voltage threshold U2.

In a period from t2 to t3, that is, in the first time interval T1, the power grid voltage Ug of the alternating current power grid is less than the low voltage ride through voltage threshold U2, the power conversion device 1 starts to enter and is in the low voltage ride through state, and the controller 12 controls the output active current and the output reactive current of the inverter circuit 11 in a standard low voltage ride through mode. Specifically, the controller 12 obtains the first target reactive current value $I_{q1\_lvrt}$ and the first target active current value $I_{p1\_lvrt}$, and controls the output active current $i_p$ and the output reactive current $i_q$ of the inverter circuit 11 based on the first target reactive current value $I_{q1\_lvrt}$ and the first target active current value $I_{p1\_lvrt}$ respectively. In this period, the output active current $i_p$ of the inverter circuit 11 continuously decreases, and the output reactive current $i_q$ continuously increases. In addition, the change rate of the output active current $i_p$ of the inverter circuit 11 is the first change rate, that is, $(I_{p\_t3} - I_{p\_t2})/(t3-t2)$, and is a slope of a line segment in which the output active current $i_p$ of the first time interval T1 is located. $I_{p\_t3}$ and $I_{p\_t2}$ are output active current values of the inverter circuit 11 at the moment t3 and the moment t2 respectively. In addition, in the first time interval T1, the bus voltage of the direct current bus BUS starts to decrease.

At the moment t3, the power grid voltage Ug of the alternating current power grid is less than the low voltage ride through voltage threshold U2, and the power conversion device 1 is still in the low voltage ride through state. If the output active current $i_p$ of the inverter circuit 11 decreases to the active current threshold $I_p'$, the power conversion device 1 starts to enter the second time interval in the low voltage ride through reactive current response process. In this case, the moment t3 may be understood as an interval start moment of the second time interval T2.

In a period from t3 to t4, that is, in the second time interval T2, the power grid voltage Ug of the alternating current power grid is less than the low voltage ride through voltage threshold U2, and the power conversion device 1 is still in the low voltage ride through state. The output active current $i_p$ of the inverter circuit 11 is less than the active current threshold $I_p'$. In the second time interval T2, the controller 12 controls the output active current $i_p$ and the output reactive current $i_q$ of the inverter circuit 11 based on the second target active current value (namely, $I_p'$) and the second target reactive current value respectively, so that the output active current $i_p$ and the output reactive current $i_q$ of the inverter circuit 11 are kept at the second target active current value and the second target reactive current value respectively. In addition, as the output active current $i_p$ of the inverter circuit 11 is adjusted, the bus voltage quickly decreases in the second time interval T2. In addition, a decrease speed of the bus voltage in the second time interval T2 is less than a decrease speed in the first time interval T1. In addition, the change rate of the output active current of the inverter circuit 11 in the second time interval T2 is the second change rate, that is, 0. In addition, it may be learned from FIG. 6 that the second change rate is greater than the first change rate.

At the moment t4, the power grid voltage Ug of the alternating current power grid is less than the low voltage ride through voltage threshold U2, and the power conversion device 1 is still in the low voltage ride through state. In this case, the bus voltage decreases to the low voltage ride through derating threshold UM. The moment t4 may be understood as an interval end moment of the second time interval T2, or may be understood as an interval start moment of the third time interval T3.

In a period from t4 to t5, that is, in the third time interval T3, the power grid voltage Ug of the alternating current power grid is less than the low voltage ride through voltage threshold U2, and the power conversion device 1 is still in the low voltage ride through state. The controller 12 controls the output active current $i_p$ and the output reactive current $i_q$ of the inverter circuit 11 based on the third target active current value and the third target reactive current value respectively. In the process of controlling the output active current $i_p$ of the inverter circuit 11 based on the third target active current value, the controller 12 performs at least two equal-difference adjustments on the third target active current value, so that the third target active current value linearly decreases from the second active current value (namely, the output active current value of the inverter circuit 11 at the moment t4) to the first target active current value $I_{p1\_lvrt}$. Therefore, the output active current $i_p$ of the inverter circuit 11 linearly decreases from the second active current value to the first target active current value $I_{p1\_lvrt}$, and the output reactive current $i_q$ of the inverter circuit 11 increases to the first target reactive current value $I_{q1\_lvrt}$. In addition, the bus voltage of the direct current bus BUS gradually decreases to be less than the low voltage ride through derating threshold UM as the output active current $i_p$ of the inverter circuit 11 decreases. In addition, a decrease speed of the bus voltage in the third time interval T3 is less than a decrease speed in the second time interval T2. In addition, the change rate of the output active current of the inverter circuit 11 in the third time interval T3 is a third change rate, that is, $(I_{p\_t5}-I_{p\_t4})/(t5-t4)$, and is a slope of a line segment in which the output active current $i_p$ of the third time interval T3 is located. In addition, it may be learned from FIG. 6 that the third change rate is less than the second change rate.

At the moment t5, the power grid voltage Ug of the alternating current power grid is less than the low voltage ride through voltage threshold U2, and the power conversion device 1 is still in the low voltage ride through state. The bus voltage of the direct current bus BUS is less than the low voltage ride through derating threshold UM. The output active current and the output reactive current of the inverter circuit 11 are the first target active current value $I_{p1\_lvrt}$ and the first target reactive current value $I_{q1\_lvrt}$ respectively. The low voltage ride through reactive current response process ends.

In a period from t5 to t6, the power grid voltage Ug of the alternating current power grid is less than the low voltage ride through voltage threshold U2, and the power conversion device 1 is still in the low voltage ride through state. The controller 12 controls the output active current $i_p$ and the output reactive current $i_q$ of the inverter circuit 11 based on the first target active current value $I_{p1\_lvrt}$ and the first target reactive current value $I_{q1\_lvrt}$ respectively, so that the output active current $i_p$ and the output reactive current $i_q$ of the inverter circuit 11 are kept at the first target active current value $I_{p1\_lvrt}$ and the first target reactive current value $I_{q1\_lvrt}$ respectively.

At the moment t6, the power grid voltage Ug of the alternating current power grid is greater than the low voltage ride through voltage threshold U2, indicating that the power grid voltage Ug is recovered, and the power conversion device 1 is no longer in the low voltage ride through state.

A sum of T1, T2, and T3 is less than or equal to the low voltage ride through reactive current response duration threshold, and T1, T2, and T3 constitute a low voltage ride through reactive current response phase. A time interval between the moment t2 and the moment t6 is less than or equal to preset total low voltage ride through duration. T2 and T3 may be adaptively adjusted based on an actual application scenario. For example, in a scenario in which the bus voltage needs to more quickly decrease, T2 or T3 or both may be appropriately prolonged.

In this embodiment of this application, after switching from the high voltage ride through state to the low voltage ride through state, the power conversion device 1 controls the output active current of the inverter circuit 11 to be kept at the second target active current value in the second time interval T2 in the low voltage ride through reactive current response process, and controls, in the third time interval T3, the output active current of the inverter circuit 11 to slowly decrease from the second target active current value to the first target active current value. The output active current of the inverter circuit 11 in the second time interval T2 and the third time interval T3 can decrease more slowly than the output active current of the inverter circuit 11 in the reactive-before-active control mode, so that the bus voltage can more quickly decrease and be less than the low voltage ride through derating threshold in the low voltage ride through reactive current response process. Therefore, the output reactive current of the inverter circuit 11 meets the standard low voltage ride through reactive current requirement at the end of the low voltage ride through reactive current response process, and the stress risk of the power conversion device 1 is reduced. Further, adaptability of the power conversion device 1 switching from the high voltage ride through state to the low voltage ride through state is improved.

In another optional implementation, the first time interval is earlier than the second time interval, and the second time interval is earlier than the third time interval. In the first time interval in the low voltage ride through reactive current response process, the controller 12 controls the output active current of the inverter circuit 11 based on the first target active current value, to enable the change rate of the output active current of the inverter circuit 11 to be the first change rate. The controller 12 further controls the output reactive current of the inverter circuit 11 based on the first target reactive current value. The first target active current value is determined based on the first target reactive current value and the preset maximum output current value. The first target reactive current value is determined based on the voltage sag value of the alternating current power grid. Then, in the second time interval in the low voltage ride through reactive current response process, the controller 12 controls the output active current of the inverter circuit 11 based on the second target active current value, to enable the change rate of the output active current of the inverter circuit 11 to be the second change rate. The second target active current value is greater than the output active current value of the inverter circuit 11 at the interval start moment of the second time interval. The controller 12 further controls the output reactive current of the inverter circuit 11 in the second time interval based on the second target reactive current value. The second target reactive current value is determined based on the second target active current value and the preset maximum output current value. Then, the controller 12 controls the output active current of the inverter circuit 11 in the third time interval in the low voltage ride through reactive current response process based on the third target active current value; and in the process of controlling the output active current of the inverter circuit 11 based on the third target active current value, adjusts the third target active current value to decrease from the second active current value to the first target active current value, to enable the change rate of the output active current of the inverter circuit 11 to be the third change rate. The second active current value is the output active current value of the inverter circuit 11 at the interval start moment of the third time interval. The third change rate is less than the second change rate, and the sum of the third interval duration of the third time interval, the first interval duration, and the second interval duration is less than or equal to the low voltage ride through reactive current response duration threshold. The controller 12 further controls the output reactive current of the inverter circuit 11 in the third time interval based on the third target reactive current value. The third target reactive current value is determined based on the third target active current value and the preset maximum output current value.

In an embodiment, after the power conversion device 1 switches from the high voltage ride through state to the low voltage ride through state, in the first time interval in the low voltage ride through reactive current response process, the controller 12 controls the output active current and the output reactive current of the inverter circuit 11 based on the first target active current value and the first target reactive current value respectively. Herein, for a specific control manner of the controller 12 in the first time interval, refer to the description of the corresponding part in the foregoing implementation. Details are not described herein again. Then, in the second time interval in the low voltage ride through reactive current response process, the controller 12 obtains the second target reactive current value based on the second target active current value and the preset maximum output current value. The second target active current value is greater than the output active current value of the inverter circuit 11 at the interval start moment of the second time interval (namely, an interval end moment of the first time interval). Then, the controller 12 obtains the second target output voltage value based on the second target active current value and the second target reactive current value, and controls the output voltage of the inverter circuit 11 based on the second target output voltage value, so that the controller 12 controls the output active current and the output reactive current of the inverter circuit 11 based on second target active current value and the second target reactive current value respectively. Then, in the third time interval in the low voltage ride through reactive current response process, the controller 12 obtains the third target reactive current value based on the third target active current value and the preset maximum output current value. Then, the controller 12 obtains a third target output voltage value based on the third target active current value and the third target reactive current value, and controls the output voltage of the inverter circuit 11 based on the third target output voltage value, so that the controller 12 controls the output active current and the output reactive current of the inverter circuit 11 based on the third target active current value and the third target reactive current value respectively. In the process of controlling the output active current of the inverter circuit 11 based on the third target active current value, the controller 12 performs at least two current value adjustments on the third target active current value, so that the third target active current value decreases from the second active current value to the first target active current value.

For specific control manners of the controller 12 in the first time interval, the second time interval, and the third time interval, refer to the descriptions of the corresponding parts in the foregoing implementation. Details are not described herein again.

The first time interval, the second time interval, and the third time interval constitute the low voltage ride through reactive current response phase. The first interval duration of the first time interval, the second interval duration of the second time interval, and the third interval duration of the third time interval may be adaptively adjusted based on an actual application scenario. Specifically, in a scenario in which the bus voltage needs to more quickly decrease, the first interval duration of the first time interval may be appropriately shortened, and the second interval duration of the second time interval or the third interval duration of the third time interval or both may be appropriately prolonged.

In this embodiment of this application, after switching from the high voltage ride through state to the low voltage ride through state, the power conversion device 1 controls, in the second time interval in the low voltage ride through reactive current response process, the output active current of the inverter circuit 11 to increase, and adjusts, in the third time interval in the low voltage ride through reactive current response process, the third target active current value to decrease from the second active current value to the first target active current value to control the output active current of the inverter circuit 11 rather than controlling the output active current of the inverter circuit 11 in the reactive-before-active control mode, so that the output active current of the inverter circuit 11 may more slowly decrease, and the bus voltage of the direct current bus BUS may more quickly decrease and be less than the low voltage ride through derating threshold in the low voltage ride through reactive current response process. Therefore, the output reactive current of the inverter circuit 11 meets the standard low voltage ride through reactive current requirement at the end of the low voltage ride through reactive current response process, and the stress risk of the power conversion device 1 is reduced. Further, adaptability of the power conversion device 1 switching from the high voltage ride through state to the low voltage ride through state is improved.

In another optional implementation, the first time interval is earlier than the second time interval, and the second time interval is earlier than the third time interval. In the first time interval in the low voltage ride through reactive current response process, the controller 12 controls the output active current of the inverter circuit 11 based on the first target active current value, to enable the change rate of the output active current of the inverter circuit 11 to be the first change rate. The controller 12 further controls the output reactive current of the inverter circuit 11 based on the first target reactive current value. The first target active current value is determined based on the first target reactive current value and the preset maximum output current value. The first target reactive current value is determined based on the voltage sag value of the alternating current power grid. Then, if the output active current value of the inverter circuit 11 is less than or equal to the active current threshold, in the second time interval in the low voltage ride through reactive current response process, the controller 12 controls the output active current of the inverter circuit 11 based on the second target active current value, to enable the change rate of the output active current of the inverter circuit 11 to be the second change rate. The second target active current value is greater than the output active current value of the inverter circuit 11 at the interval start moment of the second time interval. The controller 12 further controls the output reactive current of the inverter circuit 11 in the second time interval based on the second target reactive current value. The second target reactive current value is determined based on the second target active current value and the preset maximum output current value. Then, the controller 12 controls the output active current of the inverter circuit 11 in the third time interval in the low voltage ride through reactive current response process based on the third target active current value; and in the process of controlling the output active current of the inverter circuit 11 based on the third target active current value, adjusts the third target active current value to decrease from the second active current value to the first target active current value, to enable the change rate of the output active current of the inverter circuit 11 to be the third change rate. The second active current value is the output active current value of the inverter circuit 11 at the interval start moment of the third time interval. The third change rate is less than the second change rate, and the sum of the third interval duration of the third time interval, the first interval duration, and the second interval duration is less than or equal to the low voltage ride through reactive current response duration threshold. The controller 12 further controls the output reactive current of the inverter circuit 11 in the third time interval based on the third target reactive current value. The third target reactive current value is determined based on the third target active current value and the preset maximum output current value.

For specific control manners of the controller 12 in the first time interval, the second time interval, and the third time interval, refer to the descriptions of the corresponding parts in the foregoing implementation. Details are not described herein again.

For ease of description, the following describes a working principle of the power conversion device 1 with reference to a control sequence diagram of the power conversion device 1 shown in FIG. 7.

FIG. 7 is another control sequence diagram of a power conversion device according to this application. As shown in FIG. 7, in a period from t0 to t2, for the description of the corresponding part, refer to the description of the corresponding part in FIG. 6. Details are not described herein again.

At the moment t2, the power grid voltage Ug of the alternating current power grid decreases to the low voltage ride through voltage threshold U2.

In a period from t2 to t3, that is, in the first time interval T1, the power grid voltage Ug of the alternating current power grid is less than the low voltage ride through voltage threshold U2, the power conversion device 1 starts to enter and is in the low voltage ride through state, and the controller 12 controls the output active current and the output reactive current of the inverter circuit 11 in a standard low voltage ride through mode. Specifically, the controller 12 obtains the first target reactive current value $I_{q1\_lvrt}$ and the first target active current value $I_{p1\_lvrt}$, and controls the output active current $i_p$ and the output reactive current $i_q$ of the inverter circuit 11 based on the first target reactive current value $I_{q1\_lvrt}$ and the first target active current value $I_{p1\_lvrt}$ respectively. In this period, the output active current $i_p$ of the inverter circuit 11 continuously decreases, and the output reactive current $i_q$ continuously increases. In addition, the change rate of the output active current $i_p$ of the inverter circuit 11 is the first change rate, that is, $(I_{p\_t3}-I_{p\_t2})/(t3-t2)$, and is a slope of a line segment in which the output active current $i_p$ of the first time interval T1 is located. $I_{p\_t3}$ and $I_{p\_t2}$ are output active current values of the inverter circuit 11 at the moment t3 and the moment t2 respectively. In addition, in the first time interval T1, the bus voltage of the direct current bus BUS starts to decrease.

At the moment t3, the power grid voltage Ug of the alternating current power grid is less than the low voltage ride through voltage threshold U2, and the power conversion device 1 is still in the low voltage ride through state. If the output active current $i_p$ of the inverter circuit 11 decreases to the active current threshold $I_p'$, the power conversion device 1 starts to enter the second time interval T2 in the low voltage ride through reactive current response process. In this case, the moment t3 may be understood as an interval start moment of the second time interval T2.

In a period from t3 to t4, that is, in the second time interval T2, the power grid voltage Ug of the alternating current power grid is less than the low voltage ride through voltage threshold U2, and the power conversion device 1 is still in the low voltage ride through state. The output active current $i_p$ of the inverter circuit 11 is less than the active current threshold $I_p'$. In the second time interval T2, the controller 12 controls the output active current $i_p$ of the inverter circuit 11 based on the second target active current value (a current value greater than $I_p'$), so that the output active current $i_p$ of the inverter circuit 11 starts to linearly increase from $I_p'$. The controller 12 further controls the output reactive current $i_q$ of the inverter circuit 11 based on the second target reactive current value, so that the output reactive current $i_q$ of the inverter circuit 11 starts to decrease. In addition, as the output active current $i_p$ of the inverter circuit 11 is controlled, the bus voltage quickly decreases in the second time interval T2. In addition, a decrease speed of the bus voltage in the second time interval T2 is less than a decrease speed in the first time interval T1. In addition, the change rate of the output active current of the inverter circuit 11 in the second time interval T2 is the second change rate, that is, $(I_{p\_t4}-I_{p\_t3})/(t4-t3)$, and is a slope of a line segment in which the output active current $i_p$ of the second time interval T2 is located. $I_{p\_t4}$ and $I_{p\_t3}$ are output active current values of the inverter circuit 11 at the moment t4 and the moment t3 respectively. In addition, it may be learned from FIG. 7 that the second change rate is greater than the first change rate.

At the moment t4, the power grid voltage Ug of the alternating current power grid is less than the low voltage ride through voltage threshold U2, and the power conversion device 1 is still in the low voltage ride through state. In this case, the bus voltage of the direct current bus BUS is less than the low voltage ride through derating threshold UM. The moment t4 may be understood as an interval end moment of the second time interval T2, or may be understood as an interval start moment of the third time interval T3.

In a period from t4 to t5, that is, in the third time interval T3, the power grid voltage Ug of the alternating current power grid is less than the low voltage ride through voltage threshold U2, and the power conversion device 1 is still in the low voltage ride through state. The controller 12 controls the output active current $i_p$ and the output reactive current $i_q$ of the inverter circuit 11 based on the third target active current value and the third target reactive current value respectively. In the process of controlling the output active current $i_p$ of the inverter circuit 11 based on the third target active current value, the controller 12 performs at least two equal-difference adjustments on the third target active current value, so that the third target active current value linearly decreases from the second active current value (namely, the output active current value of the inverter circuit 11 at the moment t4) to the first target active current value $I_{p1\_lvrt}$. Therefore, the output active current in of the inverter circuit 11 linearly decreases from the second active current value to the first target active current value $I_{p1\_lvrt}$, and the output reactive current $i_q$ of the inverter circuit 11 increases to the first target reactive current value $I_{q1\_lvrt}$. In addition, the bus voltage of the direct current bus BUS decreases as the output active current $i_p$ of the inverter circuit 11 decreases. In addition, a decrease speed of the bus voltage in the third time interval T3 is less than a decrease speed in the second time interval T2. In addition, the change rate of the output active current of the inverter circuit 11 in the third time interval T3 is a third change rate, that is, $(I_{p\_t5}-I_{p\_t4})/(t5-t4)$, and is a slope of a line segment in which the output active current $i_p$ of the third time interval T3 is located. In addition, it may be learned from FIG. 7 that the third change rate is less than the second change rate.

At the moment t5, the power grid voltage Ug of the alternating current power grid is less than the low voltage ride through voltage threshold U2, and the power conversion device 1 is still in the low voltage ride through state. The bus voltage of the direct current bus BUS is less than the low voltage ride through derating threshold UM. The output active current and the output reactive current of the inverter circuit 11 are the first target active current value $I_{p1\_lvrt}$ and the first target reactive current value $I_{q1\_lvrt}$ respectively. The low voltage ride through reactive current response process ends.

In a period from t5 to t6, the power grid voltage Ug of the alternating current power grid is less than the low voltage ride through voltage threshold U2, and the power conversion device 1 is still in the low voltage ride through state. The controller 12 controls the output active current $i_p$ and the output reactive current $i_q$ of the inverter circuit 11 based on the first target active current value $I_{p1\_lvrt}$ and the first target reactive current value $I_{q1\_lvrt}$ respectively, so that the output active current $i_p$ and the output reactive current $i_q$ of the inverter circuit 11 are kept at the first target active current value $I_{p1\_lvrt}$ and the first target reactive current value $I_{q1\_lvrt}$ respectively.

At the moment t6, the power grid voltage Ug of the alternating current power grid is greater than the low voltage ride through voltage threshold U2, indicating that the power grid voltage Ug is recovered, and the power conversion device 1 is no longer in the low voltage ride through state.

A sum of T1, T2, and T3 is less than or equal to the low voltage ride through reactive current response duration threshold, and T1, T2, and T3 constitute a low voltage ride through reactive current response phase. A time interval between the moment t2 and the moment t6 is less than or equal to preset total low voltage ride through duration. T2 and T3 may be adaptively adjusted based on an actual application scenario. For example, in a scenario in which the bus voltage needs to more quickly decrease, T2 or T3 or both may be appropriately prolonged.

In this embodiment of this application, after switching from the high voltage ride through state to the low voltage ride through state, the power conversion device 1 sequentially controls the output active current of the inverter circuit 11 to increase and then decrease to the first target active current value in the second time interval T2 and the third time interval T3 in the low voltage ride through reactive current response process. The output active current of the inverter circuit 11 in the second time interval T2 and the third time interval T3 can decrease more slowly than the output active current of the inverter circuit 11 in the reactive-before-active control mode, so that the bus voltage can more quickly decrease and be less than the low voltage ride through derating threshold in the low voltage ride through reactive current response process. Therefore, the output reactive current of the inverter circuit 11 meets the standard low voltage ride through reactive current requirement at the end of the low voltage ride through reactive current response process, and the stress risk of the power conversion device 1 is reduced. Further, adaptability of the power conversion device 1 switching from the high voltage ride through state to the low voltage ride through state is improved.

In another optional implementation, the first time interval is earlier than the second time interval, and the first time interval, the second time interval, and the third time interval are earlier than a fourth time interval. In the first time interval in the low voltage ride through reactive current response process, the controller 12 controls the output active current of the inverter circuit 11 based on the first target active current value, to enable the change rate of the output active current of the inverter circuit 11 to be the first change rate. The controller 12 further controls the output reactive current of the inverter circuit 11 based on the first target reactive current value. The first target active current value is determined based on the first target reactive current value and the preset maximum output current value. The first target reactive current value is determined based on the voltage sag value of the alternating current power grid. Then, in the second time interval in the low voltage ride through reactive current response process, the controller 12 controls the output active current of the inverter circuit 11 based on the second target active current value, to enable the change rate of the output active current of the inverter circuit 11 to be the second change rate. The second target active current value is greater than the output active current value of the inverter circuit 11 at the interval start moment of the second time interval. The controller 12 further controls the output reactive current of the inverter circuit 11 in the second time interval based on the second target reactive current value. The second target reactive current value is determined based on the second target active current value and the preset maximum output current value. In the third time interval in the low voltage ride through reactive current response process, the controller 12 further controls the output active current of the inverter circuit 11 based on the third target active current value, to enable the change rate of the output active current of the inverter circuit 11 to be the third change rate. The third change rate is less than the second change rate. The third target active current value is equal to the output active current value of the inverter circuit 11 at the interval start moment of the third time interval. The controller 12 further controls the output reactive current of the inverter circuit 11 in the third time interval based on the third target reactive current value. The third target reactive current value is determined based on the third target active current value and the preset maximum output current value. Then, the controller 12 controls the output active current of the inverter circuit 11 in the fourth time interval in the low voltage ride through reactive current response process based on a fourth target active current value; and in the process of controlling the output active current of the inverter circuit 11 based on the fourth target active current value, adjusts the fourth target active current value to decrease from a third active current value to the first target active current value, to enable the change rate of the output active current of the inverter circuit 11 to be a fourth change rate. The third active current value is an output active current value of the inverter circuit 11 at an interval start moment of the fourth time interval. The fourth change rate is less than the third change rate. A sum of fourth interval duration of the fourth time interval, third interval duration of the third time interval, first interval duration, and the second interval duration is less than or equal to the low voltage ride through reactive current response duration threshold. The controller 12 further controls the output reactive current of the inverter circuit 11 in the fourth time interval based on a fourth target reactive current value. The fourth target reactive current value is determined based on the fourth target active current value and the preset maximum output current value.

It should be noted that, in this implementation, the second time interval may be earlier than the third time interval, or may be later than the third time interval. In this embodiment, an example in which the second time interval is earlier than the third time interval is used for description.

In an embodiment, after the power conversion device 1 switches from the high voltage ride through state to the low voltage ride through state, in the first time interval in the low voltage ride through reactive current response process, the controller 12 controls the output active current and the output reactive current of the inverter circuit 11 based on the first target active current value and the first target reactive current value respectively. Then, in the second time interval in the low voltage ride through reactive current response process, the controller 12 controls the output active current value and the output reactive current value of the inverter circuit 11 based on the second target active current value and the second target reactive current value respectively. For specific control manners of the controller 12 in the first time interval and the second time interval, refer to the descriptions of the corresponding parts in the foregoing implementation. Details are not described herein again. Then, in the third time interval in the low voltage ride through reactive current response process, the controller 12 determines the output active current value of the inverter circuit 11 at the interval start moment of the third time interval (the interval end moment of the second time interval) as the third target active current value, and obtains the third target reactive current value based on the third target active current value and the preset maximum output current value. Then, the controller 12 obtains a third target output voltage value based on the third target active current value and the third target reactive current value, and controls the output voltage of the inverter circuit 11 based on the third target output voltage value, so that the controller 12 controls the output active current and the output reactive current of the inverter circuit 11 based on the third target active current value and the third target reactive current value respectively. Then, in the fourth time interval in the low voltage ride through reactive current response process, the controller 12 obtains the fourth target reactive current value based on the fourth target active current value and the preset maximum output current value. Then, the controller 12 obtains a fourth target output voltage value based on the fourth target active current value and the fourth target reactive current value, and controls the output voltage of the inverter circuit 11 based on the fourth target output voltage value, so that the controller 12 controls the output active current and the output reactive current of the inverter circuit 11 based on the fourth target active current value and the fourth target reactive current value respectively. In the process of controlling the output active current of the inverter circuit 11 based on the fourth target active current value, the controller 12 performs at least two current value adjustments on the fourth target active current value, so that the fourth target active current value linearly decreases from the third active current value to the first target active current value. The third active current value is the output active current value of the inverter circuit 11 at the interval start moment of the fourth time interval (namely, an interval end moment of the third time interval).

Herein, for specific control manners of the controller 12 in the first time interval and the second time interval, refer to the descriptions of the corresponding parts in the foregoing implementations. For specific control manners of the controller 12 in the third time interval and the fourth time interval, refer to the descriptions of the corresponding parts of the second time interval and the third time interval in FIG. 6. Details are not described herein again.

The first time interval, the second time interval, the third time interval, and the fourth time interval constitute a low voltage ride through reactive current response phase. The first interval duration of the first time interval, the second interval duration of the second time interval, the third interval duration of the third time interval, and the fourth interval duration of fourth time interval may be adaptively adjusted based on an actual application scenario. Specifically, in a scenario in which the bus voltage needs to more quickly decrease, the first interval duration of the first time interval may be appropriately shortened, and at least one interval duration of the second interval duration of the second time interval, the third interval duration of the third time interval, and the fourth interval duration of the fourth time interval may be appropriately prolonged.

In this embodiment of this application, after switching from the high voltage ride through state to the low voltage ride through state, the power conversion device 1 controls, in the second time interval in the low voltage ride through reactive current response process, the output active current of the inverter circuit 11 to increase, controls, in the third time interval in the low voltage ride through reactive current response process, the output active current of the inverter circuit 11 at the third target active current value, and adjusts, in the fourth time interval in the low voltage ride through reactive current response process, the fourth target active current value to decrease from the third active current value to the first target active current value to control the output active current of the inverter circuit 11 rather than controlling the output active current of the inverter circuit 11 in the reactive-before-active control mode, so that the output active current of the inverter circuit 11 may more slowly decrease, and the bus voltage of the direct current bus BUS may more quickly decrease and be less than the low voltage ride through derating threshold in the low voltage ride through reactive current response process. Therefore, the output reactive current of the inverter circuit 11 meets the standard low voltage ride through reactive current requirement at the end of the low voltage ride through reactive current response process, and the stress risk of the power conversion device 1 is reduced. Further, adaptability of the power conversion device 1 switching from the high voltage ride through state to the low voltage ride through state is improved.

In another optional implementation, the first time interval is earlier than the second time interval, and the first time interval, the second time interval, and the third time interval are earlier than a fourth time interval. In the first time interval in the low voltage ride through reactive current response process, the controller 12 controls the output active current of the inverter circuit 11 based on the first target active current value, to enable the change rate of the output active current of the inverter circuit 11 to be the first change rate. The controller 12 further controls the output reactive current of the inverter circuit 11 based on the first target reactive current value. The first target active current value is determined based on the first target reactive current value and the preset maximum output current value. The first target reactive current value is determined based on the voltage sag value of the alternating current power grid. Then, if the output active current value of the inverter circuit 11 is less than or equal to the active current threshold, in the second time interval in the low voltage ride through reactive current response process, the controller 12 controls the output active current of the inverter circuit 11 based on the second target active current value, to enable the change rate of the output active current of the inverter circuit 11 to be the second change rate. The second target active current value is greater than the output active current value of the inverter circuit 11 at the interval start moment of the second time interval. The controller 12 further controls the output reactive current of the inverter circuit 11 in the second time interval based on the second target reactive current value. The second target reactive current value is determined based on the second target active current value and the preset maximum output current value. In the third time interval in the low voltage ride through reactive current response process, the controller 12 further controls the output active current of the inverter circuit 11 based on the third target active current value, to enable the change rate of the output active current of the inverter circuit 11 to be the third change rate. The third change rate is less than the second change rate. The third target active current value is equal to the output active current value of the inverter circuit 11 at the interval start moment of the third time interval. The controller 12 further controls the output reactive current of the inverter circuit 11 in the third time interval based on the third target reactive current value. The third target reactive current value is determined based on the third target active current value and the preset maximum output current value. Then, the controller 12 controls the output active current of the inverter circuit 11 in the fourth time interval in the low voltage ride through reactive current response process based on a fourth target active current value; and in the process of controlling the output active current of the inverter circuit 11 based on the fourth target active current value, adjusts the fourth target active current value to decrease from a third active current value to the first target active current value, to enable the change rate of the output active current of the inverter circuit 11 to be a fourth change rate. The third active current value is an output active current value of the inverter circuit 11 at an interval start moment of the fourth time interval. The fourth change rate is less than the third change rate. A sum of fourth interval duration of the fourth time interval, third interval duration of the third time interval, the first interval duration, and the second interval duration is less than or equal to the low voltage ride through reactive current response duration threshold. The controller 12 further controls the output reactive current of the inverter circuit 11 in the fourth time interval based on a fourth target reactive current value. The fourth target reactive current value is determined based on the fourth target active current value and the preset maximum output current value.

For specific control manners of the controller 12 in the first time interval, the second time interval, the third time interval, and the fourth time interval, refer to the descriptions of the corresponding parts in the foregoing implementation. Details are not described herein again.

It should be noted that, in this implementation, the second time interval may be earlier than the third time interval, or may be later than the third time interval. For ease of description, with reference to the control sequence diagram of the power conversion device 1 shown in FIG. 8, the following describes a working principle of the power conversion device 1 by using an example in which the second time interval is earlier than the third time interval.

FIG. 8 is another control sequence diagram of a power conversion device according to this application. As shown in FIG. 7, in a period from t0 to t2, for the description of the corresponding part, refer to the description of the corresponding part in FIG. 6. Details are not described herein again.

At the moment t2, the power grid voltage Ug of the alternating current power grid decreases to the low voltage ride through voltage threshold U2.

In a period from t2 to t3, that is, in the first time interval T1, the power grid voltage Ug of the alternating current power grid is less than the low voltage ride through voltage threshold U2, the power conversion device 1 starts to enter and is in the low voltage ride through state, and the controller 12 controls the output active current and the output reactive current of the inverter circuit 11 in a standard low voltage ride through mode. Specifically, the controller 12 obtains the first target reactive current value $I_{q1\_lvrt}$ and the first target active current value $I_{p1\_lvrt}$, and controls the output active current $i_p$ and the output reactive current $i_q$ of the inverter circuit 11 based on the first target reactive current value $I_{q1\_lvrt}$ and the first target active current value $I_{p1\_lvrt}$ respectively. In this period, the output active current $i_p$ of the inverter circuit 11 continuously decreases, and the output reactive current $i_q$ continuously increases. In addition, the change rate of the output active current $i_p$ of the inverter circuit 11 is the first change rate, that is, $(I_{p\_t3}-I_{p\_t2})/(t3-t2)$, and is a slope of a line segment in which the output active current $i_p$ of the first time interval T1 is located. $I_{p\_t3}$ and $I_{p\_t2}$ are output active current values of the inverter circuit 11 at the moment t3 and the moment t2 respectively. In addition, in the first time interval T1, the bus voltage of the direct current bus BUS starts to decrease.

At the moment t3, the power grid voltage Ug of the alternating current power grid is less than the low voltage ride through voltage threshold U2, and the power conversion device 1 is still in the low voltage ride through state. If the output active current $i_p$ of the inverter circuit 11 decreases to the active current threshold $I_p'$, the power conversion device 1 starts to enter the second time interval T2 in the low voltage ride through reactive current response process. In this case, the moment t3 may be understood as an interval start moment of the second time interval T2.

In a period from t3 to t4, that is, in the second time interval T2, the power grid voltage Ug of the alternating current power grid is less than the low voltage ride through voltage threshold U2, and the power conversion device 1 is still in the low voltage ride through state. The output active current $i_p$ of the inverter circuit 11 is less than the active current threshold $I_p'$. In the second time interval T2, the controller 12 controls the output active current $i_p$ of the inverter circuit 11 based on the second target active current value (a current value greater than $I_p'$), so that the output active current $i_p$ of the inverter circuit 11 starts to linearly increase from $I_p'$. The controller 12 further controls the output reactive current $i_q$ of the inverter circuit 11 based on the second target reactive current value, so that the output reactive current $i_q$ of the inverter circuit 11 starts to decrease. In addition, as the output active current $i_p$ of the inverter circuit 11 is controlled, the bus voltage quickly decreases in the second time interval T2. In addition, a decrease speed of the bus voltage in the second time interval T2 is less than a decrease speed in the first time interval T1. In addition, the change rate of the output active current of the inverter circuit 11 in the second time interval T2 is the second change rate, that is, $(I_{p\_t4}-I_{p\_t3})/(t4-t3)$, and is a slope of a line segment in which the output active current $i_p$ of the second time interval T2 is located. $I_{p\_t4}$ and $I_{p\_t3}$ are output active current values of the inverter circuit 11 at the moment t4 and the moment t3 respectively. Further, it may be learned from FIG. 8 that the second change rate is greater than the first change rate.

At the moment t4, the power grid voltage Ug of the alternating current power grid is less than the low voltage ride through voltage threshold U2, and the power conversion device 1 is still in the low voltage ride through state. In this case, the bus voltage of the direct current bus BUS is greater than the low voltage ride through derating threshold UM. The moment t4 may be understood as an interval end moment of the second time interval T2, or may be understood as an interval start moment of the third time interval T3.

In a period from t4 to t5, that is, in the third time interval T3, the power grid voltage Ug of the alternating current power grid is less than the low voltage ride through voltage threshold U2, and the power conversion device 1 is still in the low voltage ride through state. The controller 12 controls the output active current $i_p$ and the output reactive current $i_q$ of the inverter circuit 11 based on a third target active current value (namely, an output active current value of the inverter circuit 11 at the moment t4) and a third target reactive current value respectively, so that the output active current $i_p$ and the output reactive current $i_q$ of the inverter circuit 11 are kept at the third target active current value and the third target reactive current value respectively. In the third time interval T3, as the output active current $i_p$ of the inverter circuit 11 is controlled, the bus voltage of the direct current bus BUS quickly decreases to be less than the low voltage ride through derating threshold UM. In addition, a decrease speed of the bus voltage in the third time interval T3 is greater than a decrease speed in the second time interval T2. In addition, the change rate of the output active current of the inverter circuit 11 in the third time interval T3 is the third change rate, that is, 0. In addition, it may be learned from FIG. 8 that the third change rate is less than the second change rate.

At the moment t5, the power grid voltage Ug of the alternating current power grid is less than the low voltage ride through voltage threshold U2, and the power conversion device 1 is still in the low voltage ride through state. In this case, the bus voltage of the direct current bus BUS is less than the low voltage ride through derating threshold UM. The moment T5 may be understood as an interval end moment of the third time interval T3, or may be understood as an interval start moment of the fourth time interval T4.

In a period from t5 to t6, that is, in the fourth time interval T4, the power grid voltage Ug of the alternating current power grid is less than the low voltage ride through voltage threshold U2, and the power conversion device 1 is still in the low voltage ride through state. The controller 12 controls the output active current $i_p$ and the output reactive current $i_q$ of the inverter circuit 11 based on the fourth target active current value and the fourth target reactive current value respectively. In the process of controlling the output active current $i_p$ of the inverter circuit 11 based on the fourth target active current value, the controller 12 performs at least two equal-difference adjustments on the fourth target active current value, so that the fourth target active current value linearly decreases from a third active current value (namely, an output active current value of the inverter circuit 11 at the moment t5) to the first target active current value $I_{p1\_lvrt}$. Therefore, the output active current $i_p$ of the inverter circuit 11 linearly decreases from the third active current value to the first target active current value $I_{p1\_lvrt}$, and the output reactive current $i_q$ of the inverter circuit 11 increases to the first target reactive current value $I_{q1\_lvrt}$. In addition, the bus voltage of the direct current bus BUS decreases as the output active current $i_p$ of the inverter circuit 11 decreases. In addition, a decrease speed of the bus voltage in the fourth time interval T4 is less than a decrease speed in the third time interval T3. In addition, the change rate of the output active current of the inverter circuit 11 in the fourth time interval T4 is a fourth change rate, that is, $(I_{p\_t6}-I_{p\_t5})/(t6-t5)$, and is a slope of a line segment in which the output active current $i_p$ of the fourth time interval T4 is located. In addition, it may be learned from FIG. 8 that the fourth change rate is less than the third change rate.

At the moment t6, the power grid voltage Ug of the alternating current power grid is less than the low voltage ride through voltage threshold U2, and the power conversion device 1 is still in the low voltage ride through state. The bus voltage of the direct current bus BUS is less than the low voltage ride through derating threshold UM. The output active current and the output reactive current of the inverter circuit 11 are the first target active current value $I_{p1\_lvrt}$ and the first target reactive current value $I_{q1\_lvrt}$ respectively. The low voltage ride through reactive current response process ends.

In a period from t6 to t7, the power grid voltage Ug of the alternating current power grid is less than the low voltage ride through voltage threshold U2, and the power conversion device 1 is still in the low voltage ride through state. The controller 12 controls the output active current $i_p$ and the output reactive current $i_q$ of the inverter circuit 11 based on the first target active current value $I_{p1\_lvrt}$ and the first target reactive current value $I_{q1\_lvrt}$ respectively, so that the output active current $i_p$ and the output reactive current $i_q$ of the inverter circuit 11 are kept at the first target active current value $I_{p1\_lvrt}$ and the first target reactive current value $I_{q1\_lvrt}$ respectively.

At the moment t7, the power grid voltage Ug of the alternating current power grid is greater than the low voltage ride through voltage threshold U2, indicating that the power grid voltage Ug is recovered, and the power conversion device 1 is no longer in the low voltage ride through state.

A sum of T1, T2, T3, and T4 is less than or equal to the low voltage ride through reactive current response duration threshold, and T1, T2, T3, and T4 constitute a low voltage ride through reactive current response phase. A time interval between the moment t2 and the moment t7 is less than or equal to preset total low voltage ride through duration. T2, T3, and T4 may be adaptively adjusted based on an actual application scenario. For example, in a scenario in which the bus voltage needs to more quickly decrease, at least one of T2, T3, and T4 may be appropriately prolonged.

In this embodiment of this application, after switching from the high voltage ride through state to the low voltage ride through state, the power conversion device 1 sequentially controls the output active current of the inverter circuit 11 to increase, be kept, and then decrease to the first target active current value in the second time interval T2, the third time interval T3, and the fourth time interval T4 in the low voltage ride through reactive current response process. The output active current of the inverter circuit 11 in the second time interval T2, the third time interval T3, and the fourth time interval T4 can decrease more slowly than the output active current of the inverter circuit 11 in the reactive-before-active control mode, so that the bus voltage can more quickly decrease and be less than the low voltage ride through derating threshold in the low voltage ride through reactive current response process. Therefore, the output reactive current of the inverter circuit 11 meets the standard low voltage ride through reactive current requirement at the end of the low voltage ride through reactive current response process, and the stress risk of the power conversion device 1 is reduced. Further, adaptability of the power conversion device 1 switching from the high voltage ride through state to the low voltage ride through state is improved.

In another optional implementation, the controller 12 controls the output active current of the inverter circuit 11 in the first time interval and the second time interval in the low voltage ride through reactive current response process based on the first target active current value and the second target active current value respectively, so that the change rate of the output active current of the inverter circuit 11 is the first change rate and the second change rate in the first time interval and the second time interval respectively. The controller 12 further controls the output reactive current of the inverter circuit 11 in the first time interval and the second time interval based on the first target reactive current value and the second target reactive current value respectively. The first target active current value is determined based on the first target reactive current value and the preset maximum output current value. The first target reactive current value is determined based on the voltage sag value of the alternating current power grid. The second target active current value is equal to an output active current value of the inverter circuit 11 at the interval start moment of the second time interval. The second target reactive current value is determined based on the second target active current value and the preset maximum output current value. The second change rate is greater than the first change rate.

It should be noted that, in this implementation, the second time interval may be earlier than the first time interval, or may be later than the first time interval. In this embodiment, an example in which the second time interval is earlier than the first time interval is used for description.

In an embodiment, after the power conversion device 1 switches from the high voltage ride through state to the low voltage ride through state, in the second time interval in the low voltage ride through reactive current response process, the controller 12 determines the output active current value of the inverter circuit 11 at the interval start moment of the second time interval (namely, the output active current value of the inverter circuit 11 at the switching moment when the power conversion device 1 switches from the high voltage ride through state to the low voltage ride through state) as the second target active current value, and obtains the second target reactive current value based on the second target active current value and the preset maximum output current value. Then, the controller 12 obtains the second target output voltage value based on the second target active current value and the second target reactive current value, and controls the output voltage of the inverter circuit 11 based on the second target output voltage value, so that the controller 12 controls the output active current and the output reactive current of the inverter circuit 11 based on the second target active current value and the second target reactive current value respectively. Then, in the first time interval in the low voltage ride through reactive current response process, the controller 12 obtains the target reactive current increment based on the voltage sag value, and obtains the first target reactive current value based on the initial target reactive current value and the target reactive current increment, to obtain the first target active current value based on the first target reactive current value and the preset maximum output current value. Further, the controller 12 obtains the first target output voltage value based on the first target active current value and the first target reactive current value, and controls the output voltage of the inverter circuit 11 based on the first target output voltage value, so that the controller 12 controls the output active current and the output reactive current of the inverter circuit 11 based on the first target active current value and the first target reactive current value respectively.

Herein, for a specific control manner of the controller 12 in the first time interval, refer to the description of the corresponding part in the foregoing implementation. For a specific control manner of the controller 12 in the second time interval, refer to the description of the second time interval in FIG. 6. Details are not described herein again.

For ease of description, the following describes a working principle of the power conversion device 1 with reference to a control sequence diagram of the power conversion device 1 shown in FIG. 9.

FIG. 9 is another control sequence diagram of a power conversion device according to this application. As shown in FIG. 9, at a moment t0, the power grid voltage Ug of the alternating current power grid is greater than the high voltage ride through voltage threshold U1, the power conversion device 1 enters the high voltage ride through state, and the controller 12 controls the output active current and the output reactive current of the inverter circuit 11 in the standard high voltage ride through mode. Therefore, active and reactive power support is provided for the alternating current power grid, to facilitate recovery of the power grid voltage Ug of the alternating current power grid.

In a period from t0 to t1, the power grid voltage Ug of the alternating current power grid is greater than the high voltage ride through voltage threshold U1, the power conversion device 1 is still in the high voltage ride through state, and a control manner of the controller 12 is consistent with a control manner of the controller 12 at the moment to.

At the moment t1, the power grid voltage Ug of the alternating current power grid decreases to the high voltage ride through voltage threshold U1, and the power conversion device 1 is no longer in the high voltage ride through state.

In a period from t1 to t2, the power grid voltage Ug of the alternating current power grid continuously decreases.

At the moment t2, the power grid voltage Ug of the alternating current power grid decreases to the low voltage ride through voltage threshold U2.

In a period from t2 to t3, that is, in the second time interval T2, the power grid voltage Ug of the alternating current power grid is less than the low voltage ride through voltage threshold U2, the power conversion device 1 starts to enter and is in the low voltage ride through state, and the controller 12 controls the output active current $i_p$ and the output reactive current $i_q$ of the inverter circuit 11 based on the second target active current value (namely, an output active current value of the inverter circuit 11 at the moment t2) and the second target reactive current value respectively, so that the output active current $i_p$ and the output reactive current $i_q$ of the inverter circuit 11 are kept at the second target active current value and the second target reactive current value respectively. As the output active current $i_p$ of the inverter circuit 11 is controlled, the bus voltage of the direct current bus BUS quickly decreases in the second time interval T2, and the bus voltage is greater than the low voltage ride through derating threshold UM. In addition, the change rate of the output active current of the inverter circuit 11 in the second time interval T2 is the second change rate, that is, 0.

At the moment t3, the power grid voltage Ug of the alternating current power grid is less than the low voltage ride through voltage threshold U2, and the power conversion device 1 is still in the low voltage ride through state. The bus voltage of the direct current bus BUS is still greater than the low voltage ride through derating threshold UM.

In a period from t3 to t4, that is, in the first time interval T1, the power grid voltage Ug of the alternating current power grid is less than the low voltage ride through voltage threshold U2, and the power conversion device 1 is still in the low voltage ride through state. The controller 12 controls the output active current and the output reactive current of the inverter circuit 11 in a standard low voltage ride through mode. Specifically, the controller 12 obtains the first target reactive current value $I_{q1\_lvrt}$ and the first target active current value $I_{p1\_lvrt}$, and controls the output active current $i_p$ and the output reactive current $i_q$ of the inverter circuit 11 based on the first target reactive current value $I_{q1\_lvrt}$ and the first target active current value $I_{p1\_lvrt}$ respectively, so that the output active current $i_p$ of the inverter circuit 11 starts to decrease from the second target active current value and decreases to the first target active current value $I_{p1\_lvrt}$, and the output reactive current $i_q$ starts to increase from the second target reactive current value and increases to the first target reactive current value $I_{q1\_lvrt}$. In addition, the change rate of the output active current $i_p$ of the inverter circuit 11 in the first time interval T1 is the first change rate, that is, $(I_{p\_t4}-I_{p\_t3})/(t4-t3)$, and is a slope of a line segment in which the output active current $i_p$ of the first time interval T1 is located. $I_{p\_t4}$ and $I_{p\_t3}$ are output active current values of the inverter circuit 11 at the moment t4 and the moment t3 respectively. It may be learned from FIG. 9 that the first change rate is less than the second change rate. In the first time interval T1, the bus voltage of the direct current bus BUS continues to decrease and decreases to be less than the low voltage ride through derating threshold UM. In addition, a decrease speed of the bus voltage in the first time interval T1 is less than a decrease speed in the second time interval T2.

At the moment t4, the power grid voltage Ug of the alternating current power grid is less than the low voltage ride through voltage threshold U2, and the power conversion device 1 is still in the low voltage ride through state. The bus voltage of the direct current bus BUS is less than the low voltage ride through derating threshold UM. The output active current and the output reactive current of the inverter circuit 11 are the first target active current value $I_{p1\_lvrt}$ and the first target reactive current value $I_{q1\_lvrt}$ respectively. The low voltage ride through reactive current response process ends.

In a period from t4 to t5, the power grid voltage Ug of the alternating current power grid is less than the low voltage ride through voltage threshold U2, and the power conversion device 1 is still in the low voltage ride through state. The controller 12 controls the output active current $i_p$ and the output reactive current $i_q$ of the inverter circuit 11 based on the first target active current value $I_{p1\_lvrt}$ and the first target reactive current value $I_{q1\_lvrt}$ respectively, so that the output active current $i_p$ and the output reactive current $i_q$ of the inverter circuit 11 are kept at the first target active current value $I_{p1\_lvrt}$ and the first target reactive current value $I_{q1\_lvrt}$ respectively.

At the moment t5, the power grid voltage Ug of the alternating current power grid is greater than the low voltage ride through voltage threshold U2, indicating that the power grid voltage Ug is recovered, and the power conversion device 1 is no longer in the low voltage ride through state.

A sum of T1 and T2 is less than or equal to the low voltage ride through reactive current response duration threshold, and T1 and T2 constitute the low voltage ride through reactive current response phase. A time interval between the moment t2 and the moment t5 is less than or equal to preset total low voltage ride through duration. T1 and T2 may be adaptively adjusted based on an actual application scenario. For example, in a scenario in which the bus voltage needs to more quickly decrease, T2 may be appropriately prolonged.

In this embodiment of this application, after switching from the high voltage ride through state to the low voltage ride through state, the power conversion device 1 sequentially controls the output active current of the inverter circuit 11 to be kept and then decrease to the first target active current value in the second time interval T2 and the first time interval T1 in the low voltage ride through reactive current response process. The output active current of the inverter circuit 11 in the second time interval T2 can decrease more slowly than the output active current of the inverter circuit 11 in the reactive-before-active control mode, so that the bus voltage can more quickly decrease and be less than the low voltage ride through derating threshold in the low voltage ride through reactive current response process. Therefore, the output reactive current of the inverter circuit 11 meets the standard low voltage ride through reactive current requirement at the end of the low voltage ride through reactive current response process, and the stress risk of the power conversion device 1 is reduced. Further, adaptability of the power conversion device 1 switching from the high voltage ride through state to the low voltage ride through state is improved.

In still another optional implementation, the controller 12 controls the output active current of the inverter circuit 11 in the first time interval and the second time interval in the low voltage ride through reactive current response process based on the first target active current value and the second target active current value respectively, so that the change rate of the output active current of the inverter circuit 11 is the first change rate and the second change rate in the first time interval and the second time interval respectively. The controller 12 further controls the output reactive current of the inverter circuit 11 in the first time interval and the second time interval based on the first target reactive current value and the second target reactive current value respectively. The first target active current value is determined based on the first target reactive current value and the preset maximum output current value. The first target reactive current value is determined based on the voltage sag value of the alternating current power grid. The second target active current value is greater than an output active current value of the inverter circuit 11 at an interval start moment of the second time interval. The second target reactive current value is determined based on the second target active current value and the preset maximum output current value. The second change rate is greater than the first change rate.

It should be noted that, in this implementation, the second time interval may be earlier than the first time interval, or may be later than the first time interval. In this embodiment, an example in which the second time interval is earlier than the first time interval is used for description.

In an embodiment, after the power conversion device 1 switches from the high voltage ride through state to the low voltage ride through state, in the second time interval in the low voltage ride through reactive current response process, the controller 12 obtains the second target reactive current value based on the second target active current value and the preset maximum output current value. The second target active current value is greater than the output active current value of the inverter circuit 11 at the interval start moment of the second time interval (namely, the output active current value of the inverter circuit 11 at the switching moment when the power conversion device 1 switches from the high voltage ride through state to the low voltage ride through state). Then, the controller 12 obtains the second target output voltage value based on the second target active current value and the second target reactive current value, and controls the output voltage of the inverter circuit 11 based on the second target output voltage value, so that the controller 12 controls the output active current and the output reactive current of the inverter circuit 11 based on the second target active current value and the second target reactive current value respectively. Then, in the first time interval in the low voltage ride through reactive current response process, the controller 12 obtains the target reactive current increment based on the voltage sag value, and obtains the first target reactive current value based on the initial target reactive current value and the target reactive current increment, to obtain the first target active current value based on the first target reactive current value and the preset maximum output current value. Further, the controller 12 obtains the first target output voltage value based on the first target active current value and the first target reactive current value, and controls the output voltage of the inverter circuit 11 based on the first target output voltage value, so that the controller 12 controls the output active current and the output reactive current of the inverter circuit 11 based on the first target active current value and the first target reactive current value respectively.

Herein, for a specific control manner of the controller 12 in the first time interval, refer to the description of the corresponding part in the foregoing implementation. For a specific control manner of the controller 12 in the second time interval, refer to the description of the second time interval in FIG. 7. Details are not described herein again.

For ease of description, the following describes a working principle of the power conversion device 1 with reference to a control sequence diagram of the power conversion device 1 shown in FIG. 10.

FIG. 10 is still another control sequence diagram of a power conversion device according to this application. As shown in FIG. 10, at a moment t0, the power grid voltage Ug of the alternating current power grid is greater than the high voltage ride through voltage threshold U1, the power conversion device 1 enters the high voltage ride through state, and the controller 12 controls the output active current and the output reactive current of the inverter circuit 11 in the standard high voltage ride through mode. Therefore, active and reactive power support is provided for the alternating current power grid, to facilitate recovery of the power grid voltage Ug of the alternating current power grid.

In a period from t0 to t1, the power grid voltage Ug of the alternating current power grid is greater than the high voltage ride through voltage threshold U1, the power conversion device 1 is still in the high voltage ride through state, and a control manner of the controller 12 is consistent with a control manner of the controller 12 at the moment to.

At the moment t1, the power grid voltage Ug of the alternating current power grid decreases to the high voltage ride through voltage threshold U1, and the power conversion device 1 is no longer in the high voltage ride through state.

In a period from t1 to t2, the power grid voltage Ug of the alternating current power grid continuously decreases.

At the moment t2, the power grid voltage Ug of the alternating current power grid decreases to the low voltage ride through voltage threshold U2.

In a period from t2 to t3, that is, in the second time interval T2, the power grid voltage Ug of the alternating current power grid is less than the low voltage ride through voltage threshold U2, the power conversion device 1 starts to enter and is in the low voltage ride through state, and the controller 12 controls the output active current $i_p$ and the output reactive current $i_q$ of the inverter circuit 11 based on the second target active current value (namely, a current value greater than an output active current value of the inverter circuit 11 at the moment t2) and the second target reactive current value respectively, so that the output active current $i_p$ and the output reactive current $i_q$ of the inverter circuit 11 both increase. As the output active current $i_p$ of the inverter circuit 11 is controlled, the bus voltage of the direct current bus BUS quickly decreases in the second time interval T2, and the bus voltage is greater than the low voltage ride through derating threshold UM. In addition, the change rate of the output active current of the inverter circuit 11 in the second time interval T2 is the second change rate, that is, $(I_{p\_t3} - I_{p\_t2})/(t3 - t2)$, and is a slope of a line segment in which the output active current $i_p$ of the second time interval T2 is located.

At the moment t3, the power grid voltage Ug of the alternating current power grid is less than the low voltage ride through voltage threshold U2, and the power conversion device 1 is still in the low voltage ride through state. The bus voltage of the direct current bus BUS is still greater than the low voltage ride through derating threshold UM.

In a period from t3 to t4, that is, in the first time interval T1, the power grid voltage Ug of the alternating current power grid is less than the low voltage ride through voltage threshold U2, and the power conversion device 1 is still in the low voltage ride through state. The controller 12 controls the output active current and the output reactive current of the inverter circuit 11 in a standard low voltage ride through mode. Specifically, the controller 12 obtains the first target reactive current value $I_{q1\_lvrt}$ and the first target active current value $I_{p1\_lvrt}$, and controls the output active current $i_p$ and the output reactive current $i_q$ of the inverter circuit 11 based on the first target reactive current value $I_{q1\_lvrt}$ and the first target active current value $I_{p1\_lvrt}$ respectively, so that the output active current $i_p$ of the inverter circuit 11 starts to decrease from an output active current value of the inverter circuit 11 at the moment t3 and decreases to the first target active current value $I_{p1\_lvrt}$, and the output reactive current $i_q$ starts to increase from an output reactive current value of the inverter circuit 11 at the moment t3 and increases to the first target reactive current value $I_{q1\_lvrt}$. In addition, the change rate of the output active current $i_p$ of the inverter circuit 11 in the first time interval T1 is the first change rate, that is, $(I_{p\_t4} - I_{p\_t3})/(t4 - t3)$, and is a slope of a line segment in which the output active current $i_p$ of the first time interval T1 is located. $I_{p\_t4}$ and $I_{p\_t3}$ are output active current values of the inverter circuit 11 at the moment t4 and the moment t3 respectively. It may be learned from FIG. 10 that the first change rate is less than the second change rate. In the first time interval T1, the bus voltage of the direct current bus BUS continues to decrease and decreases to be less than the low voltage ride through derating threshold UM. In addition, a decrease speed of the bus voltage in the first time interval T1 is less than a decrease speed in the second time interval T2.

At the moment t4, the power grid voltage Ug of the alternating current power grid is less than the low voltage ride through voltage threshold U2, and the power conversion device 1 is still in the low voltage ride through state. The bus voltage of the direct current bus BUS is less than the low voltage ride through derating threshold UM. The output active current and the output reactive current of the inverter circuit 11 are the first target active current value $I_{p1\_lvrt}$ and the first target reactive current value $I_{q1\_lvrt}$ respectively. The low voltage ride through reactive current response process ends.

In a period from t4 to t5, the power grid voltage Ug of the alternating current power grid is less than the low voltage ride through voltage threshold U2, and the power conversion device 1 is still in the low voltage ride through state. The controller 12 controls the output active current in and the output reactive current $i_q$ of the inverter circuit 11 based on the first target active current value $I_{p1\_lvrt}$ and the first target reactive current value $I_{q1\_lvrt}$ respectively, so that the output active current $i_p$ and the output reactive current $i_q$ of the inverter circuit 11 are kept at the first target active current value $I_{p1\_lvrt}$ and the first target reactive current value $I_{q1\_lvrt}$ respectively.

At the moment t5, the power grid voltage Ug of the alternating current power grid is greater than the low voltage ride through voltage threshold U2, indicating that the power grid voltage Ug is recovered, and the power conversion device 1 is no longer in the low voltage ride through state.

A sum of T1 and T2 is less than or equal to the low voltage ride through reactive current response duration threshold, and T1 and T2 constitute the low voltage ride through reactive current response phase. A time interval between the moment t2 and the moment t5 is less than or equal to preset total low voltage ride through duration. T1 and T2 may be adaptively adjusted based on an actual application scenario. For example, in a scenario in which the bus voltage needs to more quickly decrease, T2 may be appropriately prolonged.

In this embodiment of this application, after switching from the high voltage ride through state to the low voltage ride through state, the power conversion device 1 sequentially controls the output active current of the inverter circuit 11 to increase and then decrease to the first target active current value in the second time interval T2 and the first time interval T1 in the low voltage ride through reactive current response process. The output active current of the inverter circuit 11 in the second time interval T2 can decrease more slowly than the output active current of the inverter circuit 11 in the reactive-before-active control mode, so that the bus voltage can more quickly decrease and be less than the low voltage ride through derating threshold in the low voltage ride through reactive current response process. Therefore, the output reactive current of the inverter circuit 11 meets the standard low voltage ride through reactive current requirement at the end of the low voltage ride through reactive current response process, and the stress risk of the power conversion device 1 is reduced. Further, adaptability of the power conversion device 1 switching from the high voltage ride through state to the low voltage ride through state is improved.

It should be noted that the foregoing implementations are described by using an example in which the first change rate is the change rate of the output current of the inverter circuit 11 in the reactive-before-active control mode. If the second change rate corresponds to the change rate of the output current of the inverter circuit 11 in the reactive-before-active control mode, in the low voltage ride through reactive current response process, the power conversion device 1 controls, in the first time interval, the change rate of the output active current of the inverter circuit 11 to be the first change rate less than the second change rate, so that a decrease speed of the voltage of the direct current bus can be reduced. Therefore, a manner of controlling the voltage of the direct current bus by the power conversion device 1 is more flexible. Further, adaptability of the power conversion device 1 switching from the high voltage ride through state to the low voltage ride through state can be further improved.

Further, the power conversion device 1 shown in FIG. 4 may further include a DC/DC circuit. For details, refer to a power conversion device shown in FIG. 11. As shown in FIG. 11, the power conversion device 1 includes a positive direct current bus BUS+, a negative direct current bus BUS−, an inverter circuit 11, a controller 12, a DC/DC circuit 131, . . . , and a DC/DC circuit 13n. n is a positive integer. Input ends of the power conversion device 1 are connected to a direct current power supply 21, . . . , and a direct current power supply 2n respectively. Output ends o11, o12, and o13 are connected to the alternating current power grid. After passing through the positive direct current bus BUS+ and the negative direct current bus BUS-respectively, input ends i11+ and i11− of the inverter circuit 11 are connected to the input ends of the power conversion device 1 through the DC/DC circuit 131, . . . , and the DC/DC circuit 13n that are parallel-connected to the positive direct current bus BUS+ and the negative direct current bus BUS−. Output ends o111, o112, and o113 of the inverter circuit 11 are connected to o11, o12, and o13 of the power conversion device 1 respectively.

The direct current power supply may be a photovoltaic string, an energy storage battery cluster, a wind turbine, or the like. The controller 12 may include a direct current control unit and an alternating current control unit. The direct current control unit is configured to control the n DC/DC circuits. The alternating current control unit is configured to control the inverter circuit 11. When the power conversion device 1 works, the controller 12 can control the n DC/DC circuits to perform direct current conversion on a direct current output by the n direct current power supplies. When the direct current power supply is a photovoltaic string, the controller 12 can control the DC/DC circuits to implement direct current conversion, and also implement maximum power point tracking (MPPT) of the photovoltaic string, to ensure high-efficiency power generation of the photovoltaic string.

Herein, for a working principle according to which the power conversion device 1 performs continuous ride through from a high voltage to a low voltage, refer to the description of the corresponding part of the power conversion device 1 shown in FIG. 4. Details are not described herein again.

In this embodiment of this application, if the first change rate corresponds to the change rate of the output active current of the inverter circuit 11 in the reactive-before-active control mode, in the low voltage ride through reactive current response process, the power conversion device 1 controls the second change rate of the output active current of the inverter circuit 11 in the second time interval to be greater than the first change rate, so that the decrease speed of the output active current of the inverter circuit 11 in the second time interval is less than the decrease speed of the output active current of the inverter circuit 11 in the reactive-before-active control mode, and the bus voltage of the direct current bus BUS quickly decreases in the low voltage ride through reactive current response process and is less than the low voltage ride through derating threshold. Therefore, the output reactive current of the inverter circuit 11 meets the standard low voltage ride through reactive current requirement at the end of the low voltage ride through reactive current response process, and the stress risk of the power conversion device 1 is reduced. On the contrary, if the second change rate corresponds to the change rate of the output current of the inverter circuit in the reactive-before-active control mode, in the first time interval in the low voltage ride through reactive current response process, the power conversion device controls the change rate of the output active current of the inverter circuit to be the first change rate less than the second change rate, so that the decrease speed of the bus voltage can be reduced. Therefore, the manner of controlling the bus voltage by the power conversion device is more flexible. Further, adaptability of the power conversion device 1 switching from the high voltage ride through state to the low voltage ride through state can be improved. In addition, the power conversion device 1 may further include the DC/DC circuits and has diversified structures and high flexibility.

FIG. 12 is a schematic flowchart of a control method of a power conversion device according to this application. The control method of the power conversion device provided in this embodiment of this application is applicable to the power conversion device 1 shown in FIG. 3, FIG. 4, and FIG. 11. The control method of the power conversion device may include the following steps.

S101: Control the power conversion device to be in a high voltage ride through state when a power grid voltage of an alternating current power grid is greater than a high voltage ride through voltage threshold, and control the power conversion device to be in a low voltage ride through state when the power grid voltage of the alternating current power grid is less than a low voltage ride through voltage threshold.

The high voltage ride through state may be a standard high voltage ride through state.

S102: After the power conversion device switches from the high voltage ride through state to the low voltage ride through state, control a change rate of an output active current of an inverter circuit to be a first change rate in a first time interval and a second change rate in a second time interval respectively in a low voltage ride through reactive current response process.

The second change rate is greater than the first change rate. A sum of first interval duration of the first time interval and second interval duration of the second time interval is less than or equal to a low voltage ride through reactive current response duration threshold.

In an implementation, the power conversion device determines a first target active current value in the first time interval based on a first target reactive current value and a preset maximum output current value, and controls an output active current of the inverter circuit based on the first target active current value, to enable the change rate of the output active current of the inverter circuit to be the first change rate.

In the second time interval in the low voltage ride through reactive current response process, the power conversion device controls the change rate of the output active current of the inverter circuit to be the second change rate.

In an optional implementation, the first time interval is earlier than the second time interval. The power conversion device controls the output active current of the inverter circuit in the second time interval based on the second target active current value; and in the process of controlling the output active current of the inverter circuit based on the second target active current value, adjusts the second target active current value to decrease from a first active current value to the first target active current value, to enable the change rate of the output active current of the inverter circuit to be the second change rate. The first active current value is a sum of the first target active current value and a preset active current increment. The preset active current increment is determined based on a rated output current value of the inverter circuit and a preset bus voltage attenuation coefficient.

In another optional implementation, the first time interval is earlier than the second time interval. If the output active current of the inverter circuit is less than or equal to an active current threshold, the power conversion device controls an output active current and an output reactive current of the inverter circuit in the second time interval based on a second target active current value and a second target reactive current value respectively; and in the process of controlling the output active current of the inverter circuit based on the second target active current value, adjusts the second target active current value to decrease from a first active current value to the first target active current value, to enable the change rate of the output active current of the inverter circuit to be the second change rate. The first active current value is a sum of the first target active current value and a preset active current increment. The preset active current increment is determined based on a rated output current value of the inverter circuit and a preset bus voltage attenuation coefficient. The second target reactive current value is determined based on the second target active current value and the preset maximum output current value.

In another optional implementation, the power conversion device controls the output active current and the output reactive current of the inverter circuit in the second time interval based on the second target active current value and the second target reactive current value respectively, so that the change rate of the output active current of the inverter circuit is the second change rate. The second target active current value is equal to an output active current value of the inverter circuit at the interval start moment of the second time interval. The second target reactive current value is determined based on the second target active current value and the preset maximum output current value.

In another optional implementation, the power conversion device controls the output active current and the output reactive current of the inverter circuit in the second time interval based on the second target active current value and the second target reactive current value respectively, so that the change rate of the output active current of the inverter circuit is the second change rate. The second target active current value is greater than an output active current value of the inverter circuit at an interval start moment of the second time interval. The second target reactive current value is determined based on the second target active current value and the preset maximum output current value.

During specific implementation, for more operations performed by the controller in the control method of the power conversion device provided in this application, refer to the implementations performed by the power conversion device 1 shown in FIG. 3, FIG. 4, and FIG. 11. Details are not described herein again.

In this embodiment of this application, if the first change rate corresponds to a change rate of the output active current of the inverter circuit in a reactive-before-active control mode, in the low voltage ride through reactive current response process, the power conversion device controls the second change rate of the output active current of the inverter circuit in the second time interval to be greater than the first change rate, so that a decrease speed of the output active current of the inverter circuit in the second time interval is less than a decrease speed of the output active current of the inverter circuit in the reactive-before-active control mode, and a bus voltage of a direct current bus quickly decreases in the low voltage ride through reactive current response process and is less than a low voltage ride through derating threshold. Therefore, the output reactive current of the inverter circuit meets the standard low voltage ride through reactive current requirement at the end of the low voltage ride through reactive current response process, and the stress risk of the power conversion device is reduced. On the contrary, if the second change rate corresponds to the change rate of the output current of the inverter circuit in the reactive-before-active control mode, in the first time interval in the low voltage ride through reactive current response process, the power conversion device controls the change rate of the output active current of the inverter circuit to be the first change rate less than the second change rate, so that a decrease speed of the bus voltage can be reduced. Therefore, a manner of controlling the bus voltage by the power conversion device is more flexible. Further, adaptability of the power conversion device can be improved.

The following describes the technical solution provided in this application from another perspective. Due to fluctuation of a power grid voltage, a power converter may need to continuously adjust an active power and a reactive power that are output by the power converter to cope with the fluctuation of the power grid voltage, to stabilize the power grid voltage and maintain stable running of the power converter. The active power and the reactive power that are output by the power converter may be adjusted in a manner of adjusting an active current and a reactive current that are output by the power converter.

In some cases, when the power grid voltage fluctuates, the power grid voltage increases to a high voltage ride through threshold in a time interval, and then decreases to be less than a low voltage ride through threshold. This process may occur in a short period as little as 20 ms. In this case, the process may be referred to as a continuous high and low voltage ride through process. When the power converter experiences the continuous high and low voltage ride through process, the power converter needs to send a specific amount of reactive response current to a power grid within specific time after the low voltage ride through process starts. Therefore, reactive power support is provided for the power grid, and stability of the power grid is maintained. When voltage fluctuation occurs, different power grids may have different requirements for time during which the power converter performs a reactive current response. For example, some power grids may require the power converter to output a specific amount of reactive current within 60 ms. Some power grids may require the power converter to output a specific amount of reactive current within 30 ms.

When the power converter does not experience fluctuation of the power grid voltage, the power converter is capable of generating a reactive current required by the power grid. However, because the power converter experiences a rise of the power grid voltage in the continuous high and low voltage ride through process, a bus voltage of the power converter is increased. After the bus voltage is increased, a capability of a power device in the power converter to output a current is affected. In a short period after the continuous ride through from the high voltage to the low voltage, the power device in the power converter may not be capable of quickly outputting the reactive current required by the power grid due to limited capability. To cope with such a case in which the power grid voltage continuously fluctuates, a power component with a higher specification may be configured for the power converter. However, this increases production and manufacturing costs of the entire power converter. To avoid increasing production and manufacturing costs, this embodiment of this application provides another problem resolving idea. The following describes technical principles and solutions provided in this application with reference to the accompanying drawings.

As shown in FIG. 3 and FIG. 4 in the drawings of the specification, the power conversion device is an inverter. Correspondingly, a power conversion circuit in the power conversion device may be an inverter circuit, and direct current input ports of the power conversion circuit are connected to direct current buses BUS+ and BUS−. A bus capacitor is connected between the direct current buses BUS+ and BUS−. The input ends of the power conversion circuit are connected to the direct current input ports of the power conversion device through the direct current buses BUS+ and BUS−. The direct current input ports of the power conversion device are connected to a direct current source. The direct current source may be a photovoltaic module, an energy storage device, or the like. An alternating current output port of the power conversion device is connected to a load. The load may be various power grids or various electrical devices. The following describes the technical solution by using a scenario in which the power conversion device is connected to the power grid. In this case, the power grid voltage is a voltage of the alternating current output port of the power conversion device.

As shown in FIG. 1 in the drawings of the specification, if the power conversion device directly outputs a reactive current immediately after experiencing the ride through from the high voltage to the low voltage, it may be learned that a reactive current output capability of the power conversion device is insufficient, and an output reactive current value cannot reach $I_{q1\_lvrt}$. In addition, it may be learned that at the end of low voltage ride through, the bus voltage still remains greater than Um, where Um is a maximum value of a reactive current $I_{q1\_lvrt}$ that is required by the power grid and that can be output by the power conversion device. If the bus voltage is greater than Um, the reactive current output capability of the power conversion device can no longer meet the requirement of outputting the reactive current whose current value is $I_{q1\_lvrt}$.

To enable the power converter to send a reactive current that meets a power grid requirement as soon as possible when the power grid voltage Ug increases to be greater than a high voltage ride through voltage threshold and then the power grid voltage Ug decreases to be less than a low voltage ride through voltage threshold, this application proposes an active current preferential output mode. To be specific, although the power grid requires the power converter to send a specific size or amount of reactive current in a time interval, the active current may be preferentially sent for a period in a smaller time interval in the time interval, so that the active current is kept at a high value for output. In this way, the bus voltage Ubus can decrease as soon as possible. After the bus voltage Ubus decreases, the reactive current output capability of the power component in the power converter can be restored, so that the reactive current required by the power grid can be easily output. The specific logic is as follows: A current output capability of the power device is $Imax^2 = I_p^2 + Iq^2$, and Imax is limited by the bus voltage Ubus. If the reactive current Iq is preferentially output, and Imax is less than Iq1_lvrt due to the limit of the bus voltage Ubus, a required reactive current cannot be output anyway. However, if an active current is preferentially output, the active current can decrease the bus voltage Ubus. In this way, Imax increases. When Imax increases to be greater than Iq1_lvrt, the reactive current is preferentially output. In this case, the reaction current whose current value is greater than Iq1_lvrt can be output.

It should be noted that the bus voltage Ubus is equal to a voltage at both ends of the bus capacitor, and the bus capacitor has a specific voltage because a specific amount of positive and negative charges are accumulated at both ends. In other words, the bus capacitor stores a specific amount of charges as an energy storage element. If the bus voltage Ubus needs to decrease, the bus capacitor needs to release charges. In other words, an active power Pout output by the direct current buses BUS+ and BUS− at the later stage should be greater than the input power that is input from the direct current source at the previous stage to the direct current bus. In this way, the bus capacitor needs to release part of stored energy to meet the requirement of outputting the active power Pout at the rear stage. The process that the capacitor releases charges can also be regarded as the process that the bus capacitor outputs a current. A time integral of the current output by the bus capacitor is the amount of charges released by the capacitor. For the principle, refer to FIG. 13. In addition, the amount of charges on the capacitor may be expressed as Q-CU. Therefore, the amount of charges released by the bus capacitor may be expressed as $\Delta Q = C\Delta U$.

In a preferential manner of the active current Ip, there are a plurality of power output manners. The various different output manners may be represented by various different change rates K of the active current Ip in the preferential output manner of the active current Ip. The change rate K of the active current Ip may be expressed as a change amount of the active current Ip in a period divided by duration of the period. For example, a formula of the change rate K of the active current Ip may be expressed as $K=(X1-X2)/(Y1-Y2)$, where $X1-X2$ is the change amount of the active current Ip in the period, and $Y1-Y2$ is the duration of the period. As shown in FIG. 14, in the preferential manner of the active current Ip, the active current Ip is changed at a positive change rate k1, and is continuously output at a high level, so that the bus voltage Ubus can decrease to be less than a target voltage value Um in a first period T1. In this way, the power device in the power converter can rapidly decrease to Ip1_lvrt at the end of the first period T1. Therefore, a sufficiently high reactive current Iq1_lvrt can be effectively output.

A specific principle is as follows: The inverter circuit in the power converter is controlled to preferentially output the active current Ip, and the active current Ip is adjusted to be high, or the active current Ip is adjusted to be high in some subperiods, so that the inverter circuit can output a high active power Pout in a short time, and an input power Pin of the power conversion device is equal to the input power of the inverter circuit, and the input voltage of the inverter circuit is the voltage Ubus of the direct current bus. Therefore, the active current input from a previous stage of the inverter circuit to the inverter circuit is equal to the input power Pin of the power conversion device divided by the voltage Ubus of the direct current bus, that is, Pin/Ubus. Then, the input current of the inverter circuit is calculated from the prospective of the output side of the inverter circuit. It may be learned that the input power of the inverter circuit needs to be equal to the active power Pout output by the inverter circuit. The input current of the inverter circuit should be equal to the active power Pout output by the inverter circuit divided by the voltage Ubus of the direct current bus, that is, Pout/Ubus. When the active current Ip output by the inverter circuit is a high value, the active power Pout output by the inverter circuit may be a high value, so that Pout>Pin, that is, Pout/Ubus>Pin/Ubus. In this way, the current actually "extracted" by the inverter circuit from the previous stage is greater than the current input by the previous stage, and the excess current needs to be obtained from the energy storage element, namely, the bus capacitor, of the direct current bus. Therefore, the amount of current extracted from the bus capacitor may be expressed as Pout/Ubus−Pin/Ubus. A time integral of the amount of current output by the bus capacitor in a period is the amount of charges released by the bus capacitor. Therefore, to enable the voltage of the bus capacitor to decrease to Um or be less than Um, that is, to enable the bus voltage Ubus to decrease to Um or be less than Um, the amount of charges to be released is $\Delta Q=C(Uo-Um)$, where Uo is a voltage value of the bus capacitor at a moment t2. Therefore, when the power converter experiences continuous high and low voltage ride through of the power grid voltage, the inverter circuit in the power converter needs to be controlled to preferentially output the active current, so that the active power Pout output by the inverter circuit satisfies $$\int_{t2}^{t3} (Pout(t)/\beta/Ubus(t) - \alpha \cdot Pin(t)/Ubus(t))dt \geq \Delta Q$$

in a period from the moment t2 to a moment t3. In this case, a method for calculating the active power Pout output by the inverter circuit varies with different loads. For example, when the power grid voltage is usually a three-phase balanced load, the output power is Pout=3*Ip*Ug (Ug is a phase voltage). A specific situation of the power grids or the load is not specifically limited in embodiments of this application.

Specifically, as shown in FIG. 14 in the drawings of the specification, the active current Ip output by the inverter circuit may be controlled to change at the first change rate k1, where k1>0, and the active current Ip increases. Qout indicates the time integral of the amount of current "extracted" by the inverter circuit from the previous stage, and Qin indicates the time integral of the amount of current input by the direct current source to the inverter circuit. When Qout is greater than Qin, and Qout−Qin is greater than $\Delta Q$, it indicates that a part of the current "extracted" by the inverter circuit from the previous stage comes from the bus capacitor, and the amount of charges released by the bus capacitor is greater than $\Delta Q$. In this way, the voltage of the bus capacitor decreases to Um within t1. Therefore, the power component of the power conversion device can smoothly output a sufficient amount of reactive current Iq. A rising curve k1 of the active current Ip does not need to cover the entire period from the moment t2 to the moment t3, and the active current may remain unchanged in the middle of the rising curve or prior to or later than the rising curve. As shown in FIG. 15, the active current Ip remains unchanged in a period T6. The bus voltage Ubus also decreases to be less than Um already in the period T1.

As shown in FIG. 16, if the active current Ip is at a high level from the beginning, the active current decreases at a change rate k2, so that $$\int_{t2}^{t3} (Pout(t)/\beta/Ubus(t) - \alpha \cdot Pin(t)/Ubus(t))dt \geq \Delta Q$$

can also be satisfied, and the purpose can also be achieved. Similarly, if an initial value of the active current Ip is not large enough, the active current Ip may increase at a change rate k3 greater than 0 for a period, and then decrease at a change rate k4 less than 0. As shown in FIG. 17, the active current may alternatively decrease and then increase. As long as the foregoing condition $$\int_{t2}^{t3} (Pout(t)/\beta/Ubus(t) - \alpha \cdot Pin(t)/Ubus(t))dt \geq \Delta Q$$

is satisfied, the bus voltage Ubus decreases to be less than Um at the moment t3 or before the moment t3 without being affected.

Figure 19A:
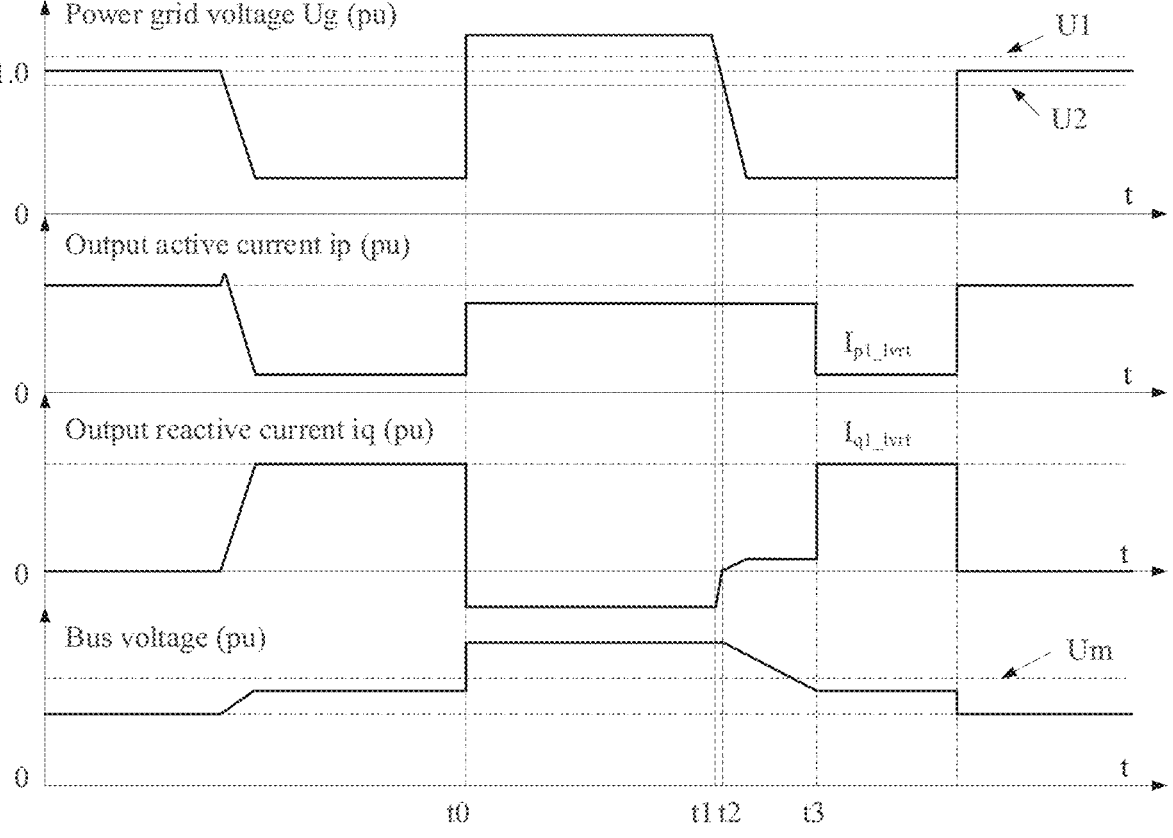
Figure 19B:
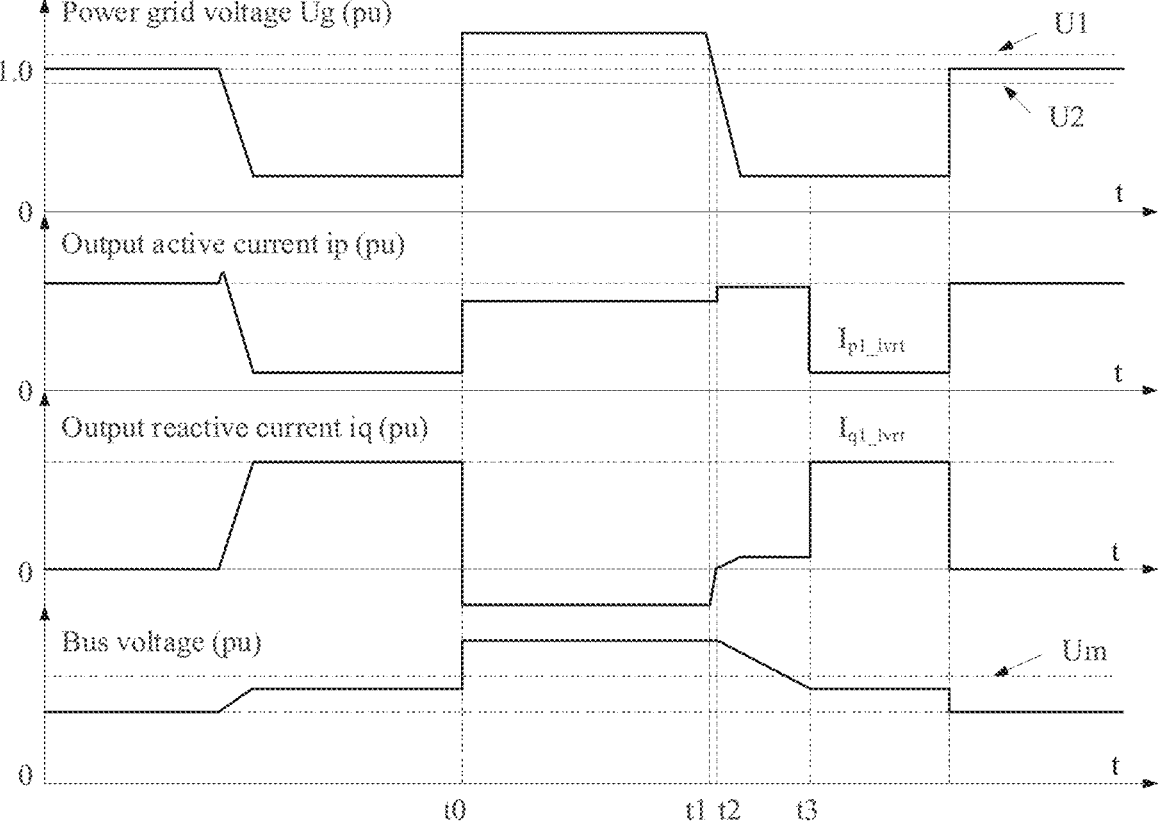
Figure 19C:
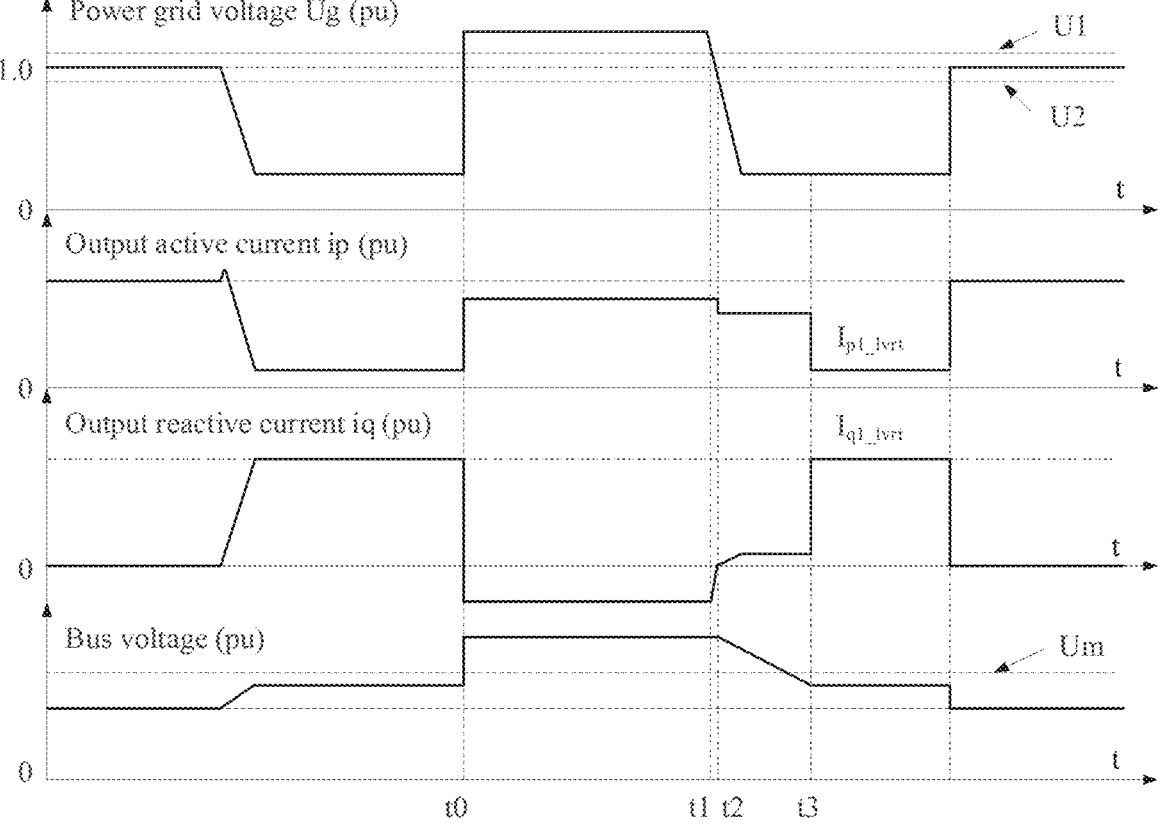

Similarly, as shown in FIG. 18, a change rate k5 of the active current may vary with time, and the bus voltage Ubus may decrease to be less than Um before the moment t3. As shown in FIG. 19(a) to FIG. 19(c), the active current can also remain unchanged at different levels, provided that the value of the active current Ip is high enough to satisfy the amount of charges "extracted" by the inverter circuit from the bus capacitor, that is, the requirement of the inverter circuit to subsequently output the reactive current can be met.

It should be noted that DC/DC conversion circuits may exist between the input power Pin of the power conversion device and the direct current buses. In a non-ideal case, a power loss exists in the DC/DC conversion circuits. It is possible that the input power Pin of the power conversion device is changed to 98% Pin when transmitted to the direct current buses. Therefore, the foregoing formula is different. Specifically, in the presence of the DC/DC conversion circuits, a ratio of the input power kept after DC/DC conversion to the input power Pin of the power conversion device may be referred to as conversion efficiency α. In this case, α is a value less than 1. If the direct current source is directly input to the direct current buses BUS+ and BUS− without DC/DC conversion, it may be considered that no power loss exists between the direct current input ports of the power conversion device and the direct current buses. In this case, a value of a is 0. Similarly, a specific loss exists between the input and the output of the inverter circuit, and a ratio of the active power Pout output by the inverter circuit to the input power of the inverter circuit may be referred to as conversion efficiency β. In a power conversion device without a DC/DC conversion circuit, the foregoing formula may be expressed as $$\int_{t2}^{t3} \left( \mathrm{Pout}(t)/\beta/\mathrm{Ubus}(t) \right) dt \geq \Delta Q.$$

Further, if the formula is expressed by using an active current Ip(t) output by the power conversion circuit, the formula is $$\int_{t2}^{t3} \left( Ip(t)/\beta \right) dt \geq \Delta Q.$$

In conclusion, because the reactive current preferential control manner enables the active current to quickly decrease, the bus voltage Ubus cannot decrease by using the active power current. In the technical solution provided in this application, by using the active preferential control manner, the power converter can generate a sufficient active power as soon as possible after continuous high and low voltage ride through of the power grid voltage Ug, so that the voltage Ubus of the direct current bus decreases to be less than the target value Um. Therefore, the power converter can restore a capability of generating a high-level reactive power, to effectively cope with the voltage fluctuation of the power grid, provide effective support for the power grid, and ensure stable running of the power converter.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A power conversion device, wherein:
direct current input ports and an alternating current output port of the power conversion device are connected to a direct current power supply and a load respectively, the power conversion device comprises direct current buses, an inverter circuit, and a controller, and a direct current bus comprises a bus capacitor;
input ends of the inverter circuit are connected to the direct current buses, the direct current buses are connected to the input ports of the power conversion device, and an output end of the inverter circuit is connected to the output port of the power conversion device; and
the controller is configured to control, in response to that a voltage of the alternating current output port is greater than or equal to a high voltage ride through threshold before a first moment and decreases to be equal to a low voltage ride through threshold at a second moment, an active current output by the inverter circuit between the second moment and a third moment, wherein an active power output (Pout) by the inverter circuit between the second moment and the third moment satisfies:

$$\int_{t2}^{t3} \left( \mathrm{Pout}(t)/\beta/\mathrm{Ubus}(t) - \alpha \cdot \mathrm{Pin}(t)/\mathrm{Ubus}(t) \right) dt \geq \Delta Q,$$

wherein:
t2 is the second moment, t3 is the third moment, Pin is an input power of the power conversion device, Ubus (t) is a voltage of the direct current bus, α is power conversion efficiency of transmitting the input power of the power conversion device to the direct current bus, β is power conversion efficiency of the inverter circuit, ΔQ=C(Uo−Um), C is a capacitance value of the bus capacitor, Uo is a voltage value of the direct current bus at the second moment, and Um is a target voltage value of the direct current bus; and
the second moment is before the third moment, the first moment is before the second moment, the low voltage ride through threshold is less than the high voltage ride through threshold, the voltage of the alternating current output port is less than or equal to the low voltage ride through threshold in a period from the second moment to the third moment, a time interval between the second moment and the third moment is less than or equal to a reactive current response time, and the reactive current response time is determined based on a power grid requirement.

2. The power conversion device according to claim 1, wherein the controller is configured to:
control, between the second moment and the third moment, the active current output by the inverter circuit to change at least in a first subperiod at a first change rate, wherein the first change rate is higher than zero, and the first subperiod is less than or equal to the time interval between the second moment and the third moment.

3. The power conversion device according to claim 1, wherein the controller is configured to:
control, between the second moment and the third moment, the active current output by the inverter circuit to change at least in a second subperiod at a second change rate, wherein the second change rate is lower than zero, and the second subperiod is less than or equal to the time interval between the second moment and the third moment.

4. The power conversion device according to claim 1, wherein the controller is configured to:

between the second moment and the third moment:

control the active current output by the inverter circuit to change at least in a third subperiod at a third change rate; and control the active current output by the inverter circuit to change at least in a fourth subperiod at a fourth change rate, wherein a sum of the third subperiod and the fourth subperiod is less than or equal to the time interval between the second moment and the third moment, the third change rate is lower than zero, and the fourth change rate is higher than zero.

5. The power conversion device according to claim 1, wherein the controller is configured to:

control, between the second moment and the third moment, a fifth change rate of the active current output by the inverter circuit to continuously change at least in a fifth subperiod, wherein the fifth subperiod is less than or equal to the time interval between the second moment and the third moment.

6. The power conversion device according to claim 1, wherein the controller is configured to:

control, between the second moment and the third moment, the active current output by the inverter circuit to remain unchanged at least in a sixth subperiod, wherein the sixth subperiod is less than or equal to the time interval between the second moment and the third moment.

7. The power conversion device according to claim 1, wherein the controller is configured to control, between the second moment and the third moment, the active current output by the inverter circuit to remain unchanged.

8. The power conversion device according to claim 1, wherein the controller is configured to control, between the second moment and the third moment, a change rate of the active current output by the inverter circuit to continuously change.

9. The power conversion device according to claim 1, wherein the reactive current response time is less than or equal to 60 ms.

10. A control method of a power conversion device, wherein:

input ends and an output end of the power conversion device are connected to a direct current power supply and an alternating current power grid respectively, the power conversion device comprises direct current buses, an inverter circuit, and a controller, and a direct current bus comprises a bus capacitor;

input ends of the inverter circuit are connected to the direct current buses, the direct current buses are connected to the input ends of the power conversion device, and an output end of the inverter circuit is connected to the output end of the power conversion device; and the control method comprises:

controlling, in response to that a voltage of the output end is greater than or equal to a high voltage ride through threshold before a first moment and decreases to be equal to a low voltage ride through threshold at a second moment, an active current output by the inverter circuit between the second moment and a third moment, wherein an active power output (Pout) by the inverter circuit between the second moment and the third moment satisfies:

$$\int_{t2}^{t3} (Pout(t)/\beta/Ubus(t) - \alpha \cdot Pin(t)/Ubus(t))dt \geq \Delta Q;$$

wherein:

$t2$ is the second moment, $t3$ is the third moment, Pin is an input power of the power conversion device, Ubus (t) is a voltage of the direct current bus, $\alpha$ is power conversion efficiency of transmitting the input power of the power conversion device to the direct current bus, $\beta$ is power conversion efficiency of the inverter circuit, $\Delta Q = C(Uo-Um)$, C is a capacitance value of the bus capacitor, Uo is a voltage value of the direct current bus at the second moment, and Um is a target voltage value of the direct current bus; and the second moment is before the third moment, the first moment is before the second moment, the low voltage ride through threshold is less than the high voltage ride through threshold, the voltage of the output end is less than or equal to the low voltage ride through threshold in a period from the second moment to the third moment, a time interval between the second moment and the third moment is less than or equal to a reactive current response time, and the reactive current response time is determined based on a power grid requirement.

11. The control method of the power conversion device according to claim 10, comprising:

controlling, between the second moment and the third moment, the active current output by the inverter circuit to change at least in a first subperiod at a first change rate, wherein the first change rate is higher than zero, and the first subperiod is less than or equal to the time interval between the second moment and the third moment.

12. The control method of the power conversion device according to claim 10, comprising:

controlling, between the second moment and the third moment, the active current output by the inverter circuit to change at least in a second subperiod at a second change rate, wherein the second change rate is lower than zero, and the second subperiod is less than or equal to the time interval between the second moment and the third moment.

13. The control method of the power conversion device according to claim 10, comprising:

between the second moment and the third moment:

controlling the active current output by the inverter circuit to change at least in a third subperiod at a third change rate; and controlling the active current output by the inverter circuit to change at least in a fourth subperiod at a fourth change rate, wherein a sum of the third subperiod and the fourth subperiod is less than or equal to the time interval between the second moment and the third moment, the third change rate is lower than zero, and the fourth change rate is higher than zero.

14. The control method of the power conversion device control method according to claim 10, comprising:

controlling, between the second moment and the third moment, a fifth change rate of the active current output by the inverter circuit to continuously change at least in a fifth subperiod, wherein the fifth subperiod is less than or equal to the time interval between the second moment and the third moment.

15. The control method of the power conversion device according to claim 10, comprising:

controlling, between the second moment and the third moment, the active current output by the inverter circuit to remain unchanged at least in a sixth subperiod, wherein the sixth subperiod is less than or equal to the time interval between the second moment and the third moment.

16. The control method of the power conversion device according to claim 10, comprising:

controlling, between the second moment and the third moment, the active current output by the inverter circuit to remain unchanged.

17. The control method of the power conversion device according to claim 10, comprising: controlling, between the second moment and the third moment, a change rate of the active current output by the inverter circuit to continuously change.

18. The control method of the power conversion device according to claim 10, wherein the reactive current response time is less than or equal to 60 ms.

19. A system, comprising a direct current power supply, a power conversion device, and a load, wherein:

direct current input ports and an alternating current output port of the power conversion device are connected to the direct current power supply and the load respectively, the power conversion device comprises direct current buses, an inverter circuit, and a controller, and a direct current bus comprises a bus capacitor;

input ends of the inverter circuit are connected to the direct current buses, the direct current buses are connected to the input ports of the power conversion device, and an output end of the inverter circuit is connected to the output port of the power conversion device; and the controller is configured to control, in response to that a voltage of the alternating current output port is greater than or equal to a high voltage ride through threshold before a first moment and decreases to be equal to a low voltage ride through threshold at a second moment, an active current output by the inverter circuit between the second moment and a third moment, wherein an active power output (Pout) by the inverter circuit between the second moment and the third moment satisfies:

$$\int_{t2}^{t3} (Pout(t)/\beta/Ubus(t) - \alpha \cdot Pin(t)/Ubus(t))dt \ge \Delta Q,$$

wherein:

t2 is the second moment, t3 is the third moment, Pin is an input power of the power conversion device, Ubus (t) is a voltage of the direct current bus, $\alpha$ is power conversion efficiency of transmitting the input power of the power conversion device to the direct current bus, $\beta$ is power conversion efficiency of the inverter circuit, $\Delta Q = C$ (Uo−Um), C is a capacitance value of the bus capacitor, Uo is a voltage value of the direct current bus at the second moment, and Um is a target voltage value of the direct current bus; and the second moment is before the third moment, the first moment is before the second moment, the low voltage ride through threshold is less than the high voltage ride through threshold, the voltage of the alternating current output port is less than or equal to the low voltage ride through threshold in a period from the second moment to the third moment, a time interval between the second moment and the third moment is less than or equal to a reactive current response time, and the reactive current response time is determined based on a power grid requirement.

20. The system according to claim 19, wherein the controller is configured to:

control, between the second moment and the third moment, the active current output by the inverter circuit to change at least in a first subperiod at a first change rate, wherein the first change rate is higher than zero, and the first subperiod is less than or equal to the time interval between the second moment and the third moment.

* * * * *